United States Patent [19]
Pease et al.

[11] Patent Number: 5,544,326
[45] Date of Patent: Aug. 6, 1996

[54] INTERFACE AND CONTROL CIRCUIT FOR REGULATING DATA FLOW IN A SCSI INITIATOR WITH MULTIPLE HOST BUS INTERFACE SELECTION

[75] Inventors: Allan F. Pease, San Jose; Richard Moore, Irvine, both of Calif.

[73] Assignee: Future Domain Corporation, Incorporated, Irvine, Calif.

[21] Appl. No.: 29,910

[22] Filed: Mar. 11, 1993

Related U.S. Application Data

[63] Continuation-in-part of Ser. No. 667,754, Mar. 11, 1991, abandoned.

[51] Int. Cl.⁶ .................................................. G06F 13/38
[52] U.S. Cl. ........................ 395/250; 395/872; 395/309; 364/DIG. 1
[58] Field of Search .................................. 395/200, 250, 395/275, 500, 800, 309, 872, 877

[56] References Cited

U.S. PATENT DOCUMENTS

| | | | |
|---|---|---|---|
| 4,062,059 | 12/1977 | Suzuki et al. | 395/250 |
| 4,384,327 | 5/1983 | Conway et al. | 395/308 |
| 4,635,194 | 1/1987 | Burger et al. | 395/375 |
| 4,716,525 | 12/1987 | Gilanyi et al. | 395/250 |
| 4,785,415 | 11/1988 | Karlquist | 395/550 |
| 4,843,544 | 6/1989 | DuLac et al. | 395/250 |
| 4,965,801 | 10/1990 | DuLac et al. | 371/40.1 |
| 4,975,829 | 12/1990 | Clarey et al. | 395/500 |
| 5,101,498 | 3/1992 | Ehlig et al. | 395/800 |
| 5,185,876 | 2/1993 | Nguyen et al. | 395/841 |
| 5,237,660 | 8/1993 | Weber et al. | 395/250 |
| 5,241,630 | 8/1993 | Lattin, Jr. et al. | 395/250 |
| 5,276,807 | 1/1994 | Kodama et al. | 395/309 |
| 5,287,460 | 2/1994 | Olsen et al. | 395/883 |
| 5,289,580 | 2/1994 | Latif et al. | 395/883 |
| 5,299,315 | 3/1994 | Chin et al. | 395/250 |
| 5,371,861 | 12/1994 | Keener et al. | 395/309 |

FOREIGN PATENT DOCUMENTS

287301A2 10/1988 European Pat. Off. .
451516A1 10/1991 European Pat. Off. .

OTHER PUBLICATIONS

National Semiconductor, Advanced Peripherals Mass Storage Handbook, Section 6, SCSI Bus Interface Circuits, pp. 6-3-6-22.

Primary Examiner—Krisna Lim
Assistant Examiner—Viet Vu
Attorney, Agent, or Firm—Skjerven, Morrill, MacPherson, Franklin & Friel

[57] ABSTRACT

A single chip SCSI controller circuit has a pair of input and output first in, first out (FIFO) buffers as well as a main buffer. The circuit supports synchronous and asynchronous data transfers which are fully compatible with the SCSI-II specification. A mode select pin may be selectively actuated by the user or by attached interface circuitry to configure the chip for either microchannel architecture (MCA) or industry standard architecture (ISA) compatibility.

14 Claims, 48 Drawing Sheets

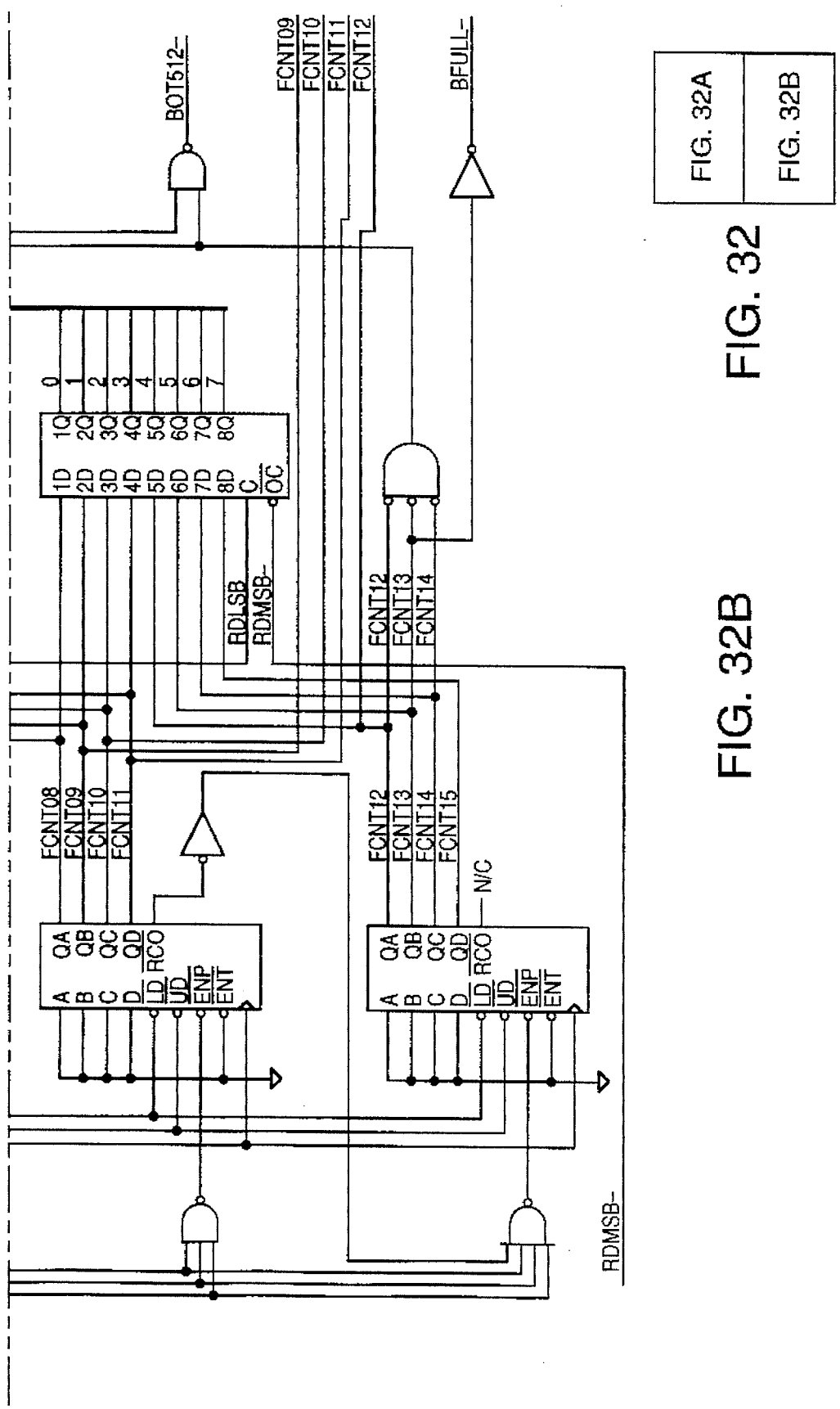

INTERFACE AND CONTROL CIRCUIT FOR REGULATING DATA FLOW IN A SCSI INITIATOR WITH MULTIPLE HOST BUS INTERFACE SELECTION

RELATED APPLICATION

This is a continuation-in-part application of our pending application Ser. No. 07/667,754, filed on Mar. 11, 1991, entitled SCSI CONTROLLER, now abandoned.

BACKGROUND AND SUMMARY OF THE INVENTION

The invention relates generally to computer bus interface circuitry. More particularly, the invention relates to an interface circuit, for connecting one of a selected plurality of different computer buses to the Small Computer System Interface (SCSI) bus. The circuit is well suited for single chip implementation. Dual first in, first out (FIFO) buffers are used to provide a circuit which supports both asynchronous and synchronous modes.

The Small Computer System Interface (SCSI) is a parallel input/output bus often used to connect disc drives, CD-ROMs, tape drives and other peripherals to a computer bus. The SCSI bus is a bidirectional, multimaster bus which can accommodate peer to peer communications among multiple CPUs and multiple peripherals. Because of this versatility, the SCSI bus is becoming increasingly important in the microcomputer field.

There are several popular microcomputer architectures in use today, and for the most part, these architectures are not compatible with one another. For example, the IBM PC XT and AT computer, and the so-called compatibles, use a computer bus which is now popularly called the industry standard architecture (ISA). Some of the more recent IBM microcomputers of the PS/2 family use a different bus known as microchannel architecture (MCA). The microchannel architecture is generally not plug compatible with the earlier industry standard architecture. This has caused some problems in the computer peripheral industry, since manufacturers who want to support both product lines must design different circuits for both architectures. This adds considerably to the cost of developing and supporting peripheral products.

For the engineer wishing to design a SCSI interface into a product to be used across the IBM microcomputer family, there has traditionally been no easy solution. The industry standard architecture and microchannel architecture are sufficiently different that it is not heretofore been possible to design one product for use on both. A great deal of engineering time goes into developing hardware products, and this engineering time is reflected in the product cost. What is needed but has heretofore been unavailable, is a simple, easy to use and cost-effective SCSI controller which may be readily configured to work with either the industry standard architecture or the microchannel architecture.

The present invention implements a complete multifunctional SCSI chip for use with either the ISA architecture or the MCA architecture. The principles may also be used to extend the SCSI circuit to additional architectures such as the Extended Industry Standard Architecture (EISA). In its presently preferred embodiment, the only external requirements are for address decoding at the high order memory address bits, a suitable oscillator and an external static RAM. The static RAM is preferably an 8K×8 static RAM used to implement the SCSI controller's main FIFO. Using presently available technology, the external main FIFO is more economically manufactured as a separate component, as opposed to integral with the remainder of the SCSI chip. However, with improvements in chip fabrication technology and with appropriate economies of scale, the entire SCSI chip including main FIFO could be fabricated as a single chip.

The SCSI controller of the invention supports asynchronous and synchronous protocols conforming to the SCSI specification known as the SCSI-II specification proposed by the American National Standards Institute (ANSI) and further described in the X3.131–198x; X3 Project 503-D prepared by the Technical Committee X3T9 of the I/O interface accredited Standards Committee, X3-Information Processing Systems.

The circuit includes logic circuitry for handling SCSI bus arbitration, automatic generation of acknowledge handshakes, interrupt on SCSI control/data signal, interrupt on SCSI select signal, interrupt on arbitration complete signal and interrupt on SCSI reset signal. The circuit provides first in first out (FIFO) buffering of data-with interrupt generation based on FIFO fullness levels.

The circuit includes an address generator and timing controls for the 8K×8 external static RAM used to implement the main FIFO which supports high speed synchronous and asynchronous SCSI device operations. The FIFO data path is I/O mapped to the 16 bit data bus of the host computer. This allows high speed data transfers between the computer bus and the main FIFO. SCSI command information, chip status, setup parameters and data paths are I/O mapped.

The presently preferred chip implementation supports a ROM BIOS space of 7936 (decimal), 1F00 (hex) bytes. The onboard chip logic includes an EPROM enable capability as well as data buffering and latching. An internal memory of 256×8 bytes of memory mapped static RAM is provided for use by the ROM BIOS software for variable storage, scratch pad registers and the like.

In one aspect the invention comprises a computer system interface for connection between an input/output SCSI bus and a selected one of at least two different types of host computer bus architectures. The computer system interface of the invention is thus useful in interconnecting a host computer to a peripheral device. The apparatus comprises an internal data bus, a first interface means for coupling the SCSI bus to the internal data bus and a second interface means for coupling the host computer bus to the internal data bus. Control logic gating means are provided for causing data communicated between the SCSI bus and the first interface means to communicate with the internal data bus. The control logic gating means further causes data communicated between the computer bus and the second interface means to communicate with the internal data bus.

Control signal generation logic means are provided for coupling to the host computer bus. The control signal generation logic means have a first portion adapted for generating control signals of a first type, corresponding to a host computer of a first type. The control signal generation logic means further includes a second portion adapted for generating control signals of a second type, corresponding to a host computer of a second type. User-settable means is provided for selectively enabling one and disabling the other of the first and second portions of the control signal generation logic.

Preferably, the user-settable means defines at least a first state and a second state, each corresponding to different host computer bus architecture types. The user-settable means may be selectively placed in one or the other of the two states by predefined hardware configuration. In the presently preferred embodiment an external conductive lead or terminal is provided for this purpose. Placing this terminal at a first logic state configures the SCSI controller chip as an ISA compatible device, while placing the terminal at a second logical state configures the chip as an MCA compatible device.

In another aspect the invention comprises a computer system interface for connection between a predefined host computer bus and an input/output SCSI bus, for interconnecting a computer to a peripheral device. The apparatus comprises an internal data bus with a main FIFO buffer coupled to it. A first interface means is provided for coupling the SCSI bus to the internal data bus and a second interface means is provided for coupling the host computer bus to the internal data bus. Control logic gating means are provided for causing data communicated between the SCSI bus and the first interface means to flow onto the internal data bus and to further flow from the internal data bus into the main FIFO buffer. Monitoring means are provided for monitoring the quantity of data in the main FIFO buffer and for generating information for placement on the host computer bus as an indication of fullness of the main FIFO buffer.

The monitoring means preferably generates count data which indicates the quantity of data stored in the main FIFO buffer and may also include means for generating an interrupt signal for placement on the host computer bus in the event the quantity of data stored in the main FIFO buffer reaches a predefined level. In this way, software operating on the host computer can access the count data to determine the correct data block size to send or receive. The interrupt signal can serve as an-automatic sentinel to alert the host computer when certain predefined fullness (or emptiness) main FIFO conditions exist.

In the presently preferred embodiment, the first interface comprises an input/output FIFO buffer which may include its own means for monitoring fullness. Depending on the user-selected mode of operation, data communication between host computer bus and SCSI bus may invoke both the main FIFO buffer and the input/output FIFO buffer, the main FIFO buffer only, or neither buffer.

The SCSI controller of the invention is thus very flexible and well adapted for use in a wide variety of SCSI applications. The user-settable computer architecture selection mechanism greatly simplifies SCSI interface circuit design, since the engineer may now design both ISA and MCA peripherals using the same multifunction SCSI chip. Hardware design is facilitated because the engineer is able to apply familiarity gained in developing an ISA SCSI interface to an MCA SCSI interface, and vice-versa. Software design is also facilitated since the multifunction SCSI chip provides a relatively transparent hardware/software interface. The software engineers' task is thus greatly facilitated, since the operating system software can be written with minimal concern about which computer architecture is in place.

For a more complete understanding of the invention and its many objects and advantages, reference may be had to the following detailed specification and to the accompanying drawings.

BRIEF DESCRIPTION OF THE DRAWINGS

Figure 45:
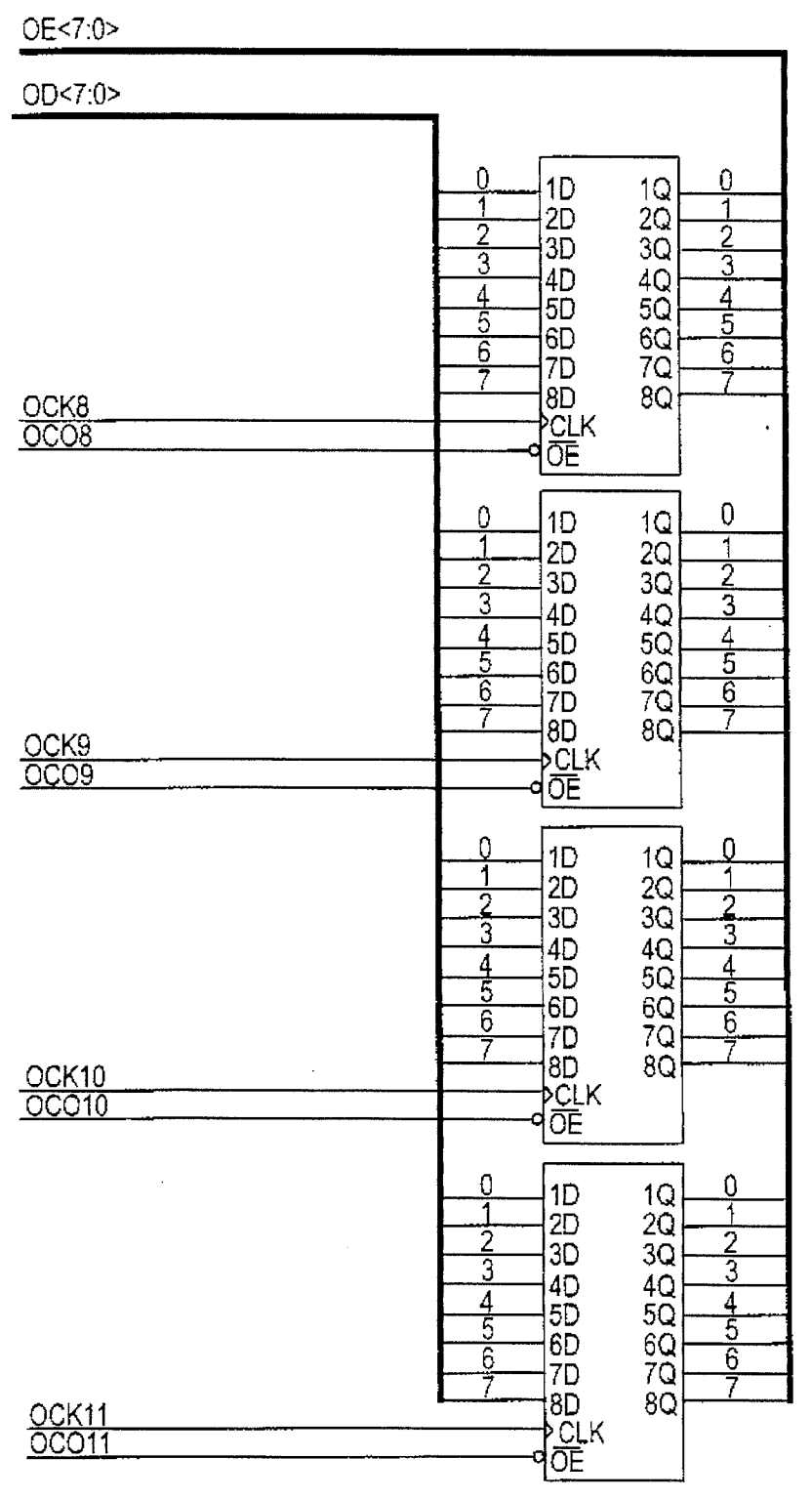

FIG. 45 is a schematic diagram of the output FIFO registers 8–11; and

Figure 46:
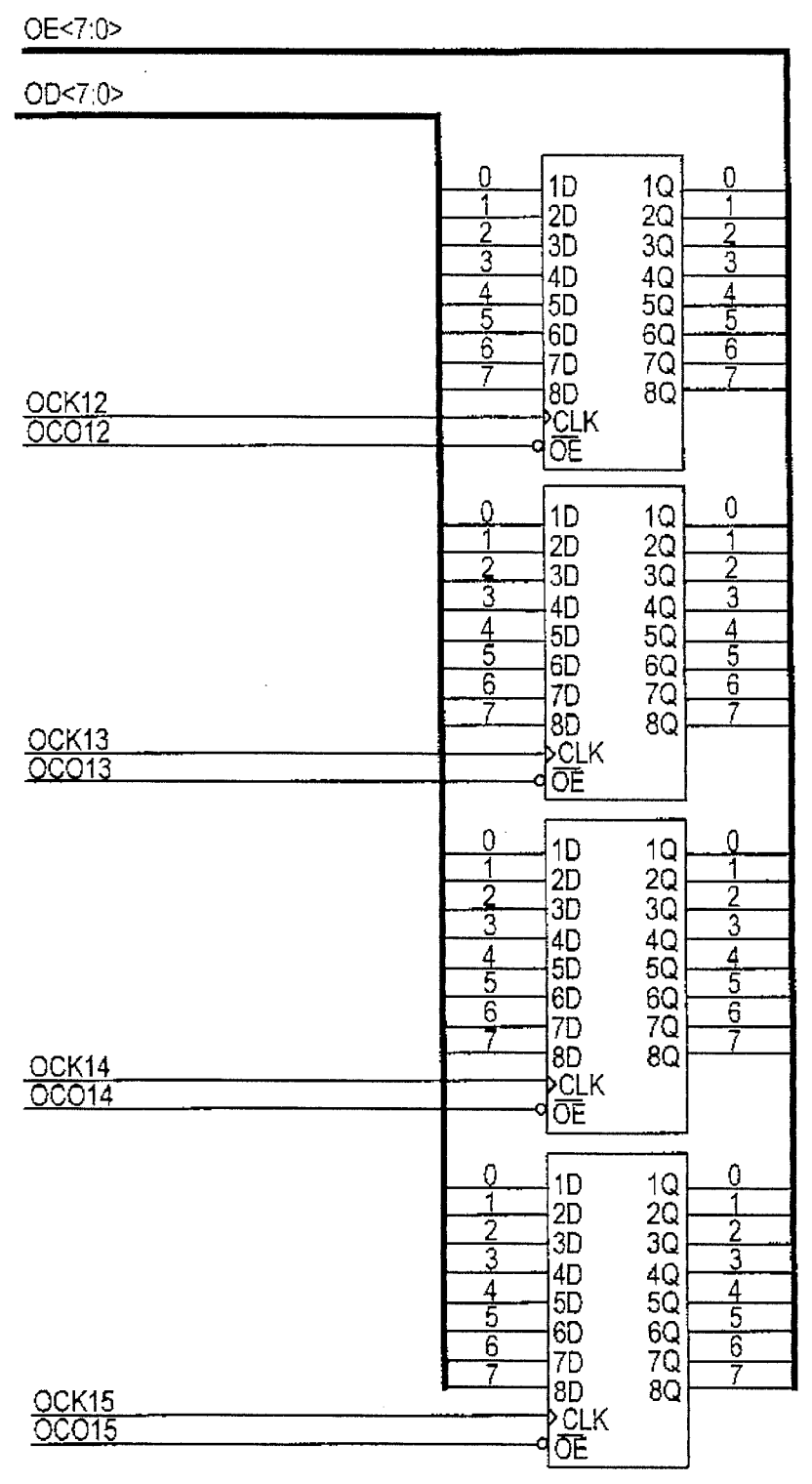

FIG. 46 is a schematic diagram of the output FIFO registers 12–15.

DESCRIPTION OF THE PREFERRED EMBODIMENT

General System Overview

Figure 1:
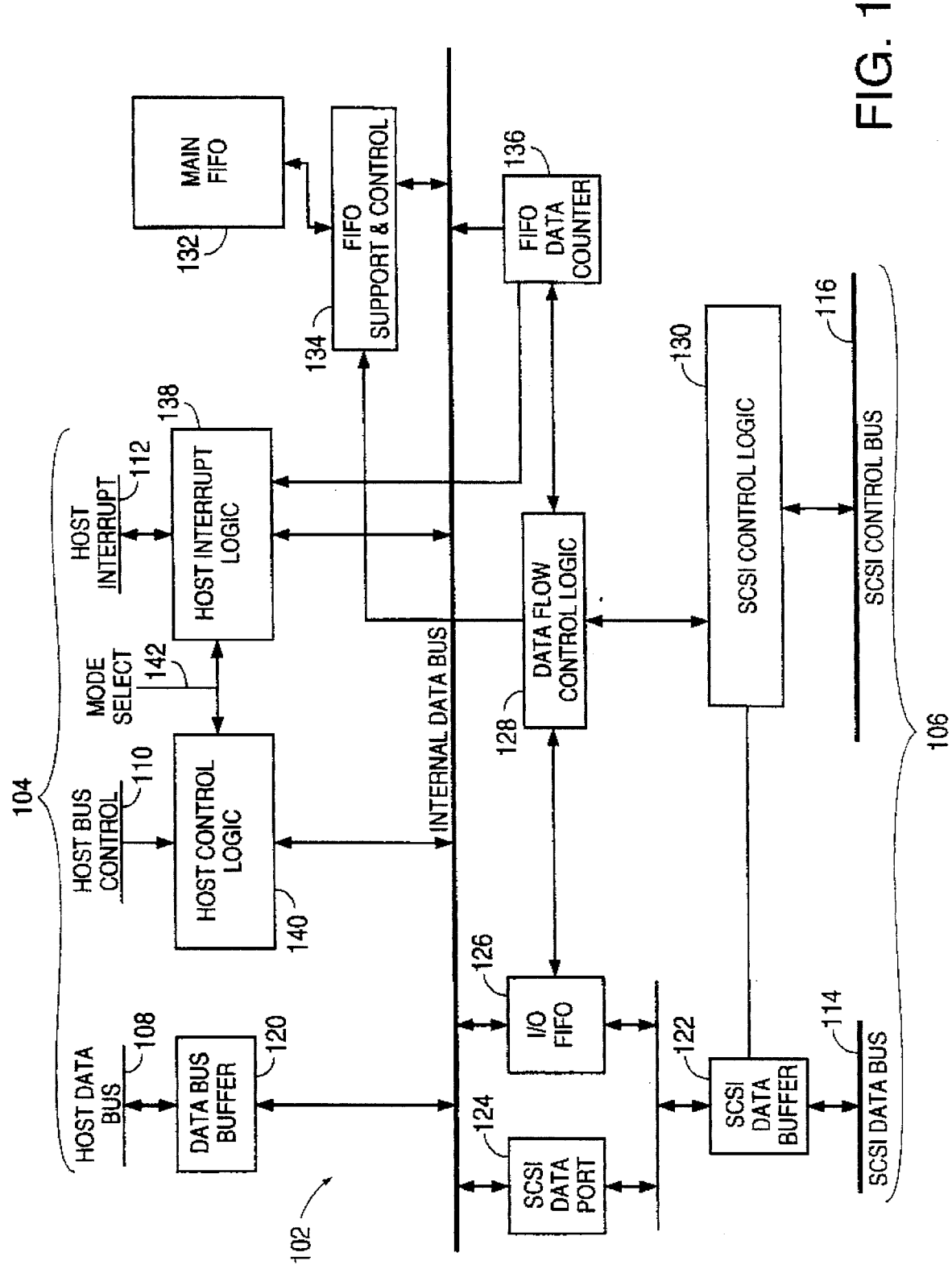
FIG. 1 is a block diagram of the invention giving a general system overview.

Referring to FIG. 1, the SCSI controller is depicted by a functional block diagram which will be useful in understanding the more detailed schematic diagrams which follow. The SCSI controller circuit, shown generally at 102 is adapted for interconnection between the host computer bus, shown generally at 104, and the SCSI bus, shown generally at 106. For convenience, the host computer bus has been broken into the following components: host data bus 108, host bus control 110 and host interrupt 112. Similarly, the SCSI bus is illustrating comprising: SCSI data bus 114 and SCSI control bus 116. The SCSI controller circuit 102 includes an internal data bus 118.

The host data bus 108 is connected to the internal data bus 118 through a data bus buffer 120. The SCSI data bus 114 is likewise provided with a SCSI data buffer 122. The SCSI data bus buffer is coupled to the internal data bus 118 through two alternate paths, a SCSI data port 124 and an input/output first in first out buffer or I/O FIFO 126. The I/O FIFO is controlled by data flow control logic 128. The data flow control logic is in turn controlled by SCSI control logic 130, which is responsive to signals on the SCSI control bus 116. In the presently preferred embodiment I/O FIFO 126 is a 16 byte FIFO for handling the offset or latency which can occur during synchronous data transfers. In the synchronous mode, there is a negotiation which takes place prior to data transmission during which time the rate of transfer and offset are established. The offset of 16 allows up to 16 data requests to be queued up without the need to acknowledge. The size of I/O FIFO 126 must be sufficient to accommodate the maximum permissible offset. Although a 16 byte I/O FIFO is employed in the present embodiment, different FIFO sizes are also possible and contemplated by the invention.

The SCSI controller circuit also includes a main FIFO 132, which is coupled to the internal data bus through FIFO support and control circuitry 134. In the presently preferred embodiment the main FIFO is an 8K×8 bit FIFO which may be implemented using static random access memory. As will be further illustrated, the bulk of the SCSI controller circuit of the invention may be fabricated as a single microchip. In its presently preferred form, the main FIFO 13Z is packaged separately from the remainder of the microchip circuitry to reduce cost. 8K×8 bit random access memory chips are readily available and presently more economical than fabricating a single SCSI controller circuit with sufficient onboard RAM to accommodate the main FIFO. Of course, improvements in chip fabrication technology or economies of scale could make it desirable to include the main FIFO with the remaining circuitry in a single chip package. Further, while an 8K×8 bit main FIFO is presently employed, different storage sizes and data widths (e.g., 16 bit or larger) may be employed to meet future circuit requirements.

The circuit includes a FIFO data counter 136 which is coupled to the data flow control logic 128 and also to the internal data bus 118. The FIFO data counter monitors the fullness of main FIFO 132 and provides a numeric value indicative of fullness which the host computer can access to determine the appropriate block size for data transfers. The FIFO data counter is coupled to interrupt logic 138 and is thereby able to send an interrupt to the host computer on its host interrupt bus.

The interrupt logic is capable of supporting both MCA and ISA interrupt protocols. This capability is depicted diagrammatically by reference numerals 138a and 138b. The circuit also includes control logic 140, coupled to the internal data bus and also to the host bus control lines 110. The control logic is also configured with a portion 140a for interfacing with MCA architecture and a second portion 140b for interfacing with ISA architecture.

A mode select pin on the single chip embodiment provides a user-settable means for configuring the chip as either an MCA or an ISA device. The mode select pin, designated 142 in FIG. 1, is coupled to both interrupt logic 138 and control logic 140.

The multifunction SCSI chip of the presently preferred embodiment communicates with SCSI targets using the small computer system interface (SCSI) protocol, implementing arbitration, disconnect/reselection and asynchronous, synchronous and fast synchronous data protocols. The following memory and I/O functions may be performed by the chip:

Read ROM

Read/Write Internal System Ram

Input/Output Main FIFO

Input/Output SCSI Data Port (8 Bit)

Output SCSI Control Information (8 Bit)

Output Interrupt Information (8 Bit)

Output SCSI Synchronous Control (8 Bit)

Output Adaptor Control (8 Bit)

Input/Output Loopback Register (8 Bit)

Input SCSI Bus Status (8 Bit)

Input Main FIFO Count (16 Bit)

Input Adaptor ID, LSB (8 Bit)

Input Adaptor ID, MSB (8 Bit)

Input Interrupt Mask (8 Bit)

Input Option Select (8 Bit).

Figure 3:
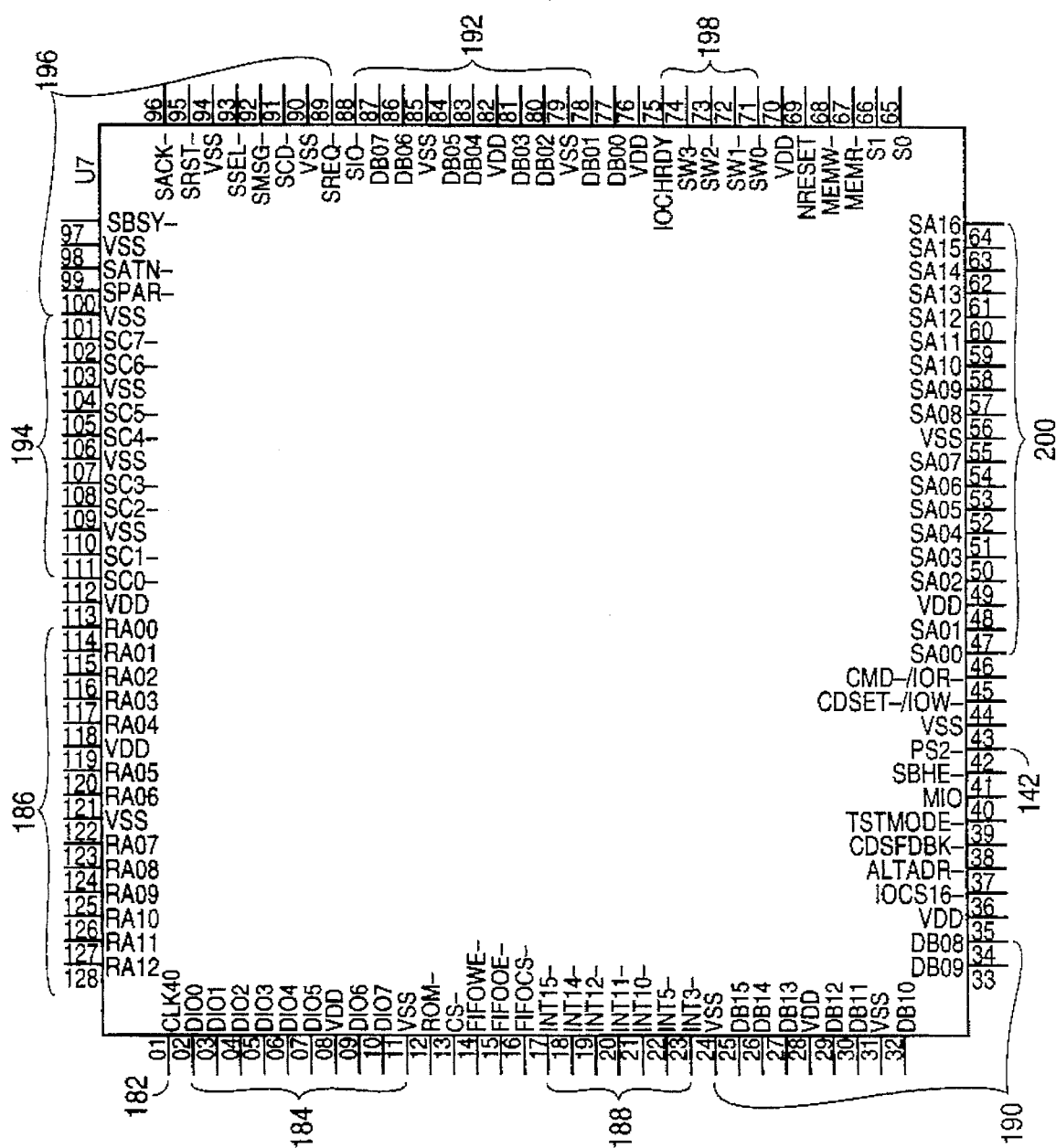
FIG. 3 depicts a single chip embodiment, showing pin designations.

To provide a great deal of flexibility, the presently preferred single chip embodiment may be user-configured to reside at different I/O and memory base addresses. Four pins designated SW0–SW3 on FIG. 3 are provided to select the I/O and memory base addresses. In a microchannel implementation these four pins correspond to the microchannel POS bits 4–7. The I/O base address is given by Table I below and the memory base address is given by Table II below. A 1 in the Tables below corresponds to a grounded SW0-SW3 pin and a 0 corresponds to an open or pulled-up pin. Address bits 17 and higher are decoded by logic external to the multifunction SCSI chip.

TABLE I

| SW1/POS5 | SW0/POS4 | Starting Address |
|---|---|---|
| 0 | 0 | 0140 |
| 0 | 1 | 0150 |
| 1 | 0 | 0160 |
| 1 | 1 | 0170 |

TABLE II

| SW3/POS7 | SW2/POS6 | Memory Base Address (Hex) |
|---|---|---|
| 0 | 0 | 0C8000 |
| 0 | 1 | 0CA000 |
| 1 | 0 | 0CE000 |
| 1 | 1 | 0DE000 |

The 7936 bytes (1F00 h) bytes of ROM BIOS or EPROM are mapped to the host computer bus starting at the base memory address selected in accordance with the above settings. This memory space may be read through the 8 bit computer bus connector and will support memory mapped EPROM operations. The SCSI chip further includes 256×8 of static RAM which is shown and will be further identified in the discussion of FIG. 2 to follow. This RAM is used for system variable storage and scratch pad operations. It is mapped at offset 1F00 h from the memory base address. Aside from ROM BIOS read operations and the 256×8 RAM read/write operations (which are memory mapped) the remaining functions of the present embodiment are I/O mapped.

Main FIFO 132, the 8K×8 external static RAM used for buffering data to and from the SCSI data port, is read from or written to using either an 8 bit or a 16 bit I/O operation. The main FIFO is located at offset 0Ch from the I/O base address. Thus the host computer can access the main FIFO buffer by performing an I/O operation to the I/O port located 0Ch from the selected I/O base address.

The invention provides a plurality of 8 bit status and control registers which include various control signals, status signals and the SCSI data ports. Like the main FIFO, these registers are mapped at offsets from the I/O base address. Some of the registers provide both read and write functions, other registers only read functions and still other registers only write functions. For convenience, Table III below lists each status and control register, giving the assigned offset from the I/O base address. The main FIFO port at offset 0Ch is also given in the Table. Beneath the Table there follows a brief description of each function which is invoked when the given I/O offset is addressed by the host computer during the appropriate read and/or write cycle.

TABLE III

| Offset | Read | Offset | Write |
|---|---|---|---|
| E | FIFO Count | E | |
| C | Main FIFO | C | Main FIFO |
| A | POS Option Select | A | |
| 9 | Interrupt Mask | 9 | |
| 8 | SCSI Data Port (No ACK Generation) | 8 | SCSI Data Port (No ACK Generation) |
| 7 | Echo Register | 7 | Echo Register |
| 6 | ID Code (MSB) | 6 | |
| 5 | ID Code (LSB) | 5 | |
| 4 | | 4 | FIFO Control |
| 3 | | 3 | SCSI Synchronous Control |
| 2 | Adapter Status | 2 | Interrupt Control |
| 1 | SCSI Bus Status | 1 | SCSI Control |
| 0 | SCSI Data Port (With ACK Generation) | 0 | SCSI Data Port (With ACK Generation) |

Offset 0, Read/Write. SCSI data port

This is a direct read of or write to the 8 bit SCSI data port. If the SCSI Request is asserted, an automatic SCSI Acknowledge is generated. Only asynchronous transfers are supported with this port.

Offset 1 Read. SCSI bus status

This is a direct read of the current levels of the SCSI control signals. Signals are read as 1 for asserted or 0 for negated.

Bit 0—SCSI Busy

Bit 1—SCSI Message

Bit 2—SCSI Input/Output

Bit 3—SCSI Command/Data

Bit 4—SCSI Request and Not Acknowledge

Bit 5—SCSI Select

Bit 6—SCSI Acknowledge

Bit 7—SCSI Attention

Offset 1, Write. SCSI control actions

Bits 0–6 drive the SCSI control signals. Writing a 1 to the bit asserts the signal, while a 0 releases it Bit 0—SCSI Bus Reset Bit 1—SCSI Select Bit 2—SCSI Busy Bit 3—SCSI Attention Bit 4—SCSI Input/Output Bit 5—SCSI Command/Data Bit 6—SCSI Message Bit 7—Enable SCSI Bus Bit 7 must be set whenever the adapter is used to drive the SCSI bus (except arbitration phase)

Offset 2, Read. Adapter Status.

Bit 0 indicates whether any enabled interrupt source is active, regardless of whether the Enable Interrupt bit in write register 4 is set. Bit 1 indicates that the adapter has won control of the SCSI bus. It is cleared by setting Initiate Bus Arbitration in write register 4 to 0. Bit 2 indicates that a parity error has occurred on data read from the SCSI bus. It is cleared by writing a 1 to write register 4 bit 0. Bit 3 indicates the current level of the SCSI Reset signal (1 for asserted, 0 for negated).

Bit 0—Interrupt

Bit 1—Arbitration Complete

Bit 2—SCSI Bus Parity Error

Bit 3—SCSI Reset

Bit 4—FIFO Direction (Write Register 4 bit 6)

Bit 5—Enable FIFO (Write Register 4 bit 7)

Bit 6—Enable SCSI Parity (Write Register 4 bit 3)

Bit 7—Enable SCSI Bus (Write Register 1 bit 7)

Offset 2, Write. Interrupt Control

Bits 4–7 enable the corresponding interrupt sources when set to 1. In bits 0–3 when the FIFO reaches this value ×512, an interrupt is generated. The value 0 is interpreted as a full FIFO if data is being read from the SCSI device and empty if data is being written to the SCSI device, whereas 1 is for 512 bytes, 2 for 1024, etc.

Bits 0–3—FIFO Interrupt Count

Bit 4—Interrupt on FIFO Count

Bit 5—Interrupt on Arbitration Complete

Bit 6—Interrupt on SCSI Select

Bit 7—Interrupt on SCSI C/D and Request

Offset 3, Write. SCSI Synchronous Control

The rate of Acknowledge pulses can be controlled for synchronous operation. The control period for the adapter is 50 nanoseconds. The base period is 200 nanoseconds, i.e., with this field set to 0. If the field is set to one, the period goes up to 250 nanoseconds, if set to two, 300 nanoseconds, and so on, up to 950 nanoseconds. The period will either be the value stated, or higher, which may be the case if synchronization with the FIFO is required. The Acknowledge is always asserted for 100 nanoseconds, with the remaining time made up in the deasserted state. The fast synchronous mode is enabled by setting bit 6 to 1. This mode ignores the Acknowledge period above and always uses a 100 nanosecond cycle with the Acknowledge asserted for 50 nanoseconds and deasserted for 50 nanoseconds. Bit 6 must be enabled along with the enable synchronous bit. Bit 7 enables synchronous mode when set to 1.

Bits 0–3—Acknowledge Period

Bit 4—Reserved, Should Always Be Written As Zero

Bit 5—Reserved, Should Always Be Written As Zero

Bit 6—Enable Fast Synchronous

Bit 7—Enable Synchronous offset 4, write. FIFO Control

Writing a 1 to bit 0 clears all data from the FIFO, resets the SCSI Parity Error Flag, and clears the SCSI Reset Interrupt. This is a momentary pulse and this data is not saved. Bit 2 initiates a SCSI bus arbitration (see Section 4.7). Bit 3 enables SCSI data parity generation. Bit 4 enables external driver for interrupts and the SCSI Reset interrupt latch. In bit 6 0 equals Read and 1 equals Write. Read is from the SCSI target to the host bus and Write is from the host bus to the SCSI target. Bit 7 enables the FIFO for data phase operations. The mode of operation, asynchronous, synchronous or fast synchronous is determined by the Synchronous Control Register. If the FIFO is not enabled, the data may be read a single byte at a time from the SCSI port using PIO.

Bit 0—Clear FIFO and SCSI Parity Error Status

Bit 1—Reserved, Should Always Be Written As Zero

Bit 2—Initiate Bus Arbitration

Bit 3—Enable SCSI Parity

Bit 4—Enable Interrupts

Bit 5—Reserved, Should Always Be Written As Zero

Bit 6—FIFO Direction

Bit 7—Enable FIFO

It is important to note that the SCSI Reset line can also cause an interrupt if interrupts are enabled. An interrupt is generated on each transition of the SCSI Reset line. When the SCSI Reset line is asserted, an interrupt is generated, and when the SCSI Reset line is deasserted, an interrupt is generated. This can be used by the software to detect any change in the state of the SCSI interrupt line. This feature is only required in the target mode of operation.

Offset 5, Read ID code (LSB)

The lower 8 bits of the ID code are read. This is the microchannel ID that would be assigned. This ID is read in whether the chip is in AT mode or microchannel mode. If the ALTADR pin is open, the ID returned is 60E9, and if it is at ground, the ID is 6127. This allows identification of two separate controllers if it is desired to have two separate adapters installed. This register is intended for use to help in finding the card in a memory mapped system, or for identifying the fact that the primary or secondary adapter has been located.

Offset 6, Read. ID code (MSB),

The upper 8 bits of the ID code are read.

Offset 7, Read and Write. Echo register

This is a read and write register. It can be used for setting semaphores, or for some other type of communication between multiple users or drivers for the adapter. What is written into the port is read back from the same port.

Offset 8, Read and Write

This offset is the same as Offset 0, except that a SCSI Acknowledge is not generated. This allows a message input byte to be examined without an Acknowledge, so that it can be rejected. If the message is not rejected, a subsequent read at Offset 0 will generate the Acknowledge.

Offset 9, Read. Interrupt Mask

Bits 2-0—Reserved

Bit 3—Interrupt Enable (Write Register 4 bit 4)

Bits 7-4—Interrupt Mask (Write Register 2 bits 7-4)

offset A, Read. Option Select

This is a direct read back of the microchannel POS option select register. The field are as given in Section 4.2. Note that, at AT mode, the address and interrupt fields are determined by the input jumpers as described in Sections 4.3 and 4.4. The card enable field is also read here, but is not relevant since access to this register implies that the card is enabled (in AT mode, the card is always enabled).

Offset E, Read. FIFO Count

This 16 bit register contains the count of the number of bytes currently in the FIFO.

Figure 2:
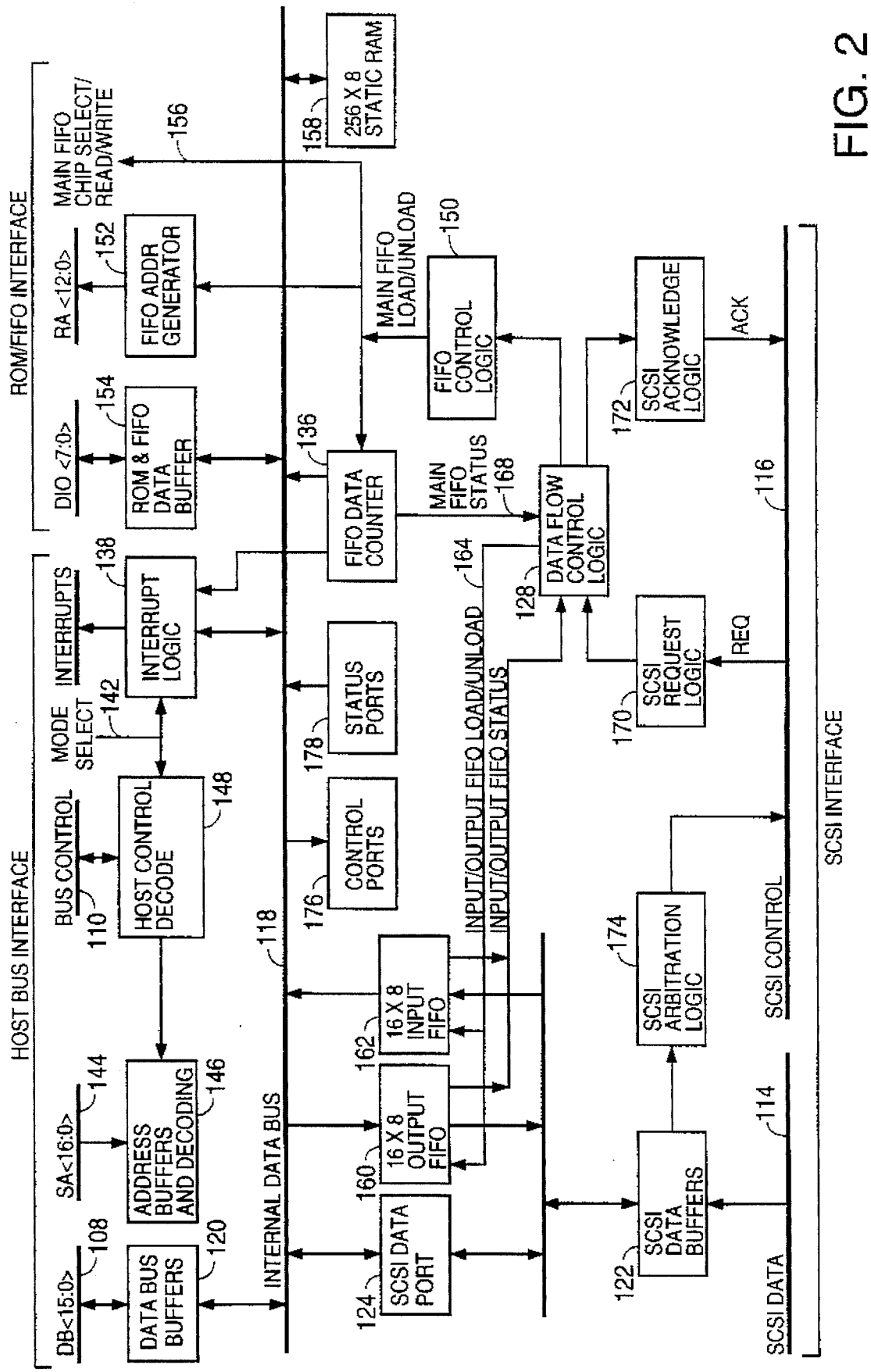
FIG. 2 is a more detailed block diagram of the invention.

A more detailed overview of the invention is shown in FIG. 2. Where applicable, individual blocks in FIG. 2 have been assigned the reference numerals corresponding to those blocks in FIG. 1. FIG. 2 illustrates the host computer address bus 144 which is coupled to the address buffers and decoding circuitry 146. It will be recalled that the circuit decodes address bits 0–16, leaving address bits 17 and higher to be decoded by external logic.

In order to be compatible with MCA architecture, the circuit includes a microchannel programmable option select (POS) circuit 148. The programmable option select feature is not found in the ISA architecture. It provides software configurable switches in lieu of mechanically actuated switches for setting hardware options such as the I/O and memory base addresses.

The FIFO support and control block 134 of FIG. 1 is shown in more detail in FIG. 2, comprising FIFO control logic 150, FIFO address generator 152, and FIFO data bus buffer 154. The address generator and data buffer communicate with the address bus and data bus, respectively, of the main FIFO buffer 132 (not shown). FIFO control logic 150 provides the main FIFO chip select and read/write signals on lead 156. The FIFO data buffer 154 communicates with the internal data bus 118, as illustrated. Also communicating with the internal data bus is the 256×8 static RAM 158. This static RAM is used for variable storage and scratch pad registers. The host computer can access the status RAM 158 via the host data bus, data bus buffer 120 and internal data bus The I/O FIFO 126 is shown in more detail in FIG. 2 as comprising a 16×8 output FIFO 160 and a 16×8 input FIFO 162. Both of these FIFOs are coupled to the internal data bus for data communication in the directions shown. Data flow control logic 128 controls both FIFOs 160 and 162 over the input/output FIFO load/unload lead 164. The status of both FIFOs is provided to the data flow control logic via the input/output FIFO status lead 166. Main FIFO status is provided to the data flow control logic via the main FIFO status lead 168.

The data flow control logic is responsible for coordinating incoming SCSI requests with outgoing SCSI acknowledge signals. The SCSI request logic block 170 receives request (REQ) signals from the SCSI control bus 116 and provides an indication thereof to the data flow control logic 128. Depending on the mode of communication selected, the data flow control logic can command the SCSI acknowledge logic 172 to place an acknowledge (ACK) on the SCSI control bus 116. In order to handle the condition in which more than one SCSI device simultaneously attempts to gain access to the bus, the circuit includes SCSI arbitration logic 174. The arbitration logic is responsive to the condition of the SCSI data buffers 122. Further details of the foregoing logic blocks will be provided below.

Being an I/O mapped implementation, the circuit of the invention provides a plurality of control ports and status ports which the host computer may access for performing desired functions and gaining certain information. Table III outlined the control ports and status ports of the presently preferred embodiment. In FIG. 2, the control ports are designated generally by reference numeral 176 and the status ports by reference numeral 178.

The pinout layout of the presently preferred single chip embodiment of the invention is shown in FIG. 3. Specifically, FIG. 3 illustrates the single chip embodiment 180 having pins or leads carrying the various signals identified. A listing of these signals and some other internal signals is provided in Table IV below. For convenience, some of the signals on the leads illustrated in FIG. 3 have been grouped together under common reference numerals. Accordingly, lead 182 is the clock input lead on which a 40 MHz external clock is applied. Leads 184 form the DI0–7 data leads of the ROM/main FIFO interface. Leads 186 comprise the RA address leads for bits 0–12 of the ROM/main FIFO interface. Leads 188 comprise the interrupt leads for connection to the host interrupt bus, while leads 190 and 192 connect to the DB data bus of the host computer. The SCSI data bus connects to leads 194, while the SCSI control leads are connected at 196.

TABLE IV

| Signal | Meaning |
|---|---|
| RESET- | Reset signal (low true) |
| ICLK40 | 40 MHz clock input |
| CLK0 | Internal 20 MHz clock |
| CLK1 | Internal 20 MHz clock |
| T1 | Clock phase 1 |
| T2 | Clock phase 2 |
| T3 | Clock phase 3 |
| T4 | Clock phase 4 |
| T123 | Clock phases 1–3 |
| DECCLK | Clock phases 1–2 |
| ARBCLK- | Clock phases 2–3 |
| DECCLK- | Clock phases 3–4 |

TABLE IV-continued

| Signal | Meaning |
|---|---|
| ARBCLK | Clock phases 4–1 |
| IAxx | Internal buffered address lines |
| IBHE | Internal bus high byte enable |
| GACSA, ICSGA, LCSGA | Internal decode of chip select |
| MEMCY, MEMCYL | Internal decode of memory cycle |
| IOSELECT, PORTI, PORTIM | Internal decode of I/O cycle |
| PORTL, PORTLO | Internal decode of I/O cycle (ports 0–7) |
| PORTH, PORTHI | Internal decode of I/O cycle (ports 8–15) |
| IMEMW | Internal decode of host write cycle |
| IMEMR | Internal decode of host read cycle |
| IMRW | Internal decode of host read or write cycle |
| ACMD | MCA command phase |
| FIFOB | First byte of 16 bit FIFO access cycle |
| PTRQ | Request for data cycle for host bus |
| PTGNT | Host bus cycle grant |
| SCSIRQ | Request for data cycle for SCSI path |
| SCGNT | SCSI cycle grant |
| FIFOCLR-, CTRCLR- | FIFO and counter reset signals (low true) |
| FIFOENA | Enable main FIFO transfers to/from SCSI |
| FIFODIR | FIFO direction is to SCSI output |
| FIFODIR- | FIFO direction is from SCSI input |
| SCSYNC | Synchronous SCSI data mode |
| SYNCFAST | Fast synchronous SCSI data mode |
| ASY<3:0> | Synchronous SCSI Ackowledge period |
| BOT512- | FIFO contains less than 512 bytes (low true) |
| FCNT12, ..., FCNT09 | FIFO data count most significant four bits |
| FIFINT- | FIFO interrupt (low true) |
| BEMPTY- | Main FIFO empty (low true) |
| BFULL- | Main FIFO full (low true) |
| IEMPTY- | Input FIFO empty (low true) |
| OFULL- | Output FIFO full (low true) |
| OEMPTY- | Output FIFO empty (low true) |
| ISREQ | SCSI Request and not SCSI Acknowledge |
| REQCNT | Positive count of unserviced synchronous SCSI Requests |
| SYNACK- | Synchronous SCSI Acknowledge (low true) |
| SACK | SCSI Acknowledge |
| BIGWT | Write asynchronous SCSI data to main FIFO |
| BIGRD | Read main FIFO data to asynchronous SCSI |
| SCSIRQA- | Asynchronous SCSI data request |
| ACKHOLD | Holdoff of SCSI input cycle during synchronous Acknowledge |
| OLDCK | Output FIFO load clock |
| OUNCK | Output FIFO unload clock |
| LITFIFR | Input FIFO read cycle |
| S240OE- | Enable ISC bus onto IB bus |
| SC245G- | Enable D bus/IB bus bidirectional buffer |
| SC245D- | Direction of D bus/IB bus buffer (low for IB to D) |
| SY373- | Latch SCSI output data (synchronous mode) |
| SC373CK | Latch SCSI output data |
| DB<15:0> | Host data bus |
| D<7:0> | Internal data bus |
| PD<7:0> | Internal data bus extension for I/O read ports |
| IB<7:0> | Intermediate data bus for SCSI data path |
| ISC<7:0> | SCSI inut data path (low true) |
| SD<7:0> | SCSI output data path |
| SC<7:0>- | SCSI data bus (low true) |
| DIO<7:0> | Data I/O bus for ROM and main FIFO RAM |
| RA<12:0> | Address for main FIFO RAM |

The switches SW0-3, used to configure the I/O and memory base address are depicted at 198. The host computer address bus connects to leads 200 in addition to electrical power VDD and VSS, the remaining leads provide other control functions and bear the conventional MCA and/or ISA pin designations. One notable addition is pin 142 which comprises the user-settable means for selectively enabling either the MCA or the ISA architecture configurations. This pin is also designated PS2, the PS2 designation being another nomenclature for MCA architecture.

Detailed System Description

The remaining FIGS. 4 to 46 may now be referred to for the detailed description of the presently preferred embodiment which follows.

Figure 4:
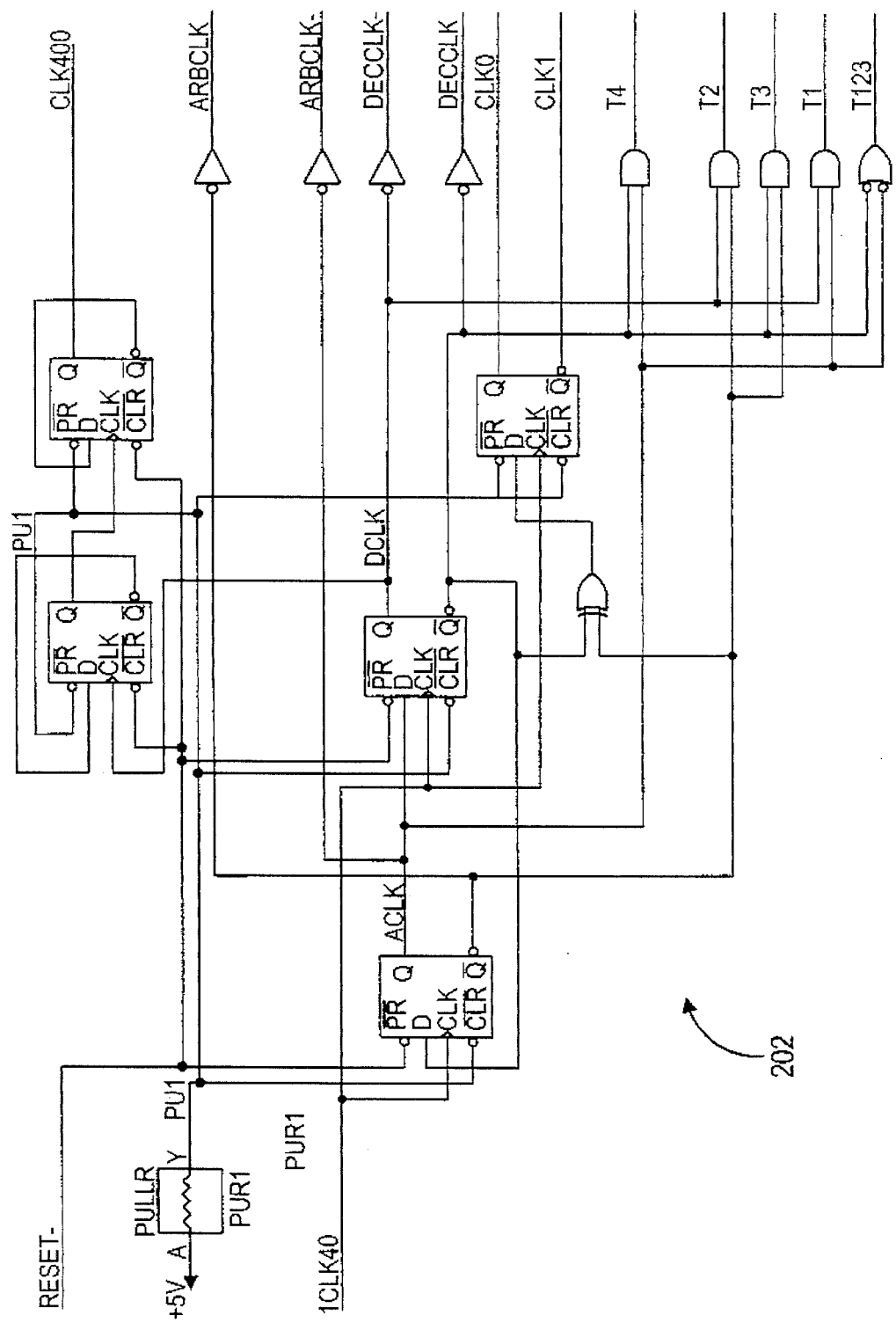
FIG. 4 is a schematic diagram of the 40 MHz clock divider circuit.

Referring first to FIG. 4, the 40 MHz clock divider circuit is illustrated generally at 202. The clock signal CLK40 which was input on lead 182 is divided by circuit 202 into a four phase, 10 MHz clock. The clock signals so generated are used throughout the remainder of the circuit and are instrumental in establishing the data flow control logic 128 of FIG. 2.

Figure 5:
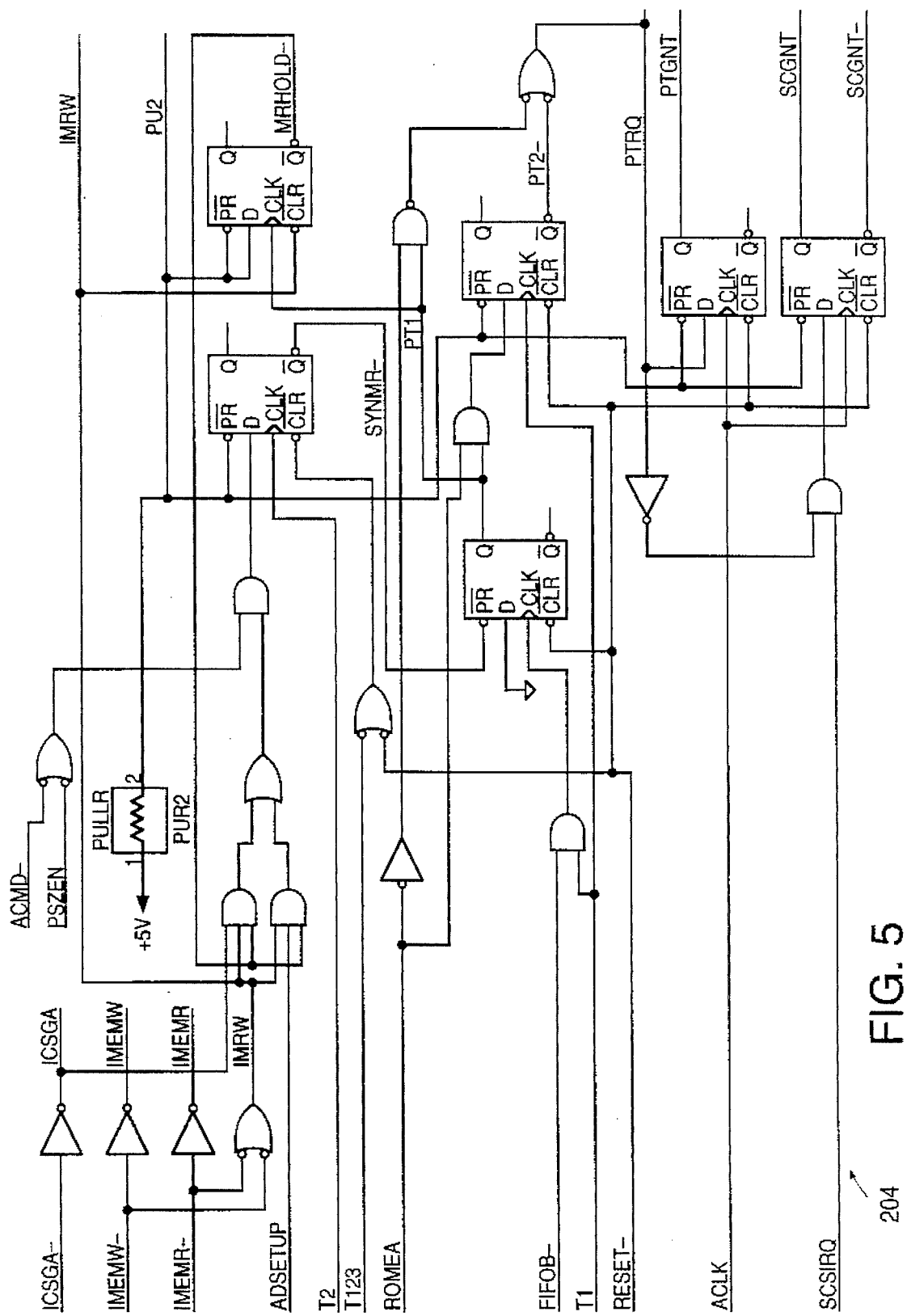
FIG. 5 is a schematic diagram of the internal arbitration logic.

In FIG. 5, the internal arbitration logic circuit depicted generally at 204. This circuitry decides whether the internal data bus 118 is shared and which operation is given access to the internal data bus as between host bus operations and SCSI transfers. The internal arbitration logic may also be considered part of the data flow control logic 128 of FIG. 2.

At the 10 MHz basic clock rate, each cycle of 100 nanoseconds is devoted to either a host processor phase or a SCSI phase. The internal arbitration logic circuit provides two outputs, one designated PT GNT and one designated SC GNT. The former serves as the processor grant signal and the latter as the SCSI grant signal. The signals are mutually exclusive so that only one of these two functions may have access to the internal data bus at a time. The terminal designated SCSI RQ is the request from the SCSI logic for access to the bus, while the signal designated PT RQ is the request from the processor for cycle. Priority is given to the processor cycle.

The internal arbitration logic circuit includes an edge detection circuit so that it may detect processor requests for cycle. The circuit includes generation of timing states, depending on whether an 8 bit or a 16 bit cycle is invoked. The edge detector circuit includes a flipflop which provides a hold signal that prevents a double trigger of the edge detector. The circuit also provides a PT2- which extends the bus cycle for ROM transfers, because ROMs are typically slower devices and need the extended bus cycle time.

Figure 6:
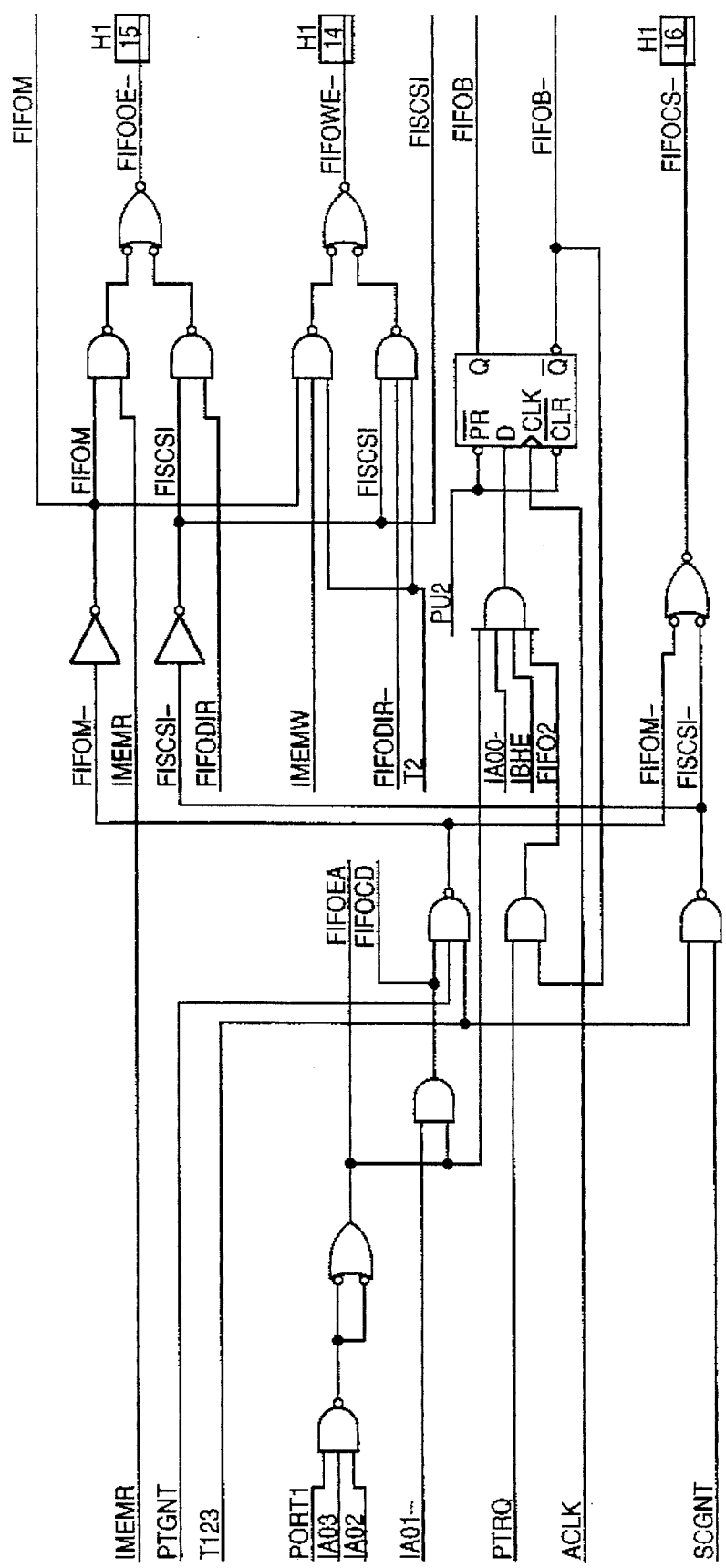
FIG. 6 is a schematic diagram of the basic address decoding logic.

FIG. 6 depicts the basic address decode circuitry 206. This circuit breaks down general address ranges and detects whether the host is accessing ROM, the main FIFO, or the internal static RAM 158. To do this it decodes some of the upper address bits.

Main FIFO access is not a straight address decode operation, since certain other conditions must be met before the processor can access the main FIFO. Specifically, to access the main FIFO the FIFO chip select signal must be asserted as well as the FIFO output enable or write enable signal. If the bus is on a SCSI cycle, a similar operation is required, although there is no need for address decoding.

Circuit 206 provides FIFO B and FIFO B- signals which are used to implement a 16 bit cycle notwithstanding that the internal data bus is 8 bits wide. The FIFO B signal is used to split a 16 bit cycle into two 8 bit cycles on the internal data bus, with the FIFO B signal indicating that it is the first of those two cycles. The FIFO B signal ensures that the next cycle will be used to access the second 8 bit half of a 16 bit access.

Figure 7:
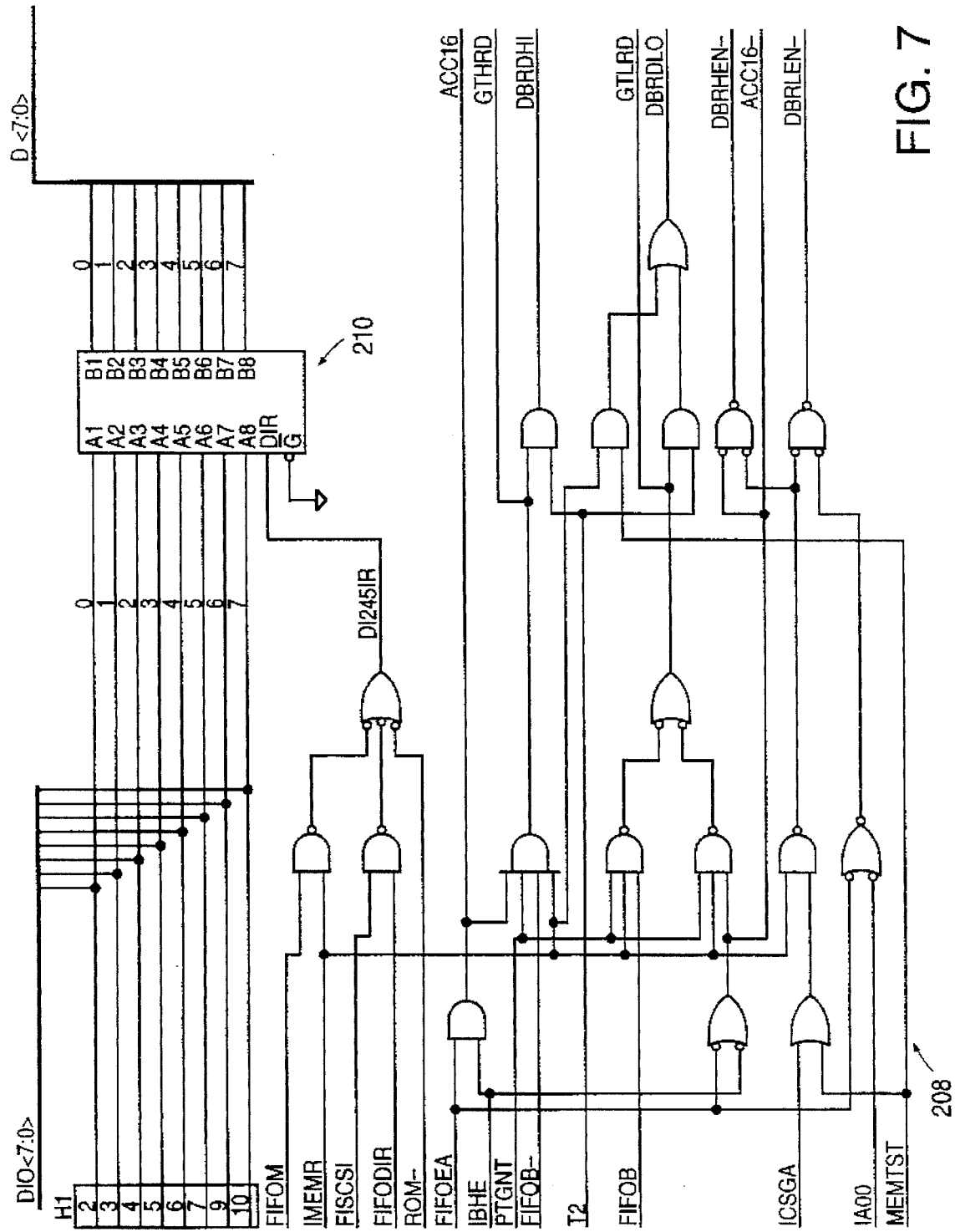
FIG. 7 is a schematic diagram of the DIO buffer/read data gating.

FIG. 7 comprises some additional address decoding logic shown generally at 208 as well as the ROM and FIFO data buffer shown generally at 210. The circuitry of FIG. 7 controls the read cycles and latching of data into the data bus buffers.

Figure 8:
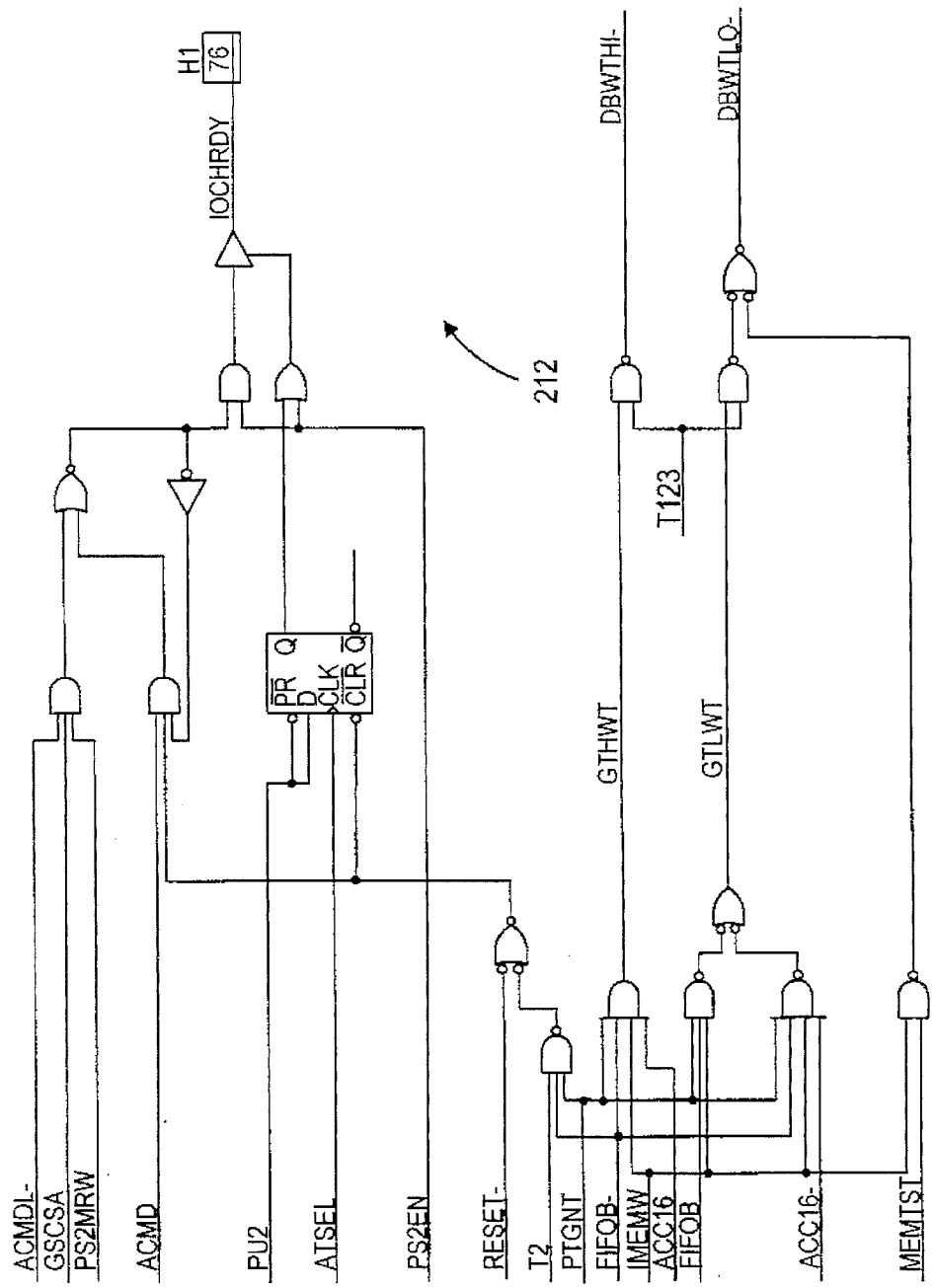
FIG. 8 is a schematic diagram of the CHRDY logic/write data gating.

FIG. 8 comprises similar circuitry dedicated to the control of write cycles and latching of data in the write buffers. The circuitry of FIGS. 7 and 8 may be considered part of the address buffers and decoding block 146 of FIG. 2. Data is maintained on the internal data bus for approximately 50 nanoseconds, making it necessary to latch the data during read cycles. The address decode logic circuit 208 of FIG. 7 generates latch control signals DBRDHI and DBRDLO, as well as the Boolean NOT versions of those signals. The circuit of FIG. 8 includes a portion designated generally at 212 which generates the IOCHRDY signal which is used by the MCA and ISA control decode logic block 140 of FIG. 2. This signal is a standard signal in the MSA and ISA architectures. It is used to insert a wait state.

Figure 9A:
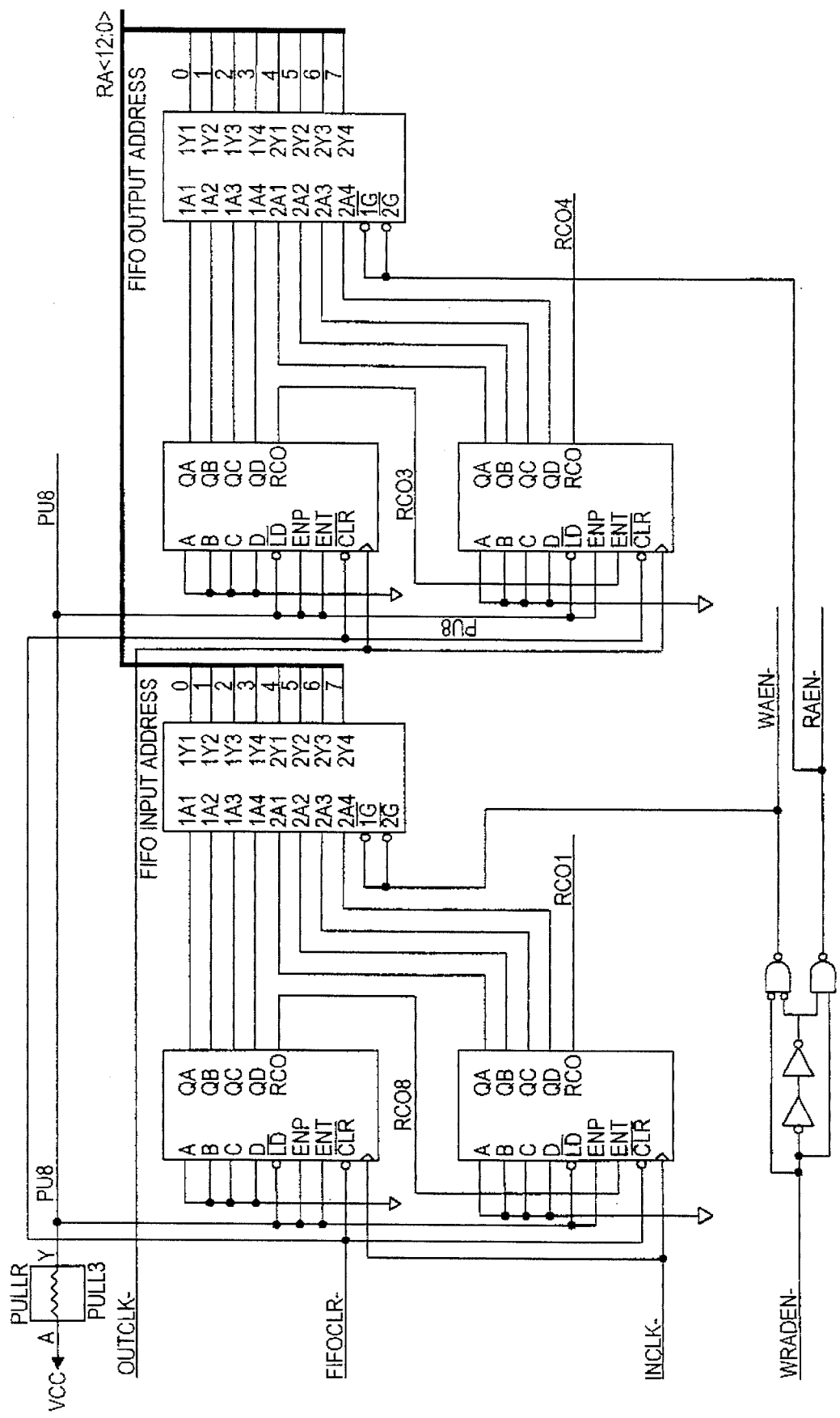
FIG. 9A is a schematic diagram of the FIFO-address generation A.
Figure 9B:
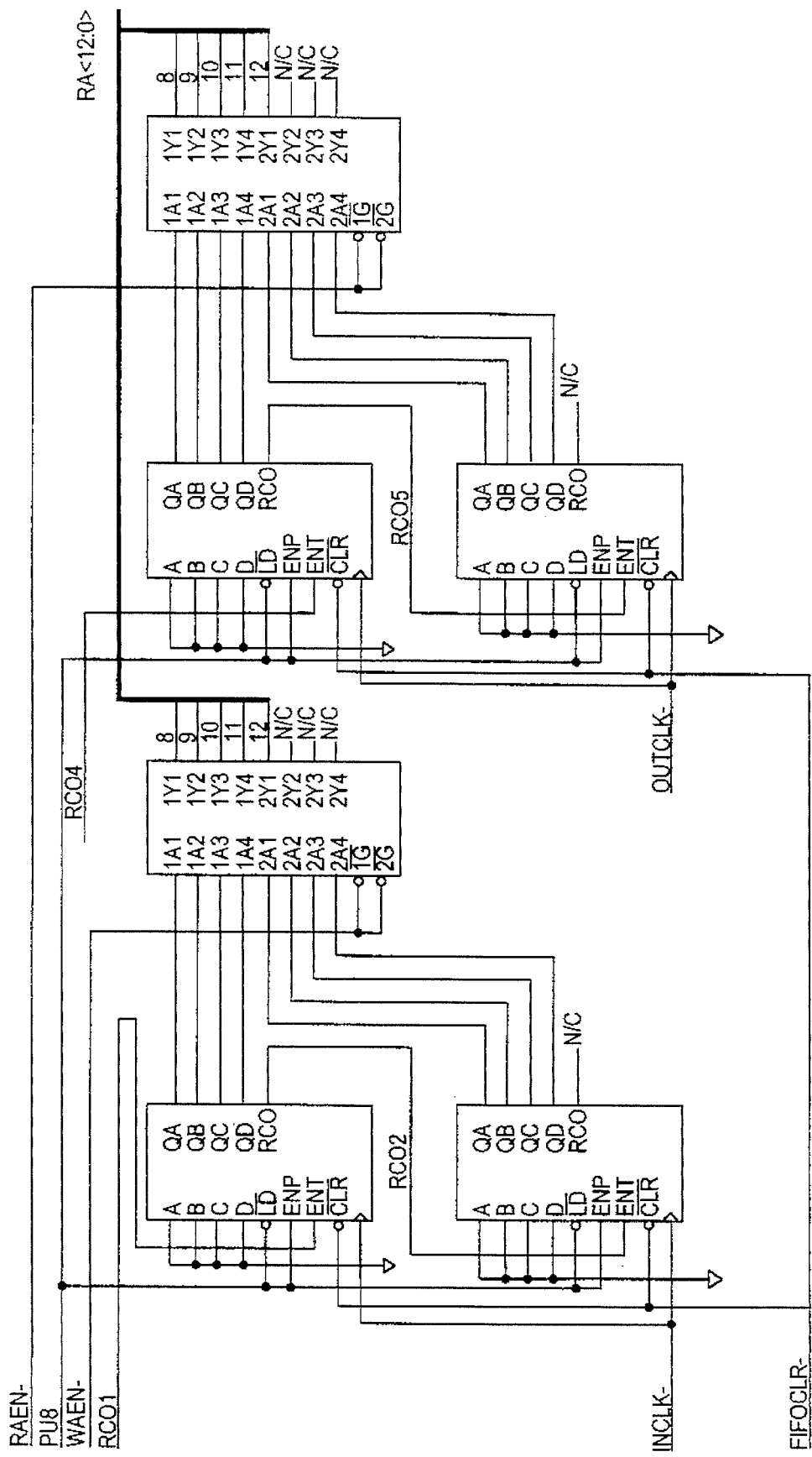
FIG. 9B is a schematic diagram of the FIFO address generation B.
Figure 37:
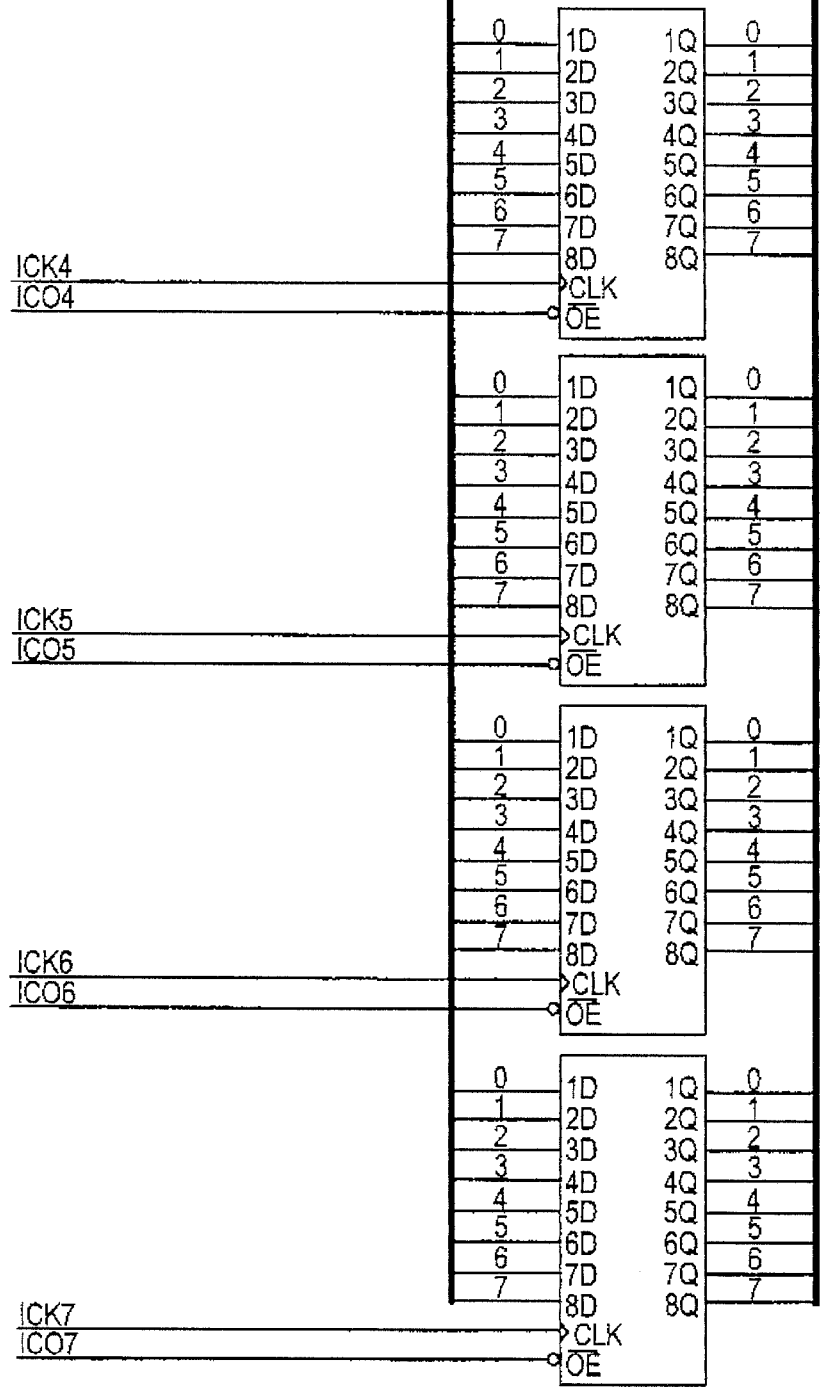
FIG. 37 is a schematic diagram of the input FIFO registers 4–7.
Figure 38:
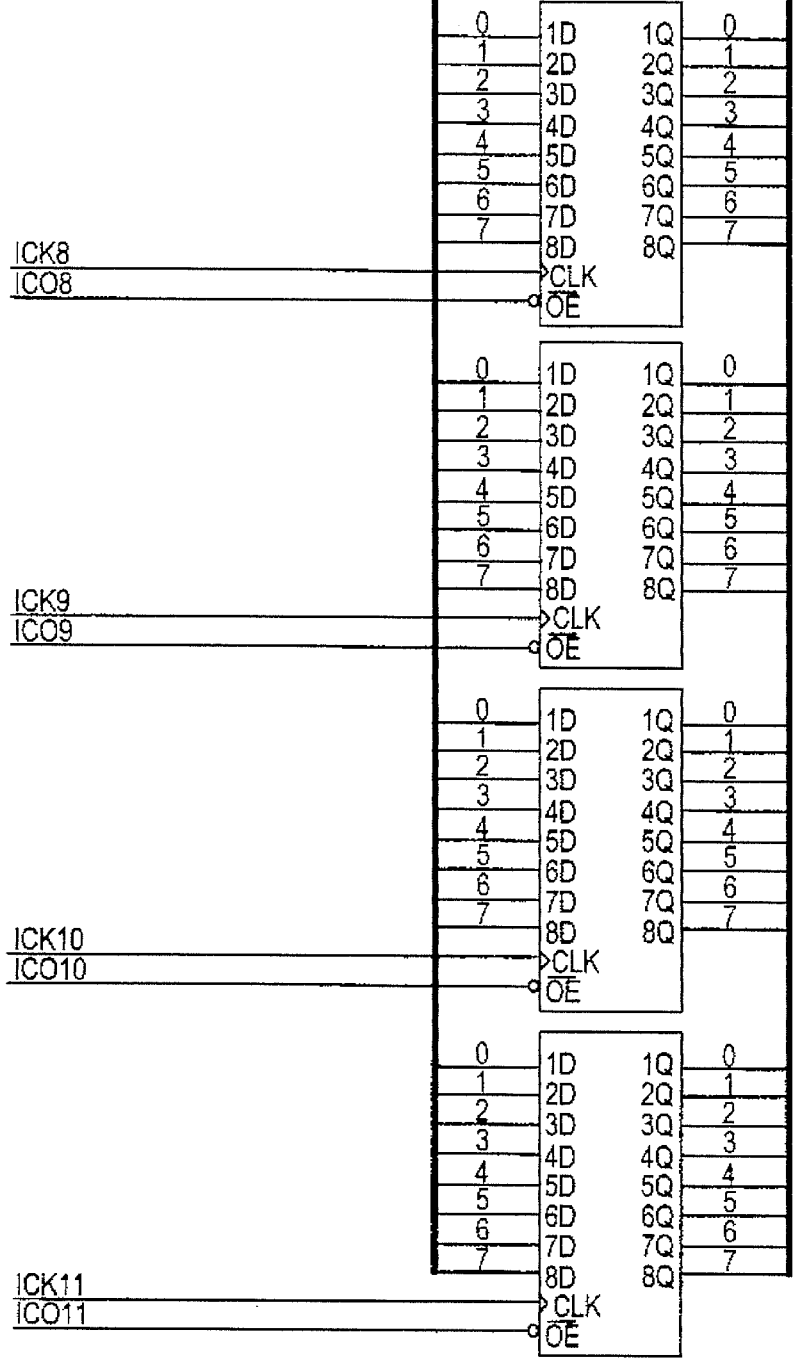
FIG. 38 is a schematic diagram of the input FIFO registers 8–11.
Figure 39:
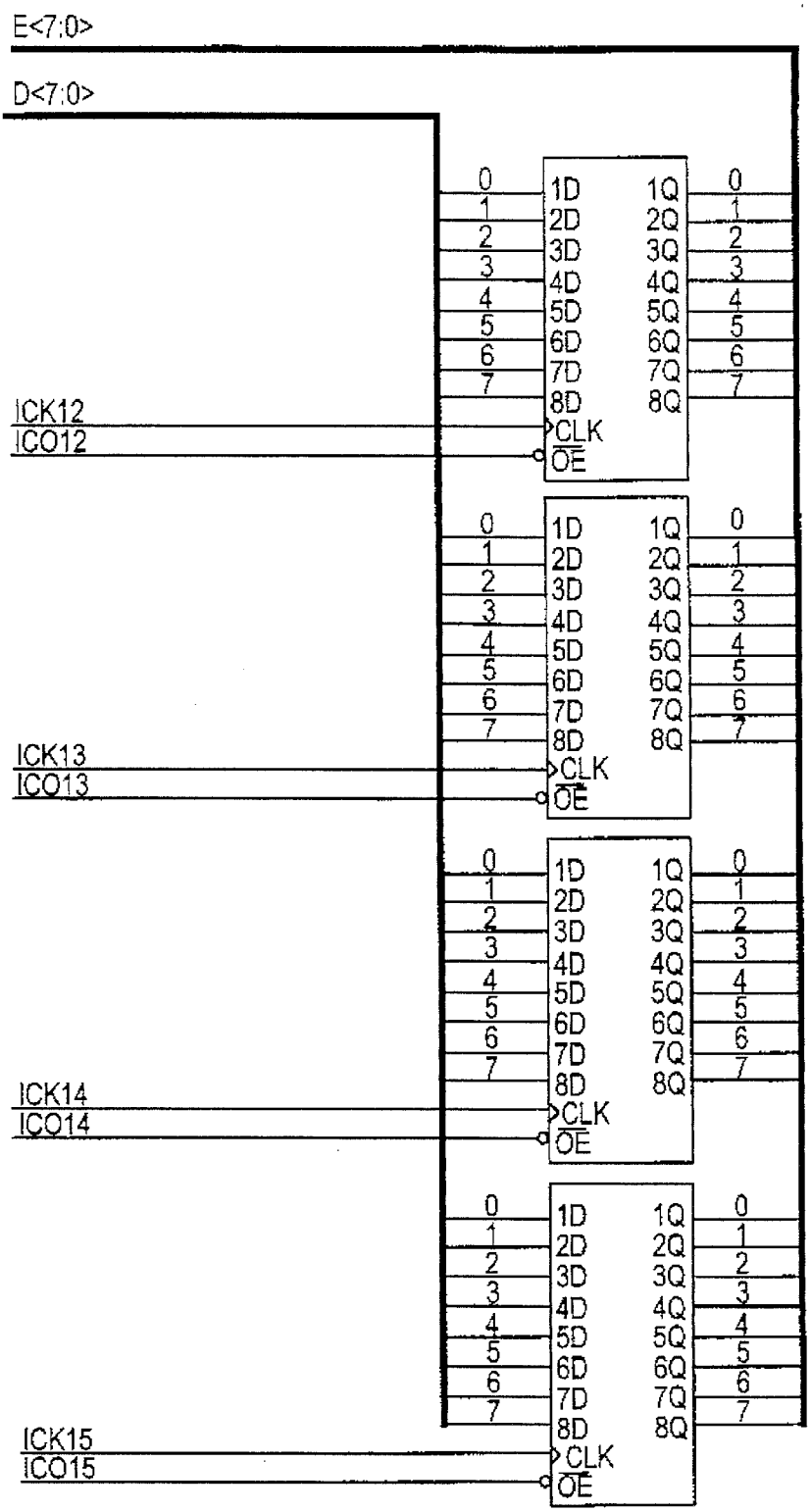
FIG. 39 is a schematic diagram of the input FIFO registers 12–15.
Figure 40:
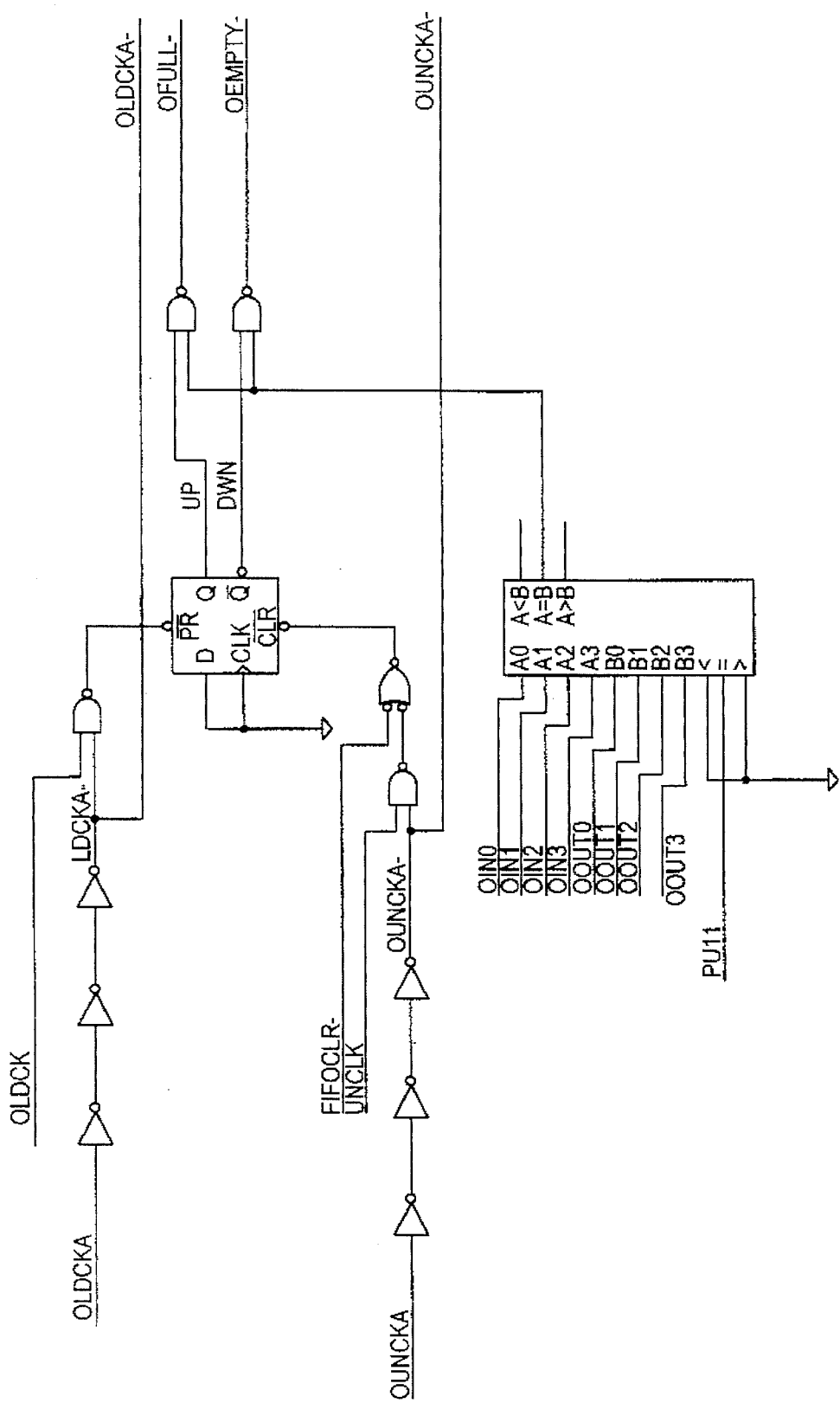
FIG. 40 is a schematic diagram of the output FIFO status flags.
Figure 41:
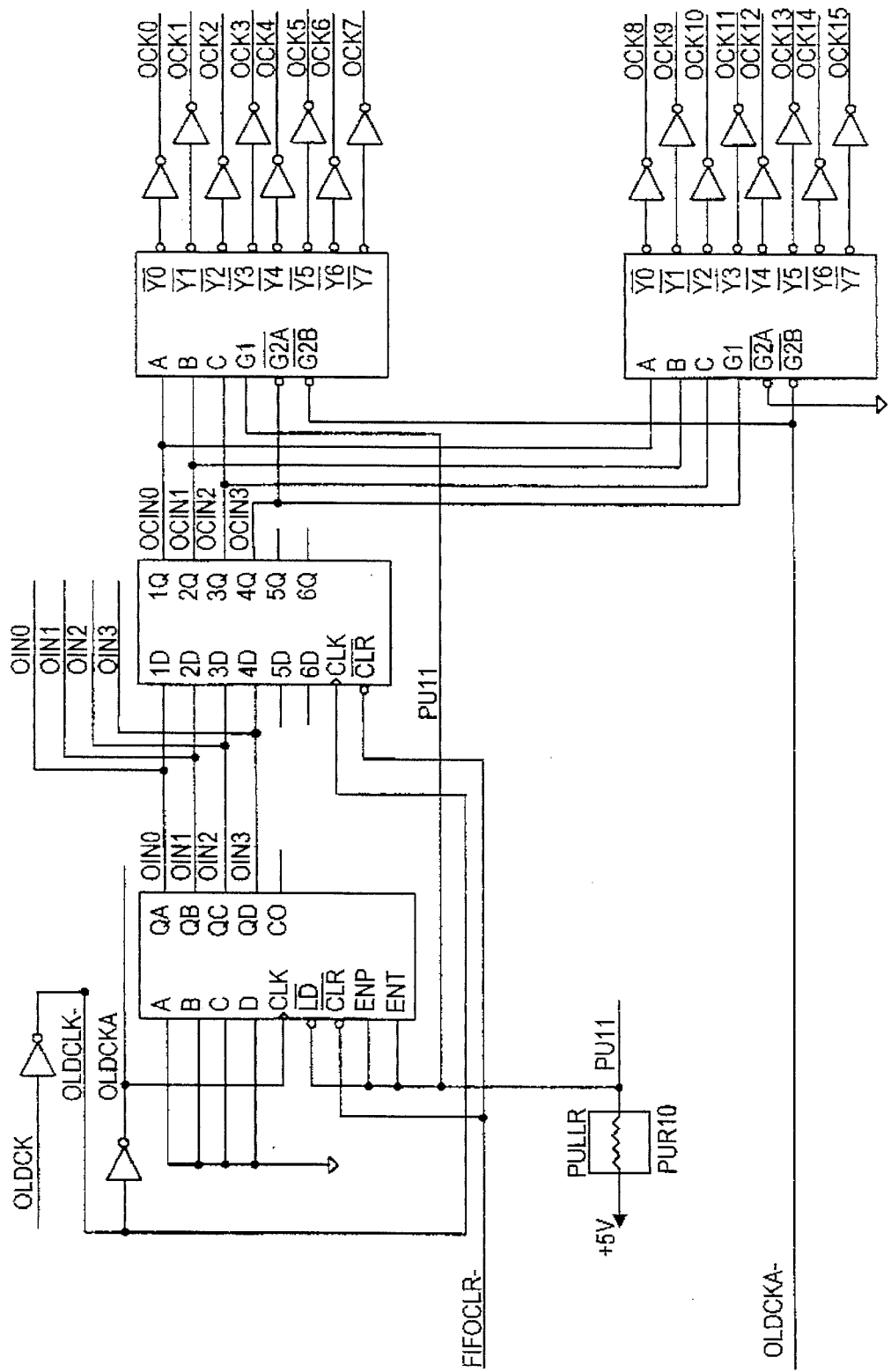
FIG. 41 is a schematic diagram of the output FIFO load sequencer.
Figure 42:
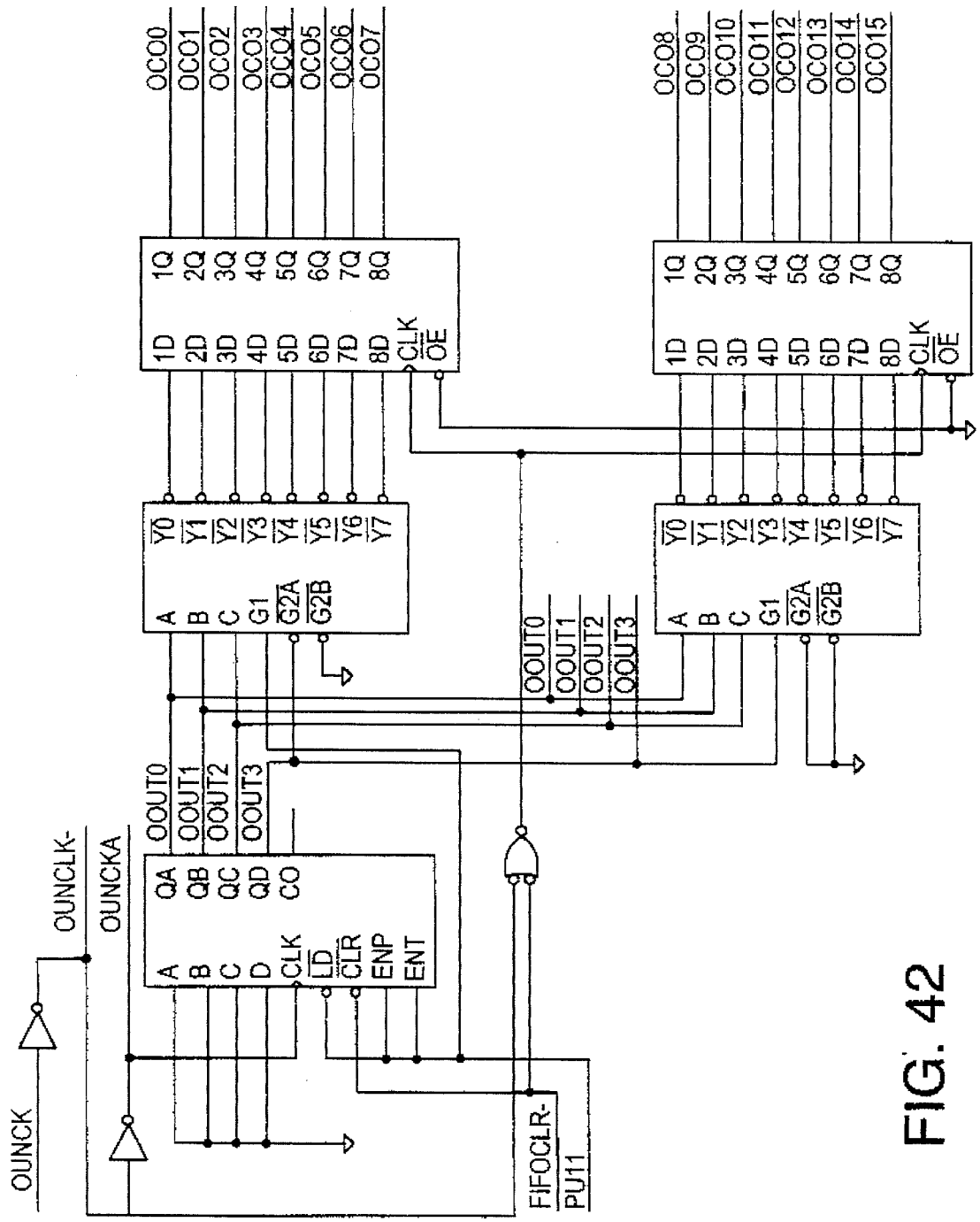
FIG. 42 is a schematic diagram of the output FIFO unload sequencer.
Figure 43:
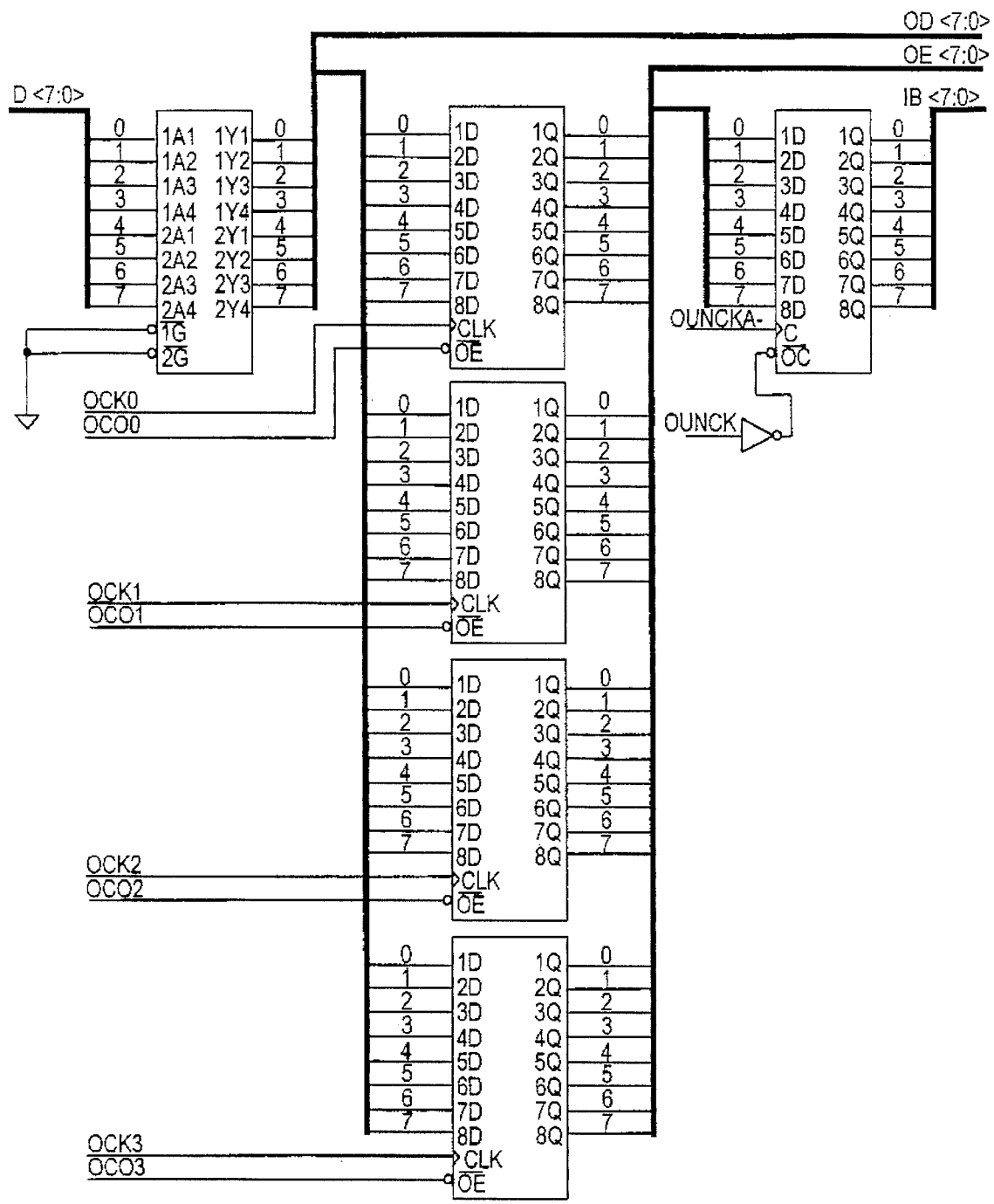
FIG. 43 is a schematic diagram of the output FIFO registers 0–3.
Figure 44:
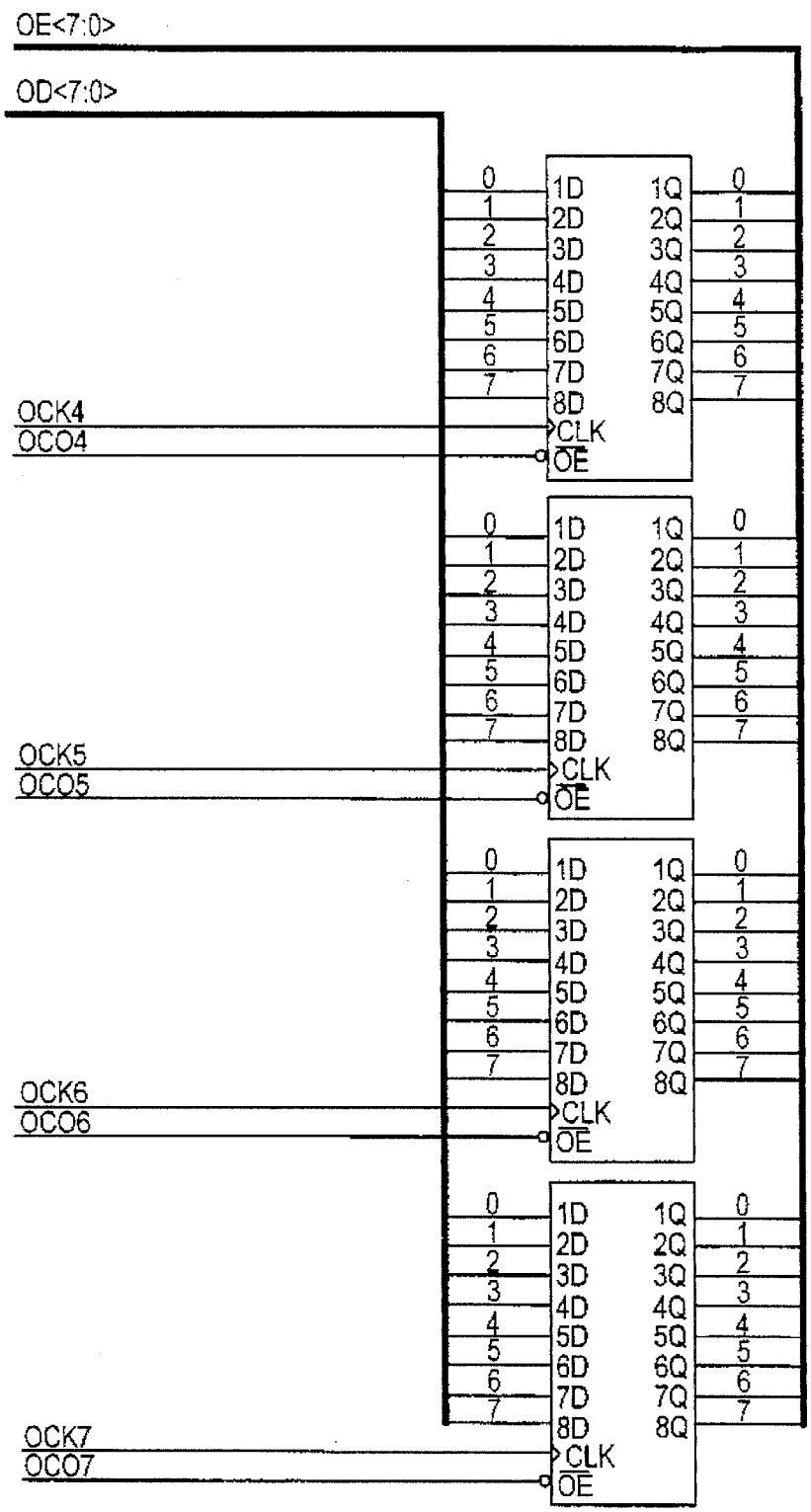
FIG. 44 is a schematic diagram of the output FIFO registers 4–7.

Turning now to FIG. 9, the FIFO address generator circuit is shown generally at 214. A more detailed representation of the FIFO address generator are shown in FIGS. 37 and 38. The FIFO address generator circuit generates either a read address or a write address. It employs two counters which it multiplexes, depending on whether the operation is a read or a write. Each time a read operation occurs the read counter is incremented and each time a write operation is incurred the write counter is incremented. In effect, the FIFO address generator circuit 214 makes the main FIFO behave as a circular buffer with first in, first out behavior. Reading occurs in the same sequence as writing.

It will be recalled that the main FIFO appears as a single port device to the host computer. The FIFO address generator circuitry is required because the host computer cannot directly generate addresses for accessing the main FIFO.

Figure 10:
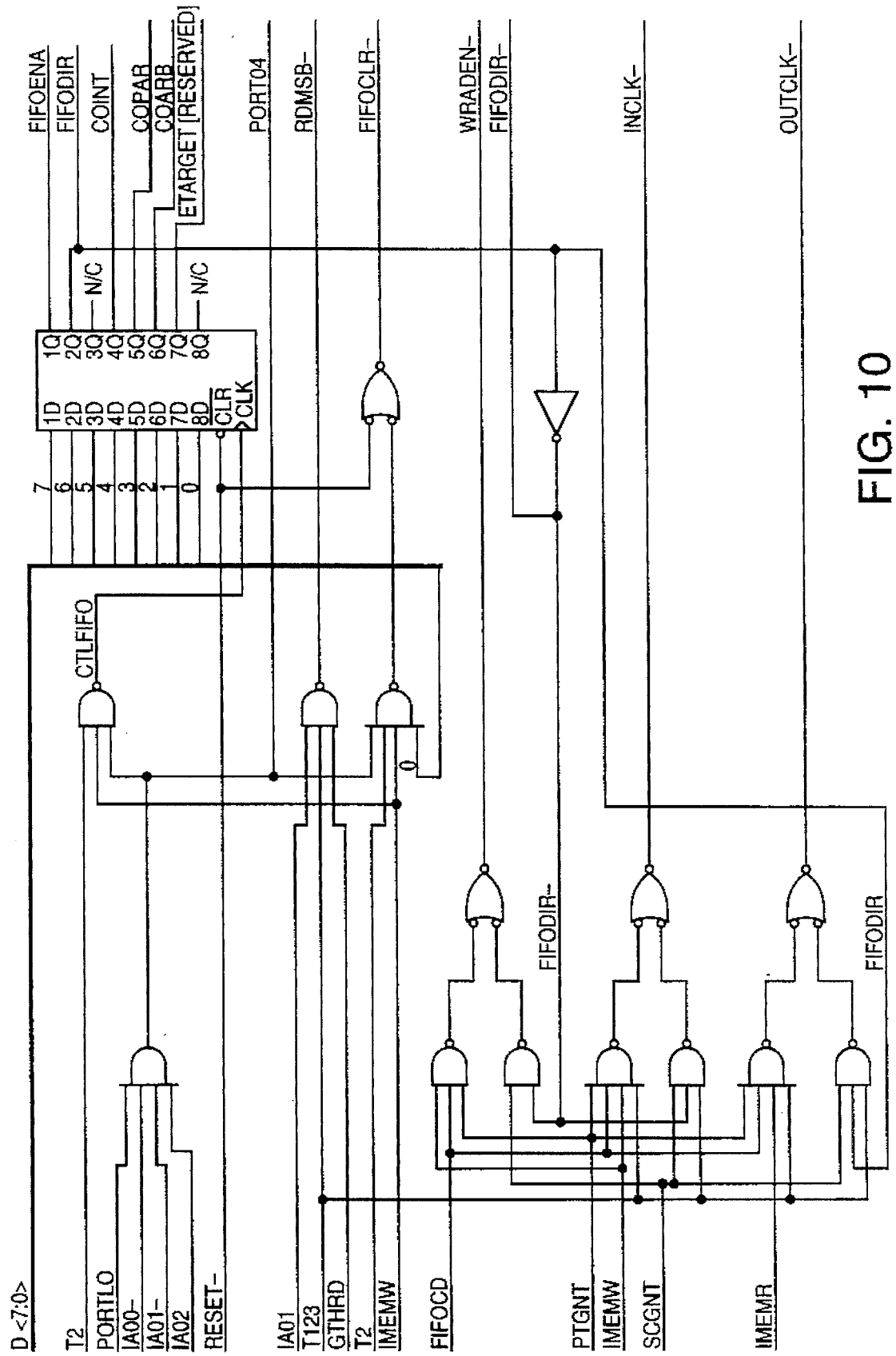
FIG. 10 is a schematic diagram of the FIFO control register and FIFO clocks.

FIG. 10 depicts the control register for the main FIFO. The circuitry in FIG. 10 also generates some clock signals which are used as control signals for the FIFO address generator circuit 214. These clock signals are designated INCLK- and OUTCLK-. The circuitry also provides the select signal for read or write addressing, designated WRADEN-. The FIFO control register comprises one of the control ports which may be accessed by the host computer. In the presently preferred embodiment, this port resides at offset 04h. As described above, control port 4 is a write register comprising one of the control ports 176 of FIG. 2. The FIFO control register provides internal control signals which control the incrementing and decrementing of the FIFO address generator.

By virtue of the circuit construction, the host computer can always access the main FIFO during the appropriate cycle. Devices on the SCSI side will only access the main FIFO if the FIFO is enabled. The circuit is capable of several different kinds of transfers, unbuffered asynchronous transfers, buffered asynchronous transfers and buffered synchronous transfers. Enabling the main FIFO allows one of the buffered transfers to take place. Disabling the main FIFO allows the unbuffered asynchronous transfer to take place. Synchronous transfers are always buffered.

The circuit of FIG. 10 provides a FIFO clear signal designated FIFOCLR-, which resets all counters on the entire interface chip 180.

Figure 11:
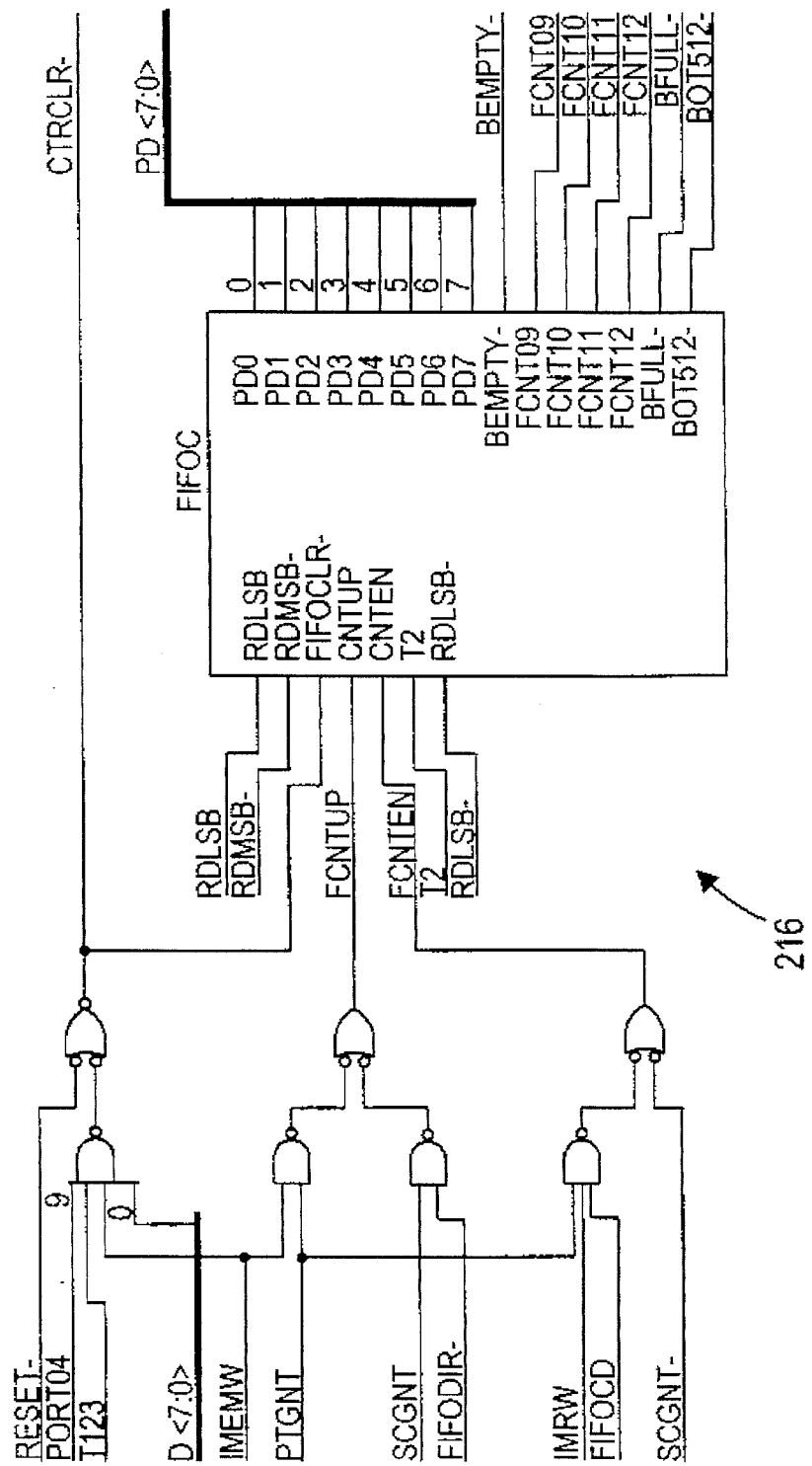
FIG. 11 is a schematic diagram of the FIFO data counter.

FIG. 11 depicts the data counter circuitry shown generally at 216. The data counter circuitry is used to keep track of the fullness within the main FIFO. A more complete representation of the FIFO data counter is found in FIG. 39.

Figure 12:
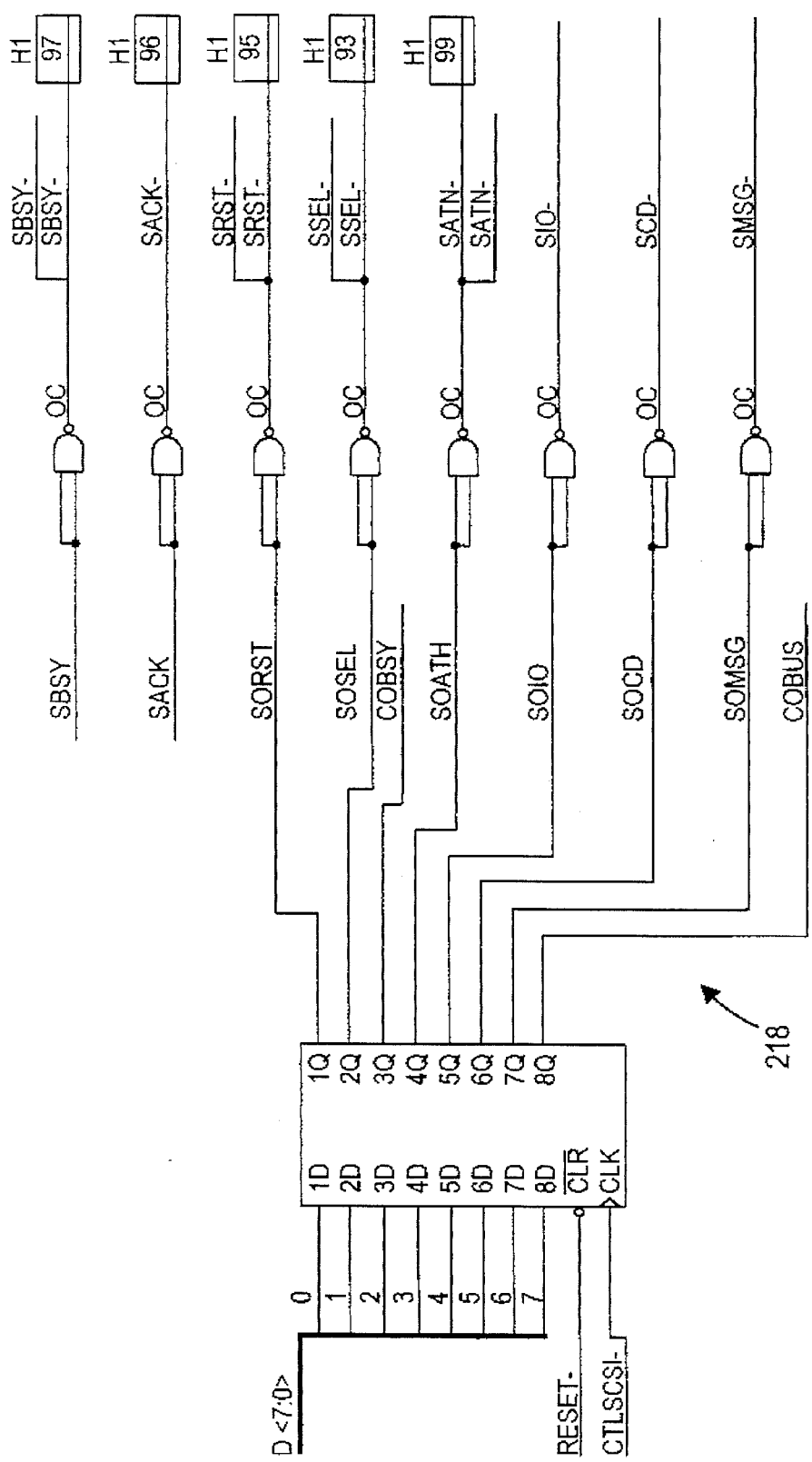
FIG. 12 is a schematic diagram of the SCSI control outputs.

Turning now to FIG. 12, the SCSI control port circuitry is depicted at 218. With reference to above Table III, the SCSI control port resides at offset 01h, valid for write operations. SCSI control leads 196 include several control signals generated by circuitry 218. For example, if a SCSI reset signal is desired, the reset signal SRST is asserted by writing to port 1 with the appropriate bit set corresponding to the reset signal. Each bit of port 1 is mapped to a selected one of the SCSI control signals. Some of the control signals such as SBSY and SACK have other control signals gated with them and are thus generated in a different way.

Figure 13:
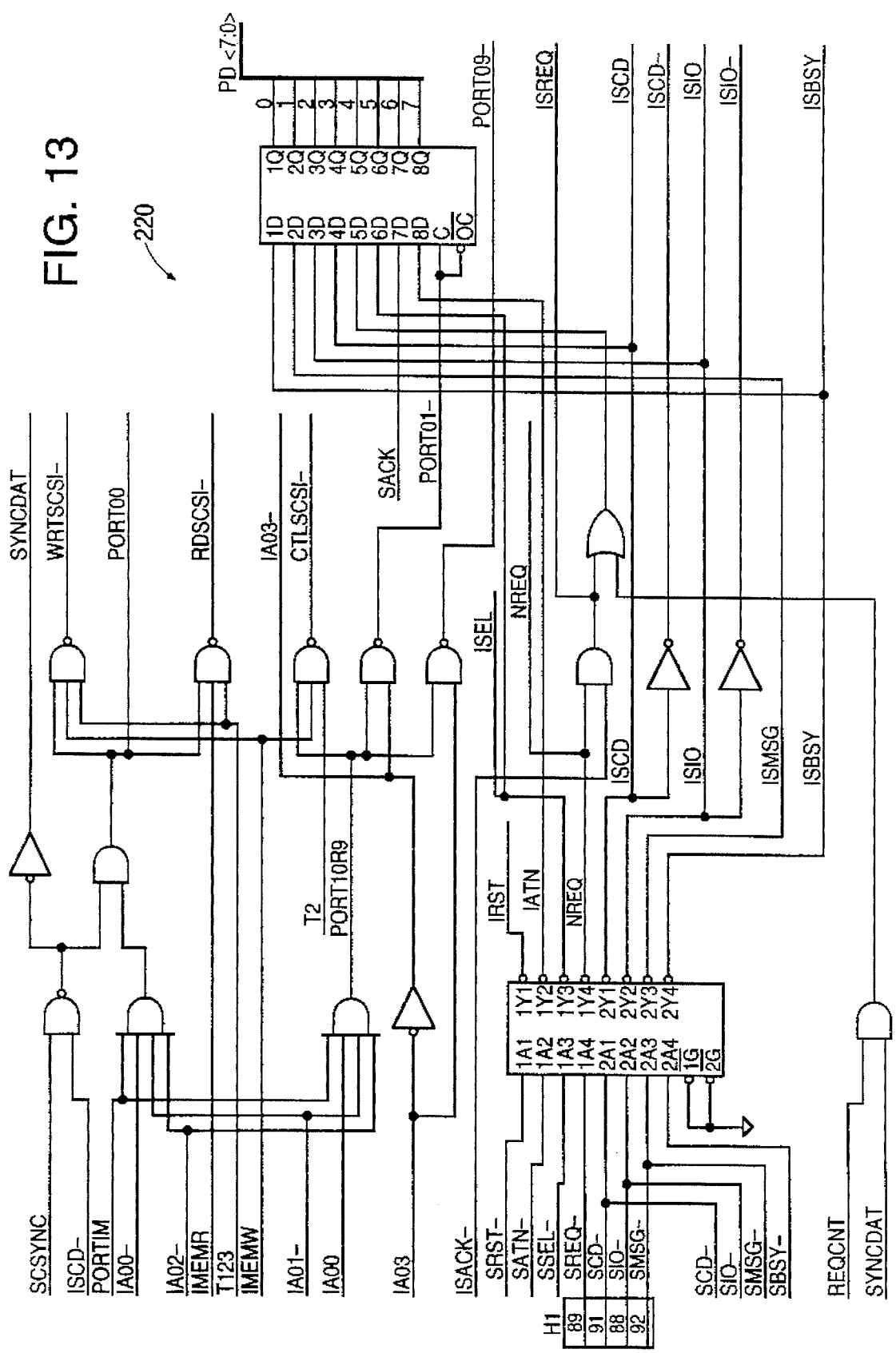
FIG. 13 is a schematic diagram of the SCSI control register and port address decode.

FIG. 13 provides the circuitry, shown generally at 220, required to read the status of the SCSI bus. The circuitry allows the control lines to be read to determine what the bus status is. For example, it is possible to determine if there is an active request or if there is a message phase or a data phase in effect. The bus phase, as well as other asynchronous bus conditions can be decoded using circuitry 220. The SCSI bus status port resides at offset 01h for read operations.

Figure 14:
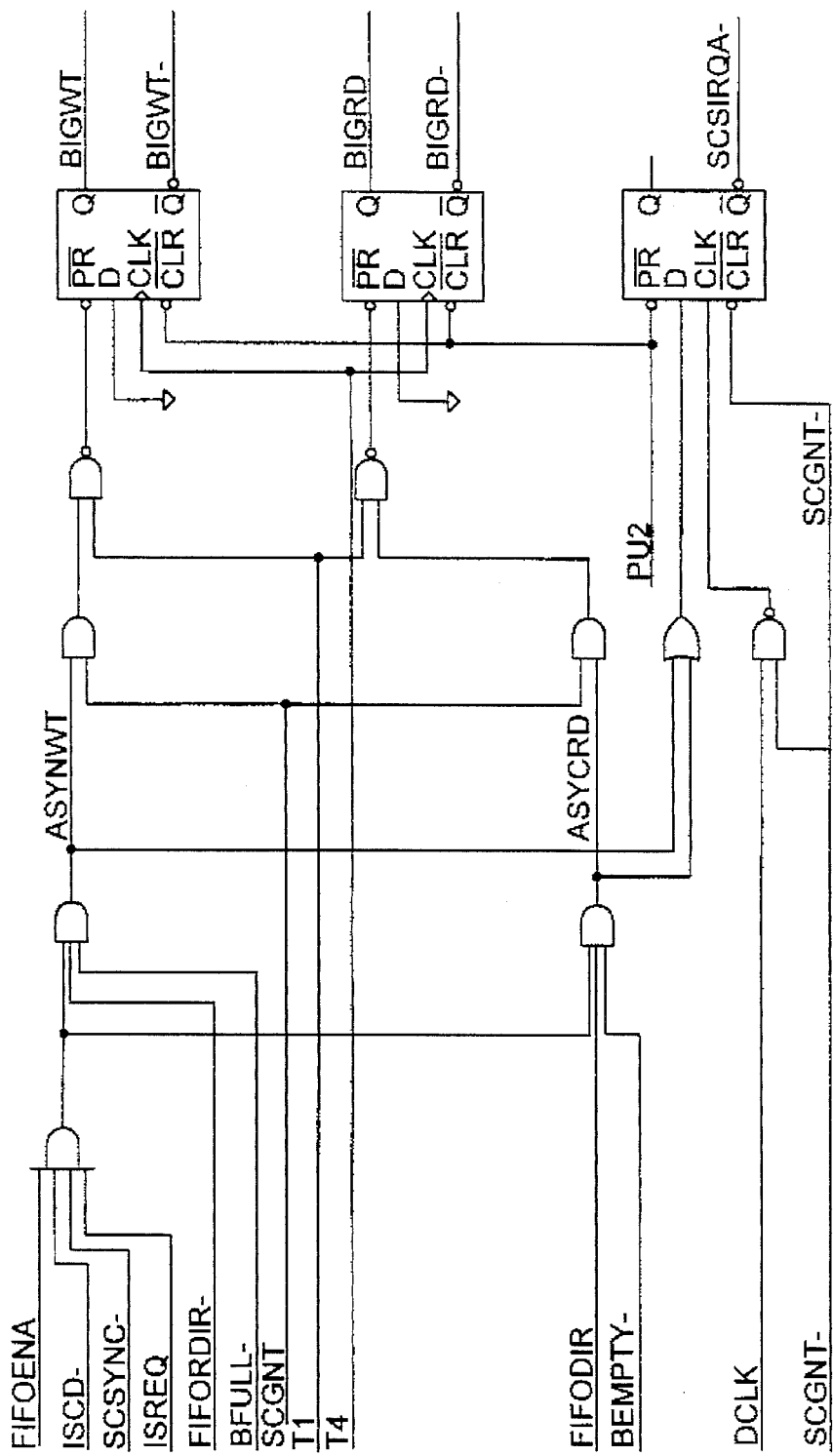
FIG. 14 is a schematic diagram of the asynchronous SCSI flow control.

FIG. 14 depicts the asynchronous SCSI flow control circuitry 222. This portion of the data flow control logic determines when the circuit is performing a FIFO read or FIFO write from the main FIFO directly onto the SCSI data port. Since this is an asynchronous operation, the I/O FIFOs are not involved. Circuitry 222 also generates a SCSI request and generates the actual cycle signal for causing a main FIFO read or write. These signals are designated BIGWT and BIGRD, for the write and read signals, respectively. Boolean NOT signals of both read and write signals are also provided.

Figure 15:
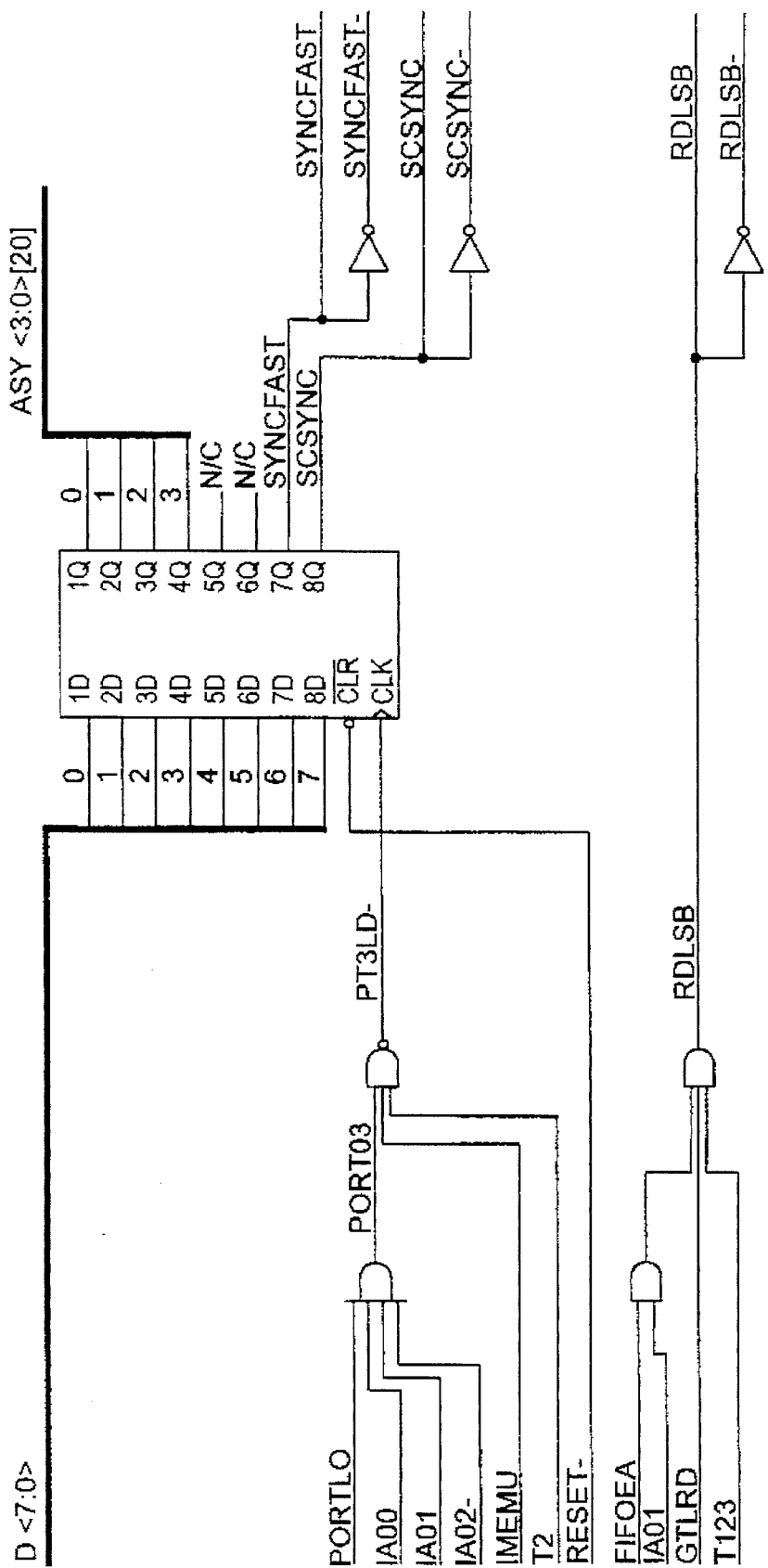
FIG. 15 is a schematic diagram of the ID register (high byte) and extension buffer.
Figure 16:
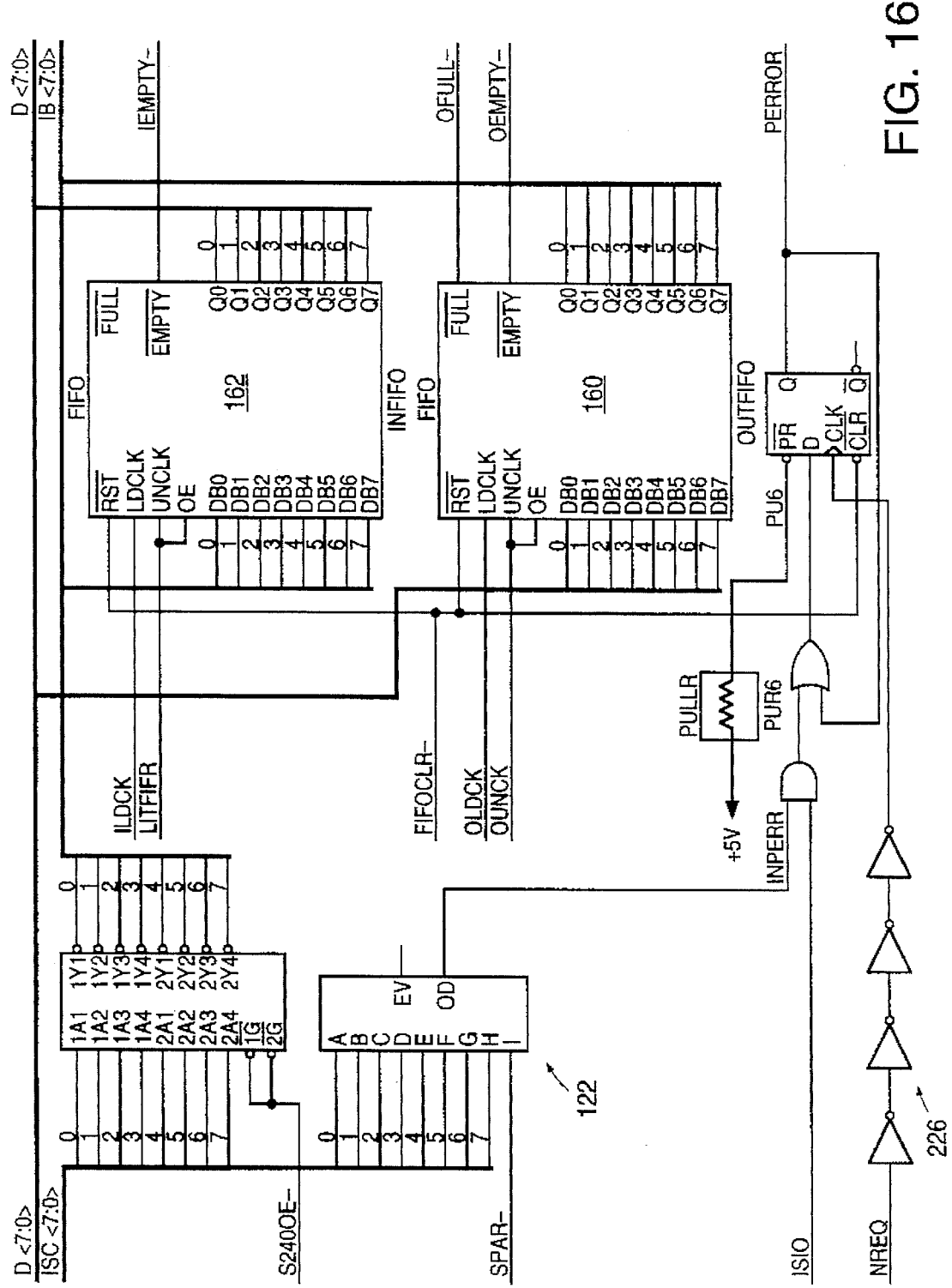
FIG. 16 is a schematic diagram of the synchronous SCSI data path and parity checker.

FIGS. 15 and 16 illustrate the circuitry which provides the chip ID byte used by the MCA architecture. This ID byte is also readable by the host computer if ISA architecture is selected. Specifically, the portion of the circuit illustrated in FIG. 15 generates the high byte or most significant portion of the ID. Referring to Table III, these ID codes are read from ports 5 and 6 (offsets 5 and 6).

Another control register can be used for SCSI mode control and loopback operation. This control register is specifically for selecting whether synchronous or asynchronous transfers are to be performed, and to select the synchronous data rate for synchronous transfers. The circuit includes an echo register which forms part of the control and status port blocks 176 and 178 of FIG. 2. The echo register is a single port which can be read from or written to. When a given value is written to the echo register it is echoed back or repeated for reading. The echo register is thus useful for system integrity self-testing or as a flag port to convey software flags or the like. In Table III the echo register resides at offset 7.

FIG. 16 depicts the synchronous SCSI data path and parity checking circuitry. A more detailed circuit description is given in FIGS. 33–39. Referring to FIG. 16, the input FIFO 162 and the output FIFI 160 are illustrated. Also illustrated generally at 122 are the SCSI data buffers shown also in FIG. 2. The circuitry includes a parity checker circuit used to determine if there is a parity error PERROR condition. The parity checker circuitry is shown generally at 226. The input and output FIFOs are both only 8 bits wide. The 9th parity bit normally found on the data bus is not carried past the input buffers. Hence the separate parity checking circuitry is provided.

Figure 17:
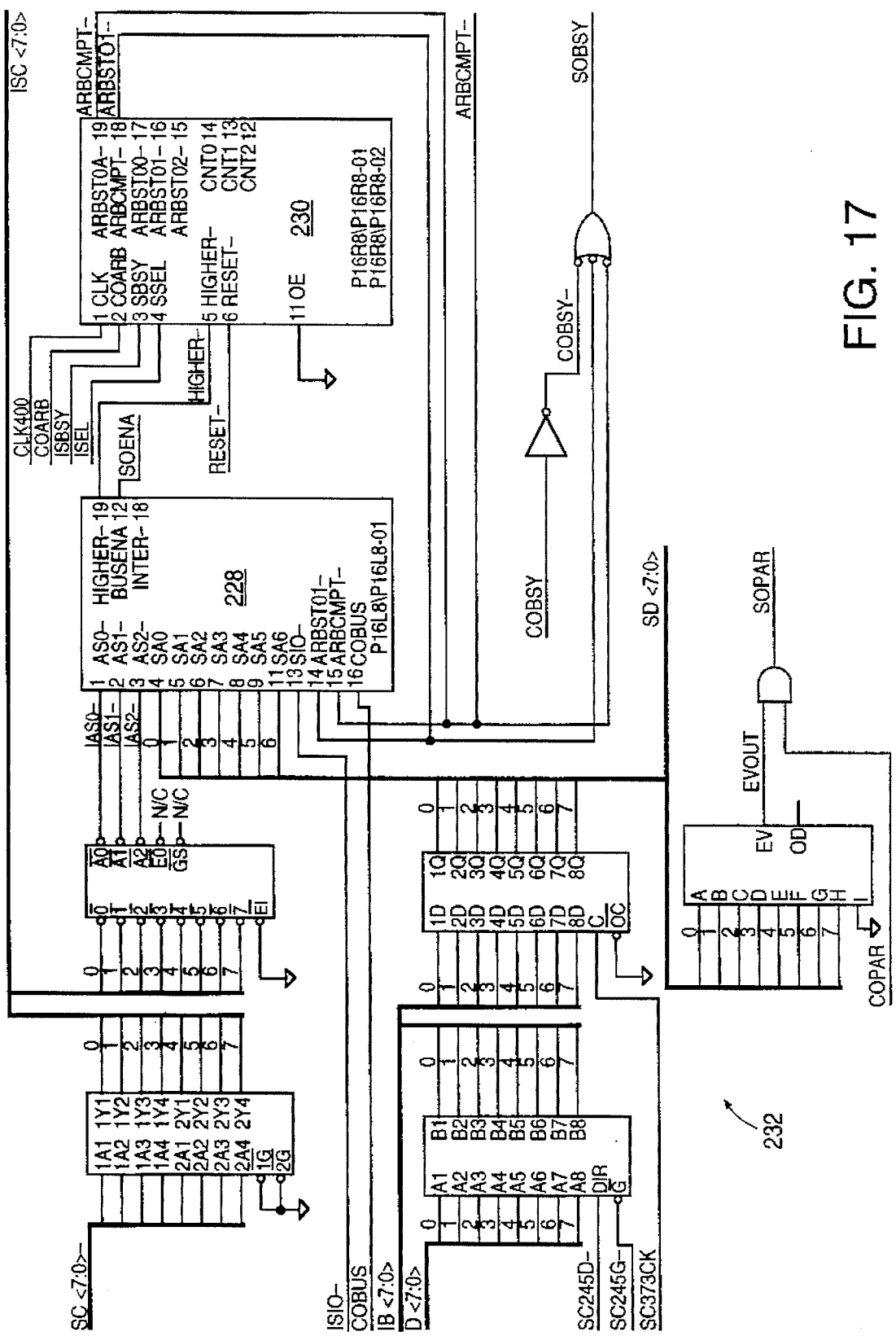
FIG. 17 is a schematic diagram of the asynchronous SCSI data path, arbitration, and parity generator.

Turning now to FIG. 17, the asynchronous SCSI data path circuitry is illustrated. This circuitry includes arbitration logic which is implemented using two programmable array logic circuits (PALS), designated at 228 and 230. The equations for the PALS are provided in the attached Appendix. To the left of PALS 228 and 230 there is a priority encoder circuit 232 which determines which SCSI device will win during the SCSI arbitration phase. Each SCSI device has an ID assigned to it. When the device wishes to arbitrate for the bus, it pulls the bit on the SCSI data bus corresponding to its ID during the arbitration phase of the cycle. If more than one device has similarly done so during this arbitration phase, the one with the highest assigned priority will get access to the bus. The priority encoder compares its assigned ID with all others requesting access to the bus. The priority encoder simply selects the highest priority of all IDs presently on the bus and provides that information to PAL 228. PAL 228 then makes the determination whether it or some other device has won the arbitration priority contest.

Figure 18:
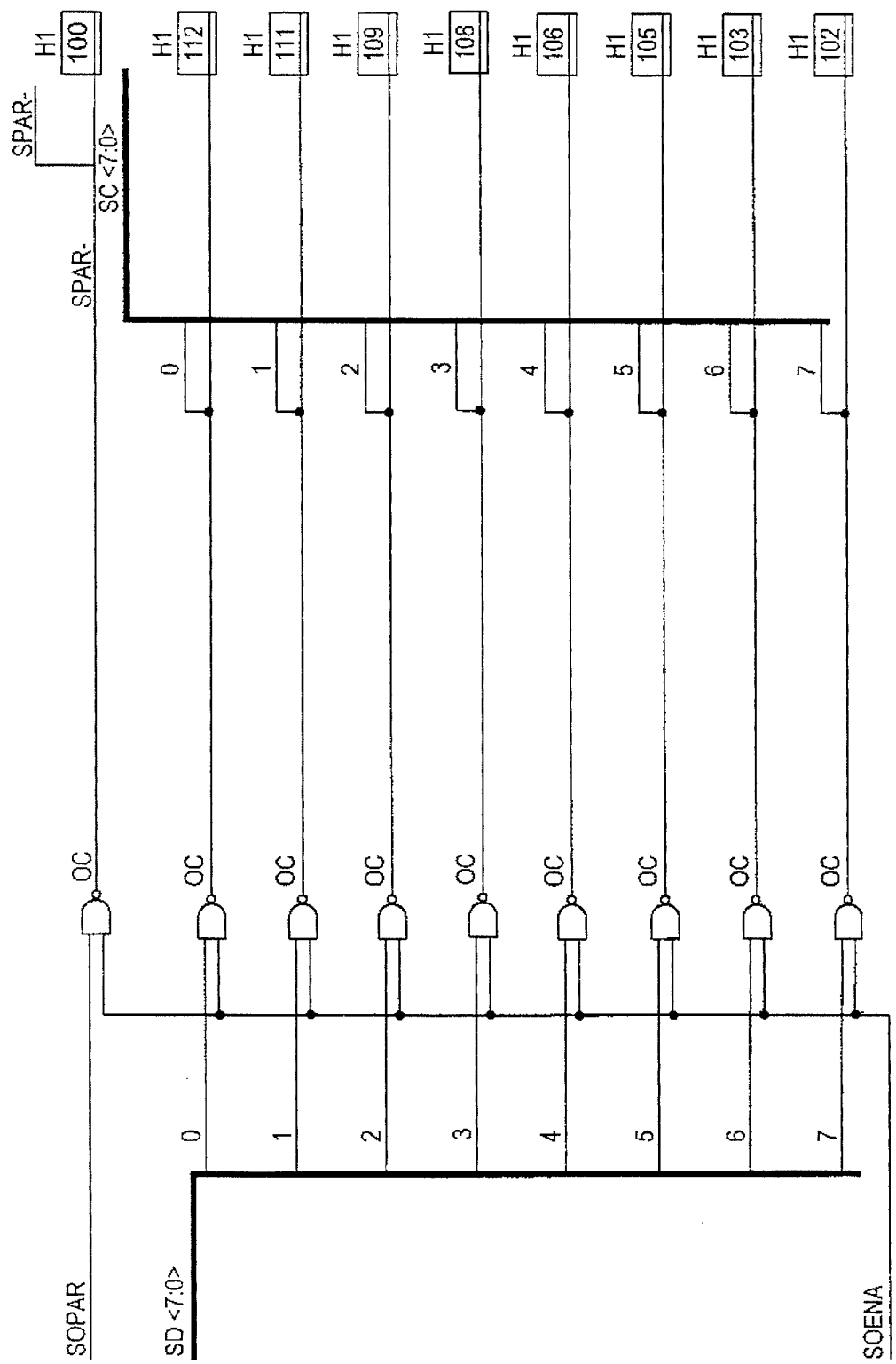
FIG. 18 is a schematic diagram of the SCSI data output drivers.

The SCSI data buffers 122 (FIG. 2) are shown in more detail in FIG. 18. As illustrated, these circuits provide the data output drivers for the SCSI side of the circuit. Open collector driver switches are used to conform to the SCSI specification.

Figure 19:
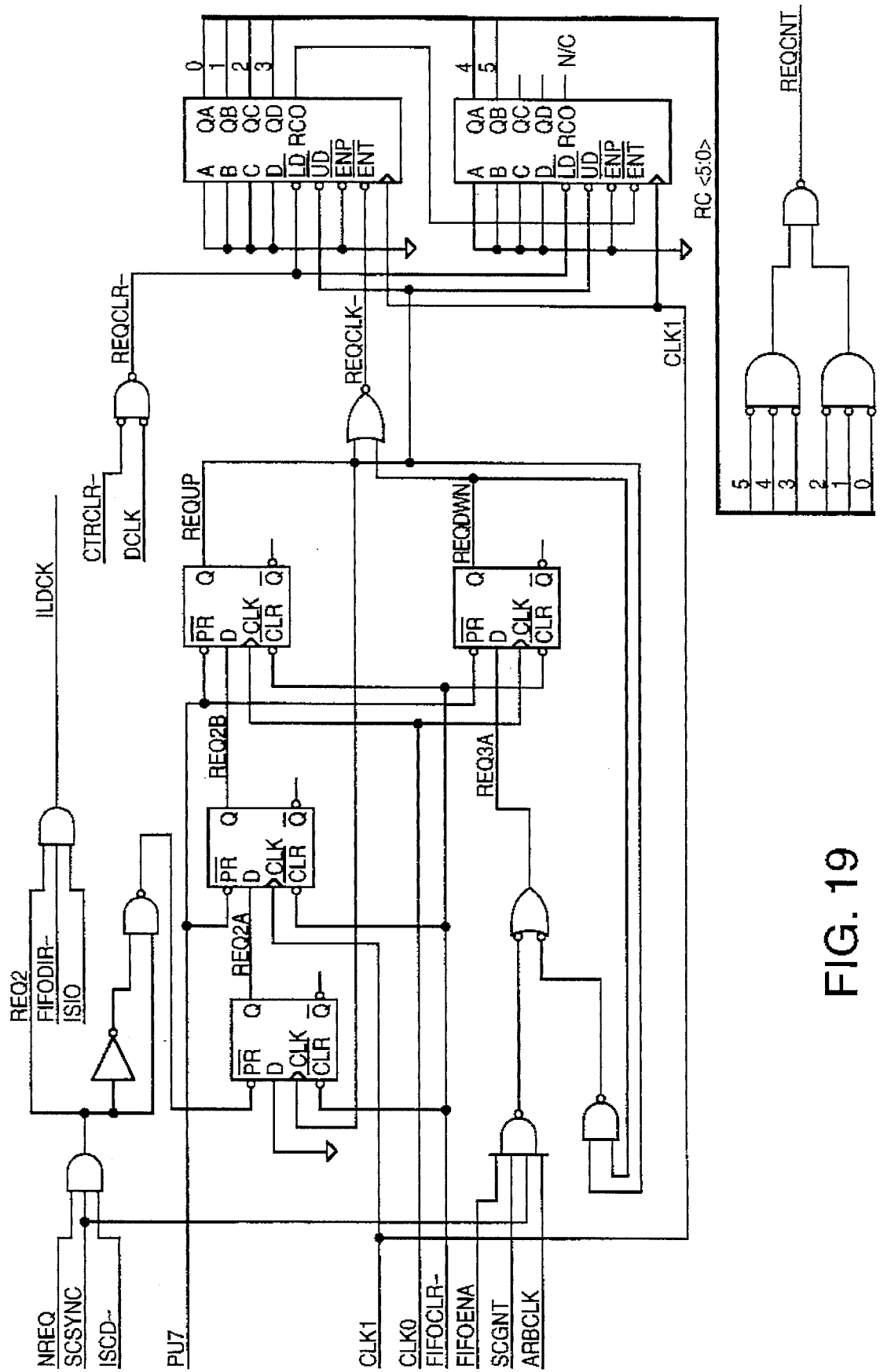
FIG. 19 is a schematic diagram of the synchronous request counter.

FIG. 19 depicts the synchronous request counter. In synchronous mode it is necessary to keep a count of the number of requests that come in. When those requests are serviced, the count is decremented. The circuitry of FIG. 19 keeps this synchronous request count. The output REQCNT indicates that there is a nonzero count. This signal is used as part of the data flow control logic to indicate that a transfer of data is necessary due to active requests.

Figure 20:
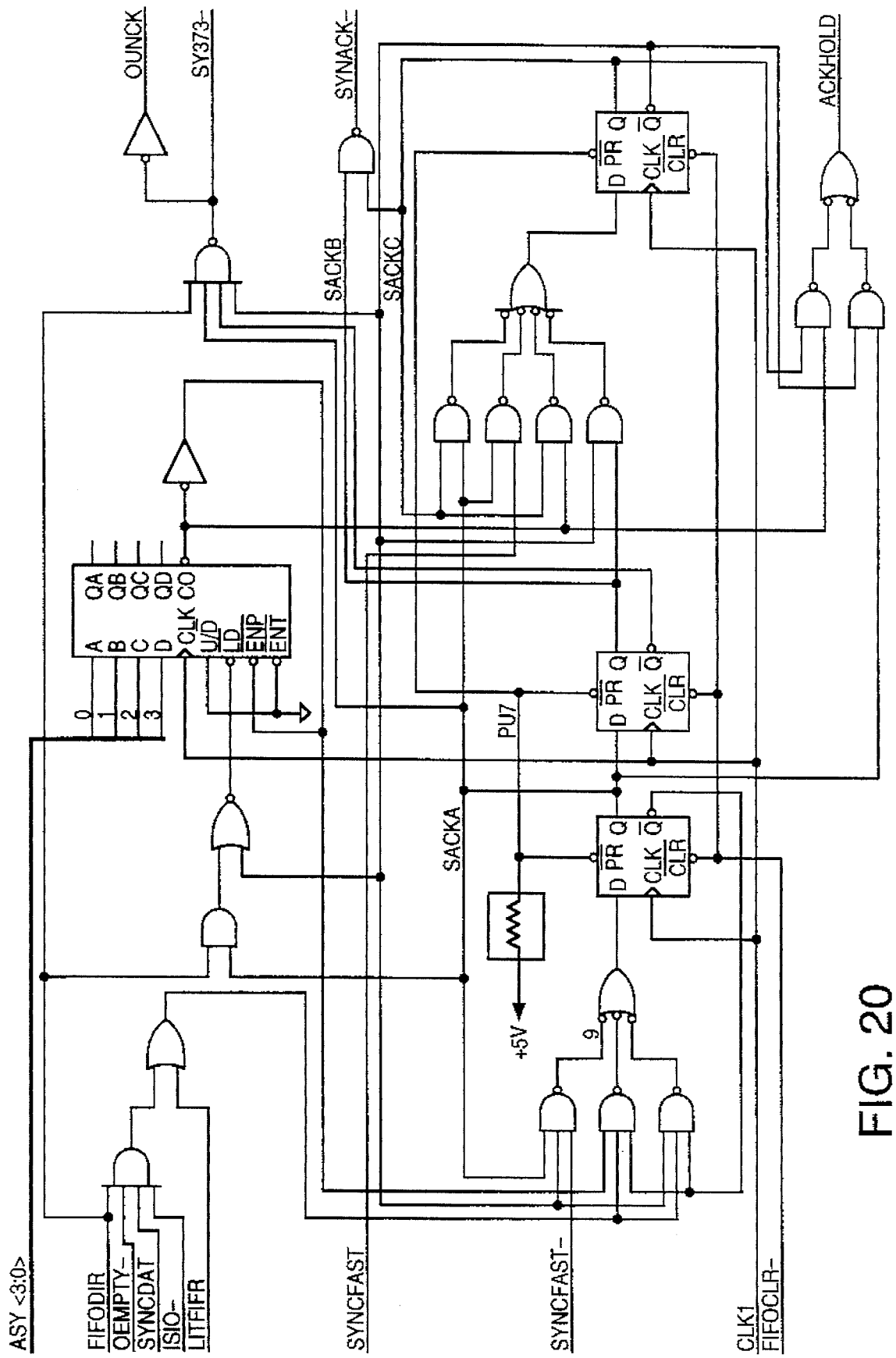
FIG. 20 is a schematic diagram of the synchronous SCSI acknowledge.

The synchronous acknowledge logic is illustrated in FIG. 20. This circuitry is part of the synchronous acknowledge logic circuitry 172 of FIG. 2. It provides a timing circuit for generating acknowledge signals which depend on the status of the data transfer and the actual length of the synchronous cycle. The ASY bus provides bits which are used to signify the actual length of the synchronous cycle as provided by the synchronous control register. The data rate is set to match what was negotiated at the beginning of the synchronous transfer cycle. This rate determines how far apart the acknowledge signals ACK are spaced. Acknowledges are sent on a per byte basis. The target asserts a request for a byte and the circuit then asserts an acknowledge ACK for each request so that there is a one to one correspondence between bytes transferred and requests asserted by the target and acknowledges asserted by the circuit of the invention. The difference between synchronous and asynchronous transfer is that with synchronous transfer there is an offset between requests coming in and acknowledges going out. In asynchronous mode the requests are interleaved with acknowledges so that a direct one to one interlocked operation occurs. In the synchronous mode requests can be buffered and then acknowledged some time later. The presently preferred embodiment provides a latency of 16 so that a target can send up to 16 requests before and acknowledgement must be made. The circuitry of FIG. 20 keeps track of this information concerning the number of requests received and whether an acknowledge has been sent. Acknowledges do not occur until the data is offloaded into the main FIFO from the input FIFO. In the other flow direction, acknowledges of output data do not occur until the data actually goes out onto the bus, which can account for some time delay.

Figure 21:
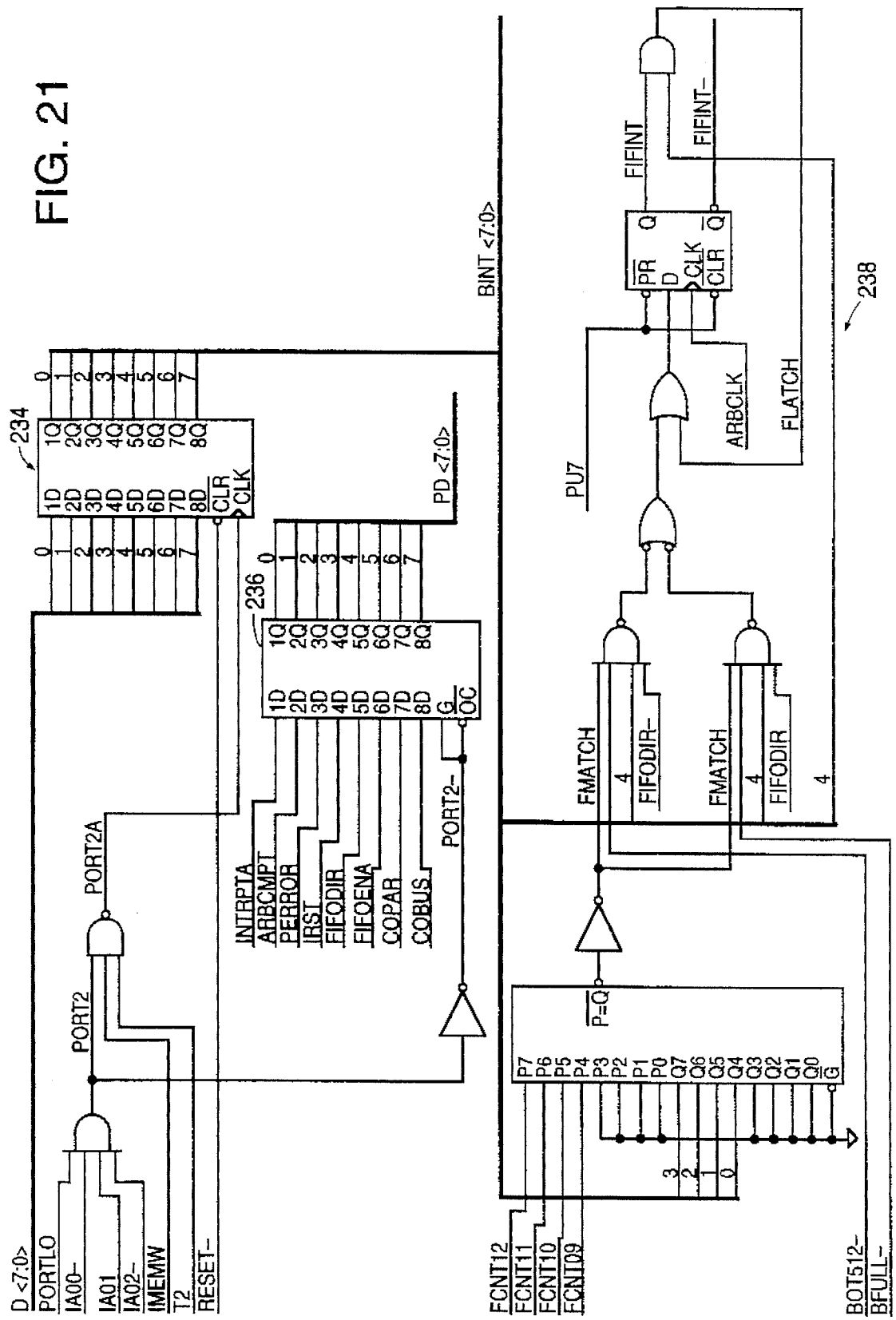
FIG. 21 is a schematic diagram of the FIFO interrupt and interrupt control register.
Figure 22:
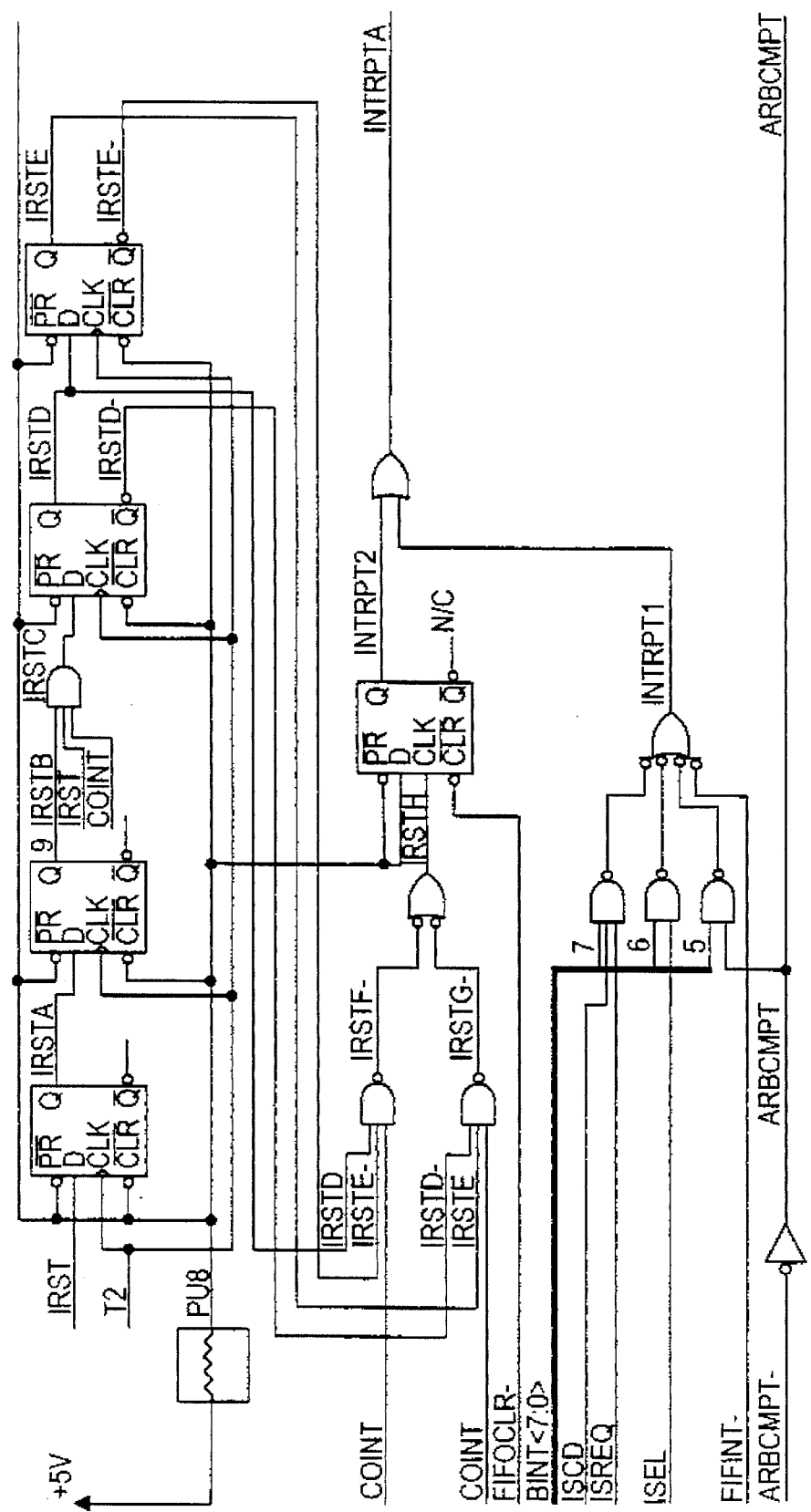
FIG. 22 is a schematic diagram of the interrupts.

The circuit supports the necessary interrupt logic needed to operate on either MCA or ISA architectures. The interrupt logic circuitry is shown in FIGS. 21 and 22. Included in the circuit of FIG. 21 is an interrupt control register 234 which contains 4 bits which the main FIFO count is compared to. When the count of the main FIFO reaches the number stored in interrupt control register 234, an interrupt is sent to the host computer. The interrupt control register also contains 4 mask bits which are used to mask out individual interrupt conditions.

The circuit also includes an interrupt status register 236 which can be interrogated by the host computer to determine the nature of various interrupt conditions that may have occurred. While primarily used for interrupt status, this register can also be used to store other status conditions which can then be read through the interrupt status register port. In Table III the interrupt status is read by accessing port 02h. The interrupt mask comprising a portion of interrupt control register 234 is located at port 09h.

There are five interrupt conditions which the present embodiment will respond to. One is the main FIFO fullness interrupt. The comparators and logic for determining main FIFO fullness is shown generally at 238. The other interrupt conditions include the SCSI reset interrupt, a command request interrupt (for designating that the target is requesting a command byte from the host), the SCSI select phase interrupt (used by the device that won arbitration in selecting the device it wishes communication with) and the arbitration phase completion interrupt (asserted by the winner of the arbitration phase).

Figure 23:
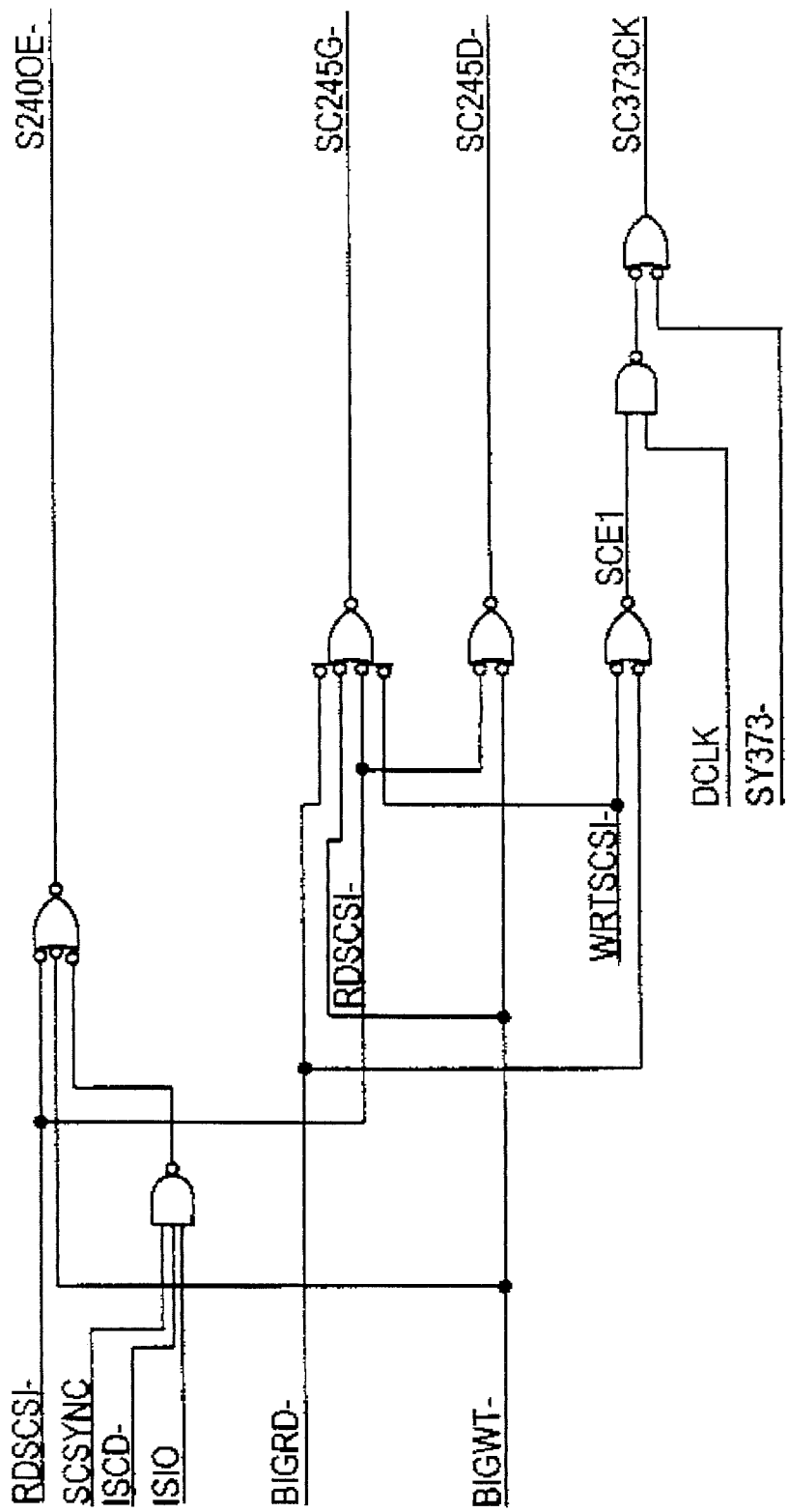
FIG. 23 is a schematic diagram of the SCSI data gating.

FIG. 23 depicts the SCSI data gating circuitry which is part of the data flow control logic. This circuitry enables the different buffers in the SCSI data path to ensure data flow in the proper direction.

Figure 24:
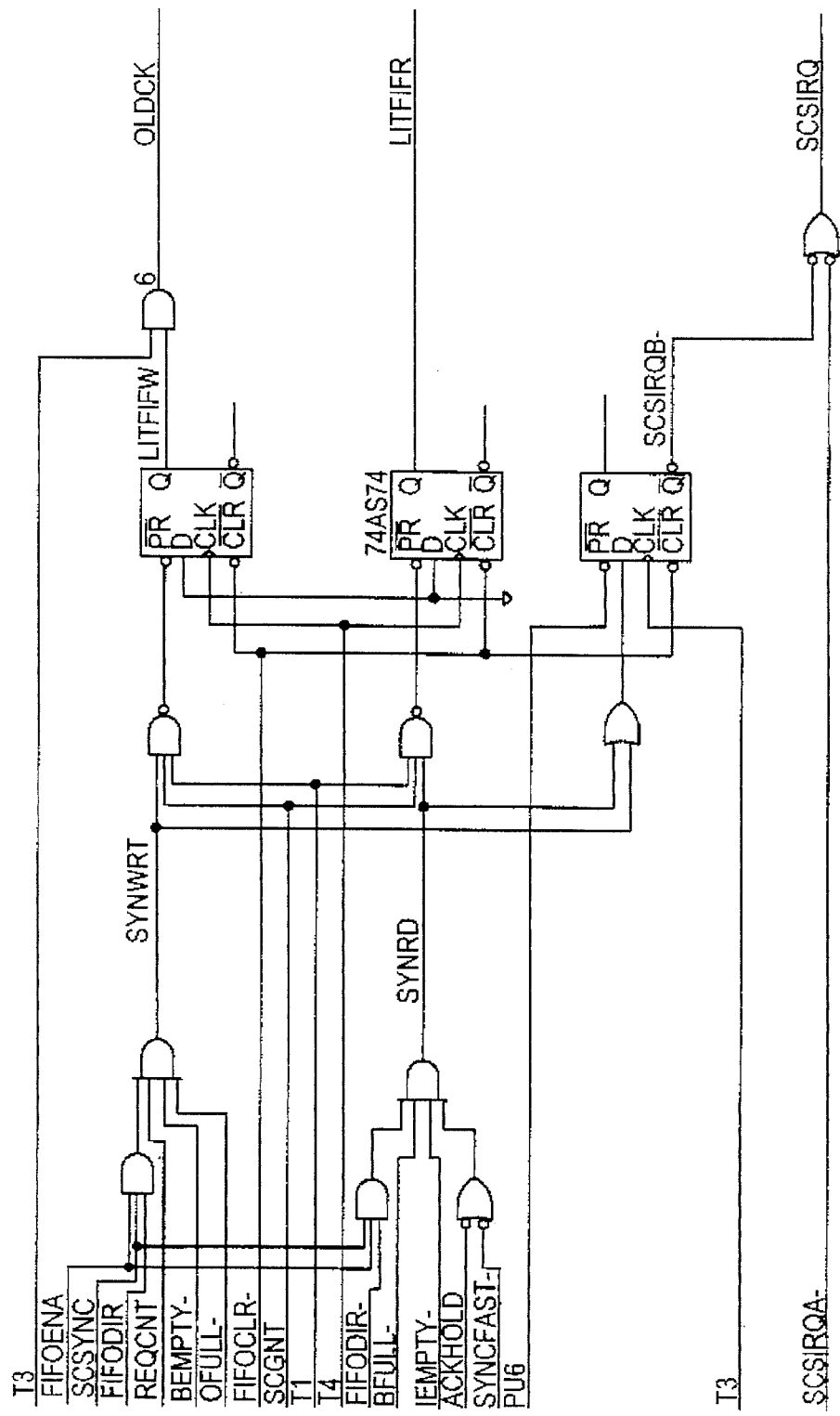
FIG. 24 is a schematic diagram of the synchronous SCSI flow control.

FIG. 24 depicts synchronous SCSI flow control logic for controlling the synchronous SCSI data flow. This circuit enables the transfer of data between the main FIFO and the I/O FIFO, taking into account the status of the I/O FIFO.

Figure 25:
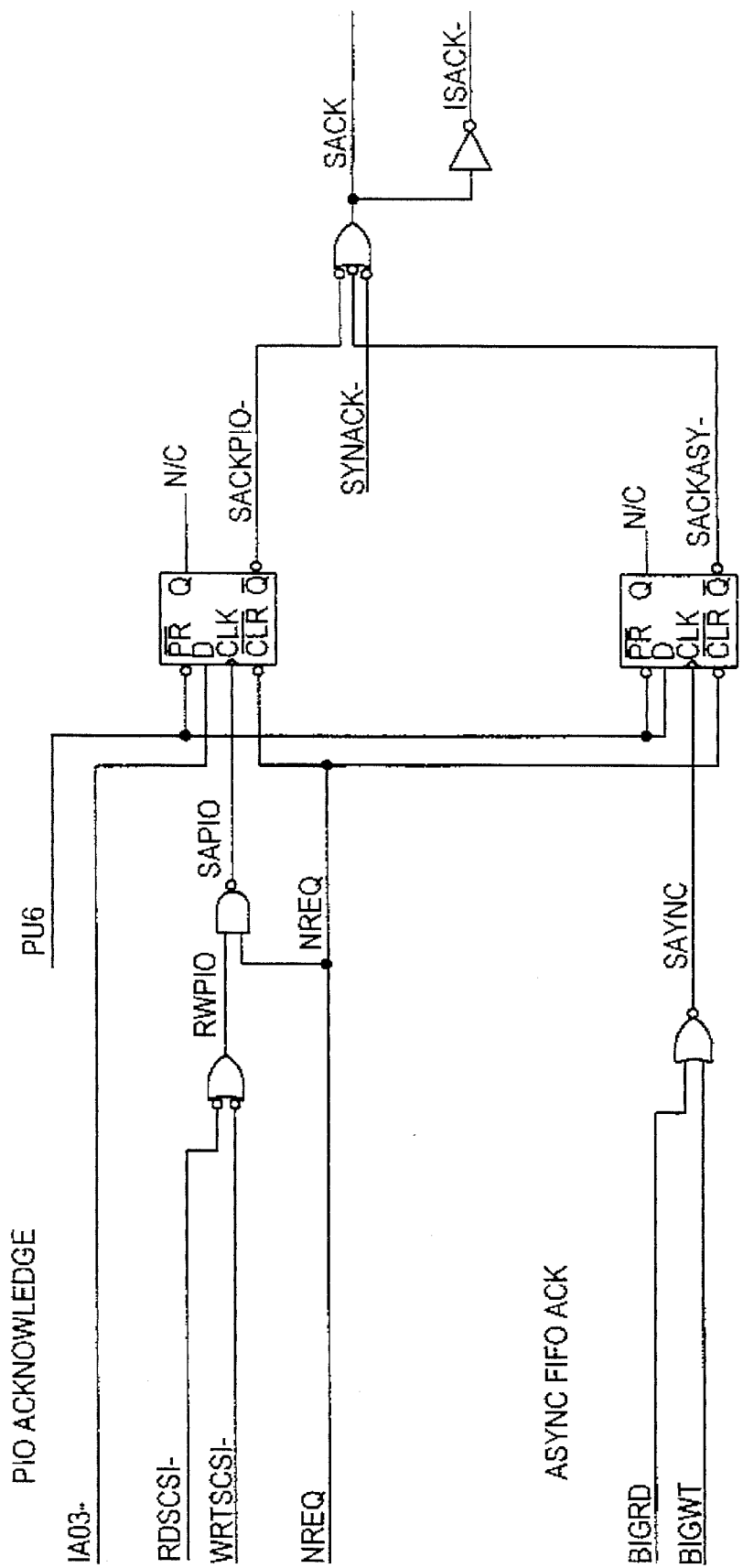
FIG. 25 is a schematic diagram of the SCSI acknowledge.

The SCSI acknowledge logic is shown in FIG. 25. The circuitry is related to the synchronous SCSI acknowledge circuitry of FIG. 20, but also includes the asynchronous acknowledges which are generated either in unbuffered transfers by reading and writing port 0 add in buffered transfers which are reading and writing to and from the main FIFO. By reading through port 0 the circuit automatically generates an acknowledge. By reading through port 8 the automatic acknowledge feature is disabled to allow the host computer to inspect a message byte, determine if the message byte is to be handled and then to take action or not. In other words, the circuit provides two SCSI data ports, port 0 which provides automatic acknowledge generation and port 8 which does not. Address bit 3 (IA03) is used to designate port 8 or port 0.

The system includes address buffers coming from the host bus. These buffers comprise inverters which convert the logical polarity of the signals.

Figure 26:
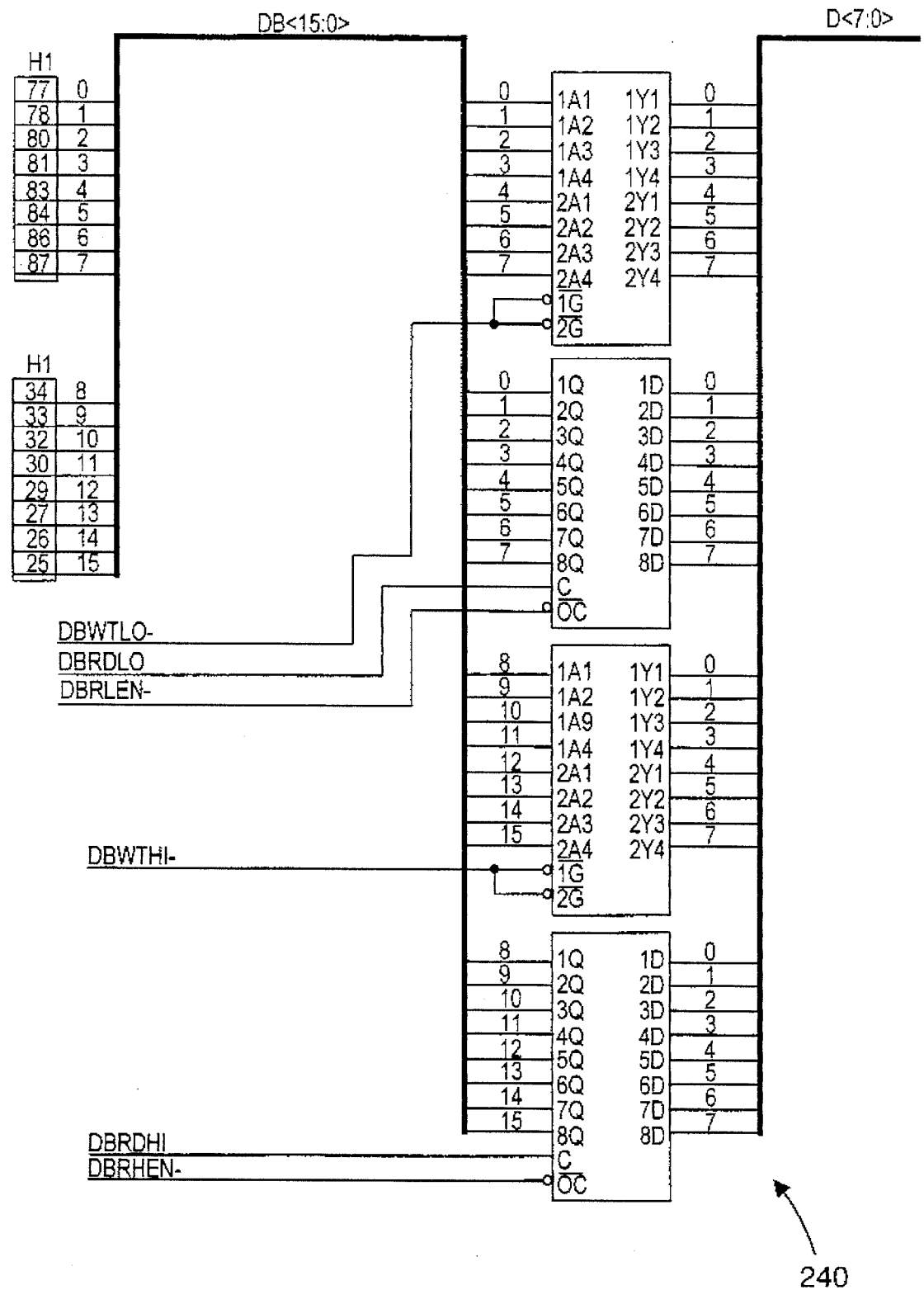
FIG. 26 is a schematic diagram of the data bus buffers.

FIG. 26 illustrates a data bus buffers at 240 and the internal RAM 258. The circuit further includes an internal RAM and a latch for latching the address when configured in the MCA mode. This latch is necessary because the address on the bus is not latched in the MCA architecture.

Figure 27:
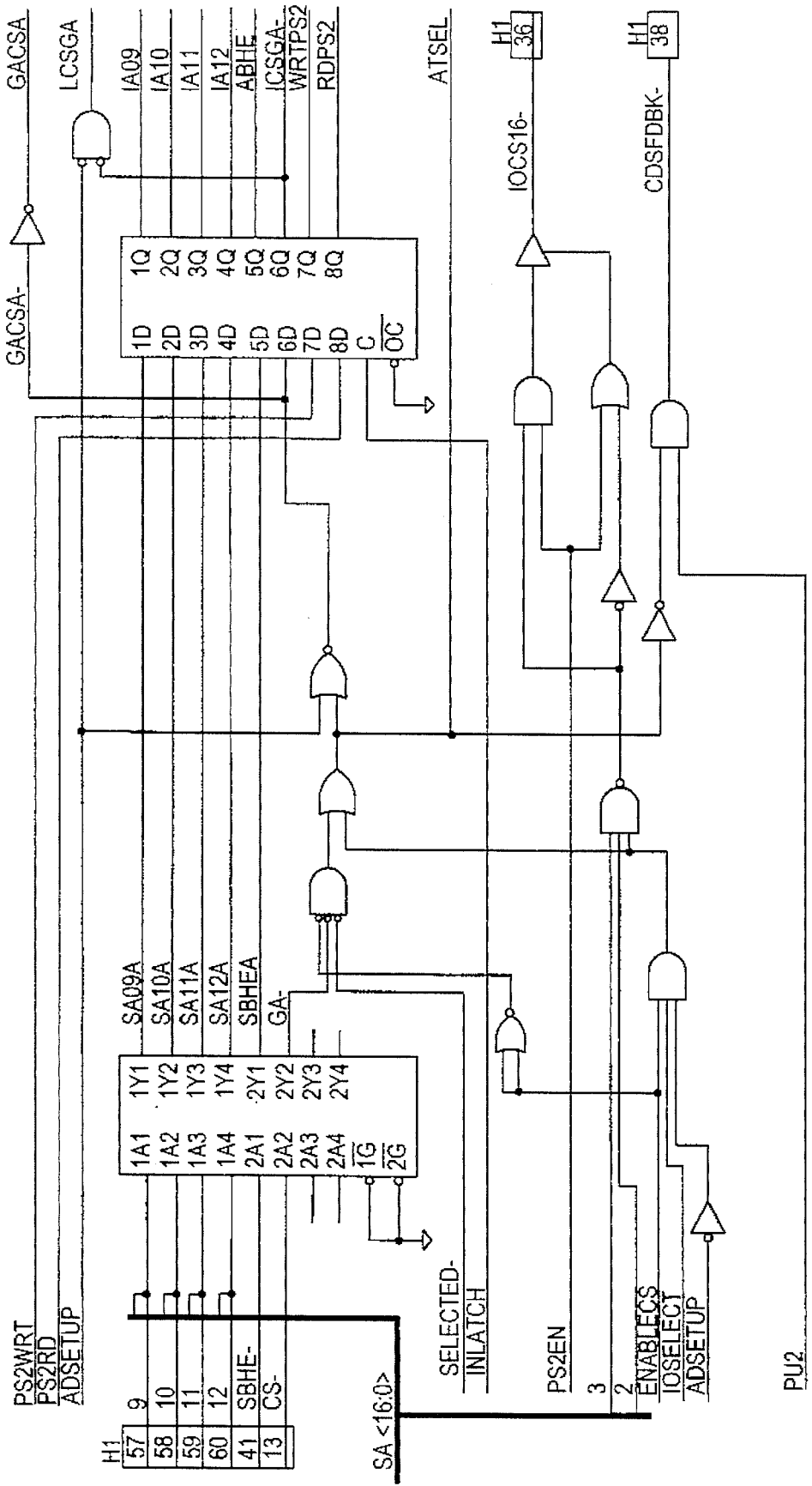
FIG. 27 is a schematic diagram of the address and control interface.

FIG. 27 illustrates another address latch for some additional address bits. The circuitry on FIG. 27 also includes decoding circuitry used to decode the MCA and ISA control signals. In general, this circuitry detects what kind of bus cycle is desired, decodes those signals and asserts the appropriate memory read or write signals for the internal controls of the chip.

Figure 28:
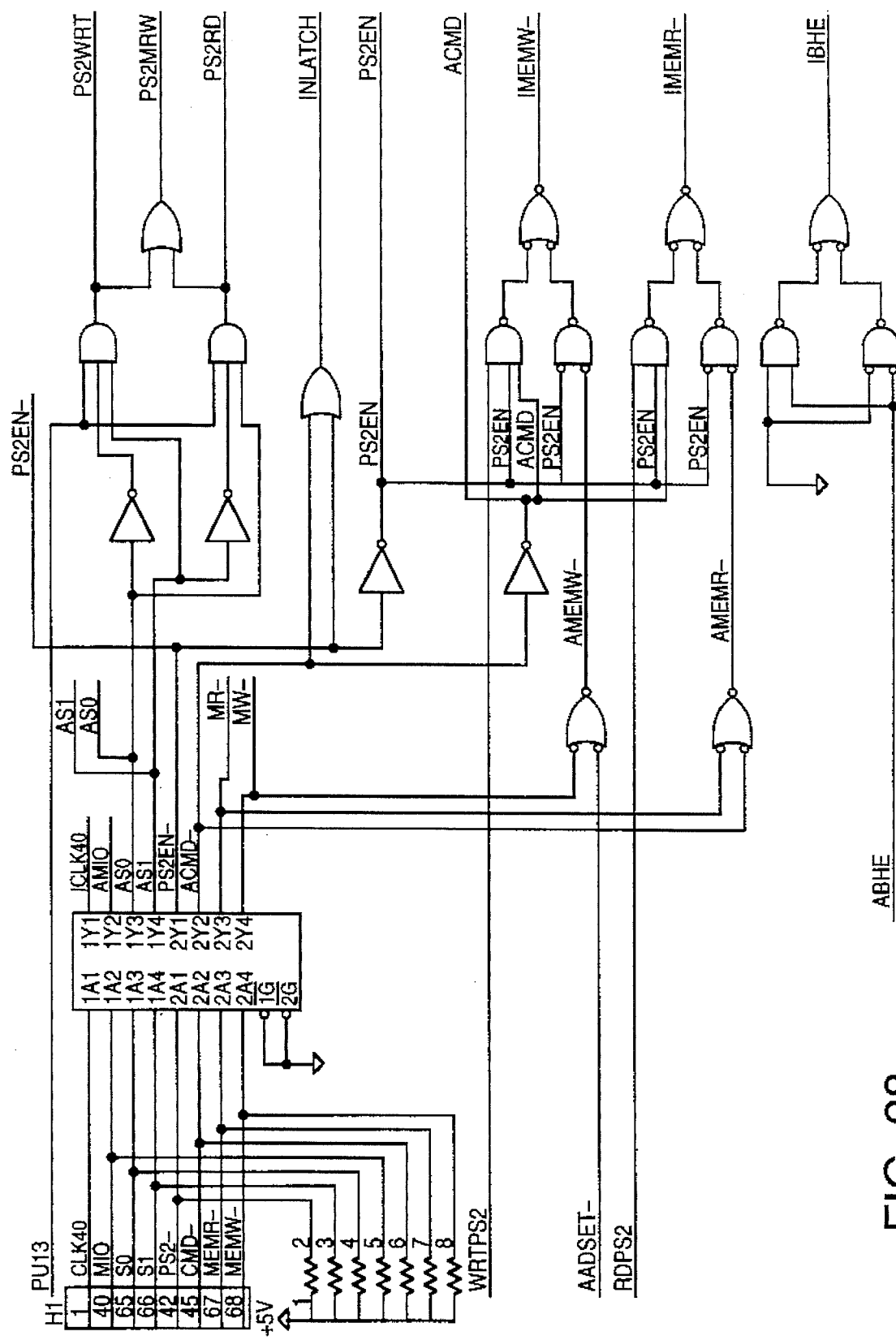
FIG. 28 is a schematic diagram of the PS2/AT decode.

FIG. 28 illustrates further control signal decoding circuits for the same purposes.

Figure 29:
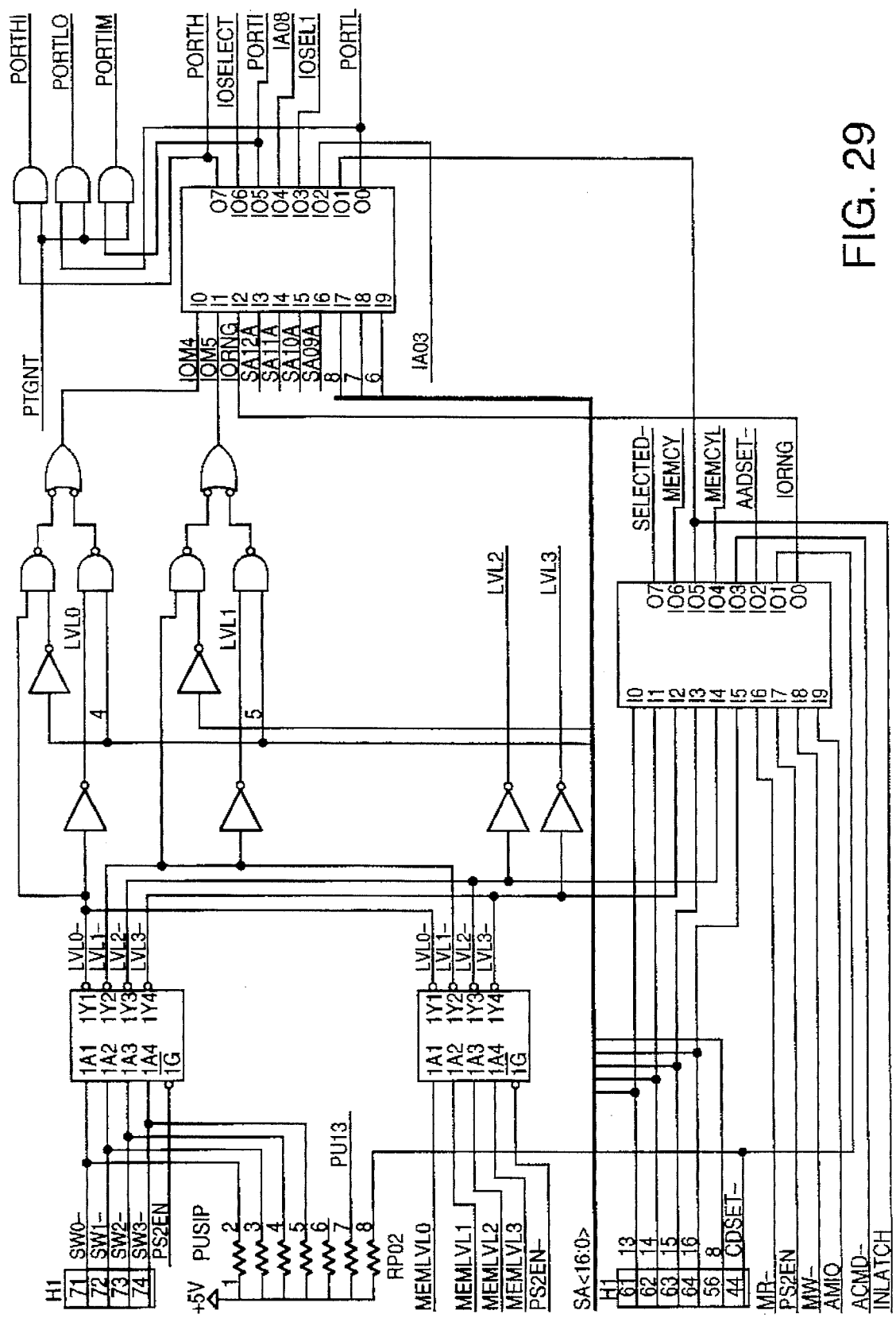
FIG. 29 is a schematic diagram of the chip select decoding.

With reference to FIG. 29, the chip select decoding circuitry is illustrated. In order to determine whether the chip (i.e., chip 180) has been selected, this circuitry decodes the most significant bits of the address coming in to the chip. The circuit also detects whether the circuits of FIGS. 27 and 28 have decoded an input/output or a memory cycle. Based on whether an input/output (I/O) or a memory cycle has been decoded, the circuit of FIG. 32 decodes the address range differently. The address decode circuitry of FIG. 29 thus allows selective access to either the I/O ports or the memory space addressed by the chip.

Figure 30:
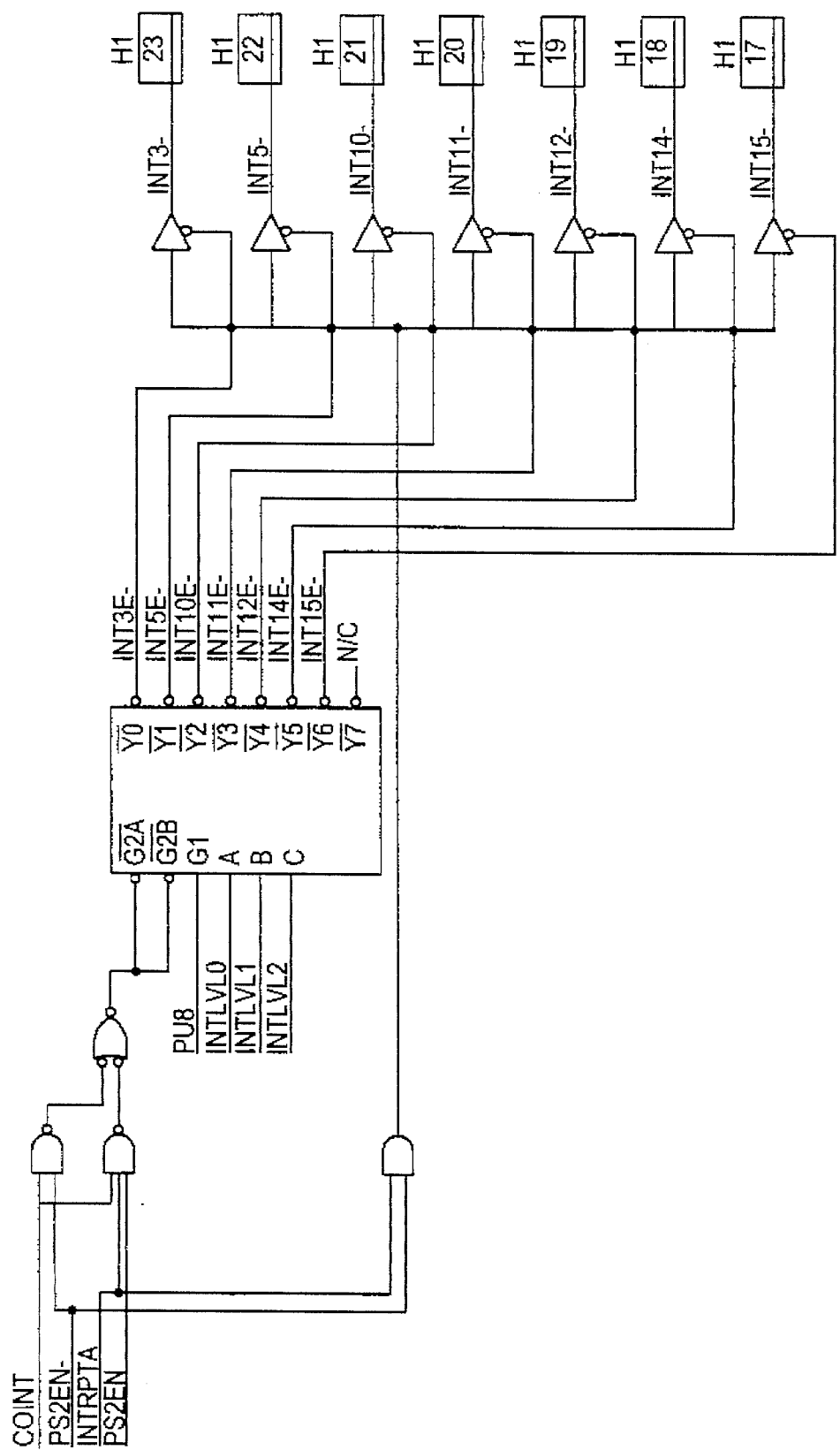
FIG. 30 is a schematic diagram of the interrupt selection.

FIG. 30 depicts the interrupt selection circuits which provide 7 interrupt outputs from the chip on leads (FIG. 3). Ordinarily only one of the interrupts will be enabled for a given hardware implementation. For an MCA application the programmable option select (POS) setting may be used to determine what interrupt level and hence what lead will be active when an interrupt occurs. In an ISA implementation switches S0–S1 (see FIG. 3) are appropriately set to select the desired interrupt level. Ordinarily jumpers or dual inline pin (DIP) switches are used for this purpose and may be attached to the S0 and S1 leads of the chip.

In accordance with the microchannel architecture specification, the chip of the invention is capable of being software configured. When an MCA computer is powered-up a software configuration program runs which searches the disk file for one that matches the ID register on each option device plugged into the mother board. A SCSI controller card is an example of such a device. Using the chip of the invention to implement a SCSI controller card, the ID register on the chip would be read at power-up time, if not previously installed in the system. Next, the user is given an opportunity through the software configuration program to select the desired configuration parameters such as base address and interrupt level. The configuration program sets these values and stores them in nonvolatile memory which is part of the computer system. Thus when the computer system is powered-down and next powered-up, the nonvolatile memory retains the configuration parameters which are then used to set up or configure the SCSI chip.

Figure 31:
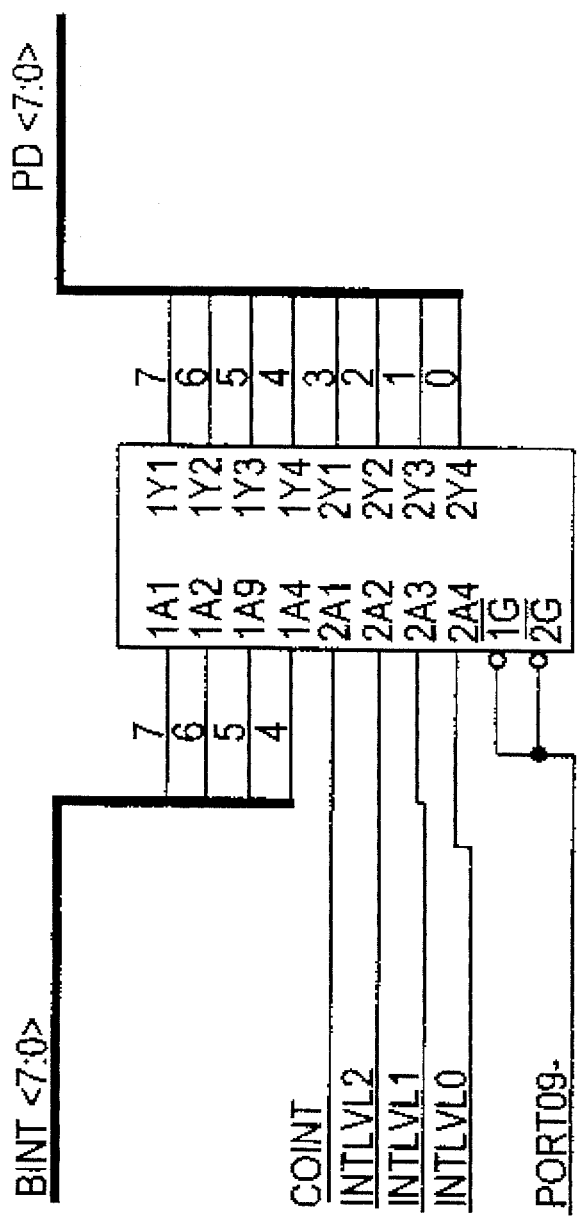
FIG. 31 is a schematic diagram of the Port 9 interrupt mask register.
Figure 32A:
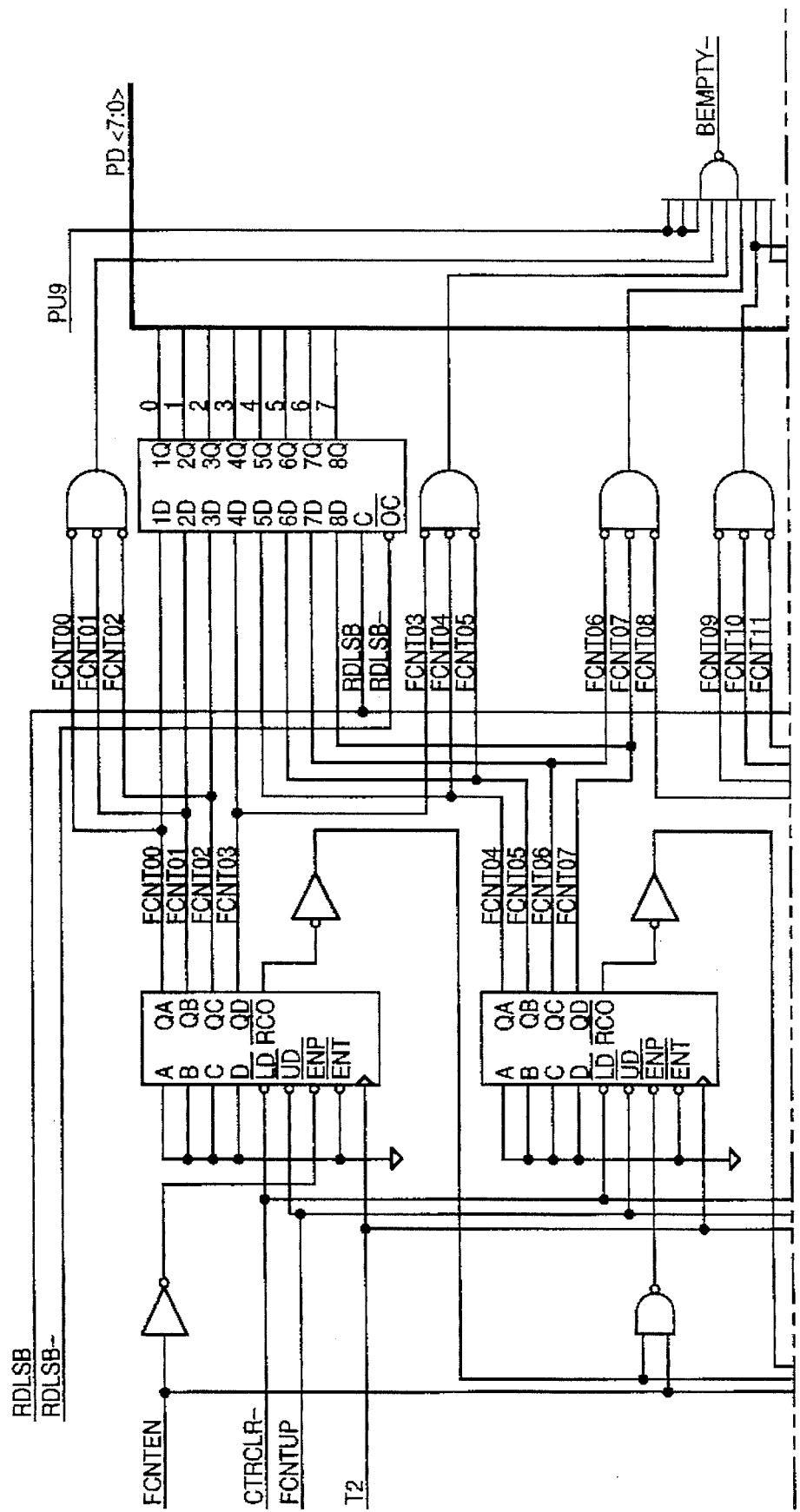
FIG. 32 is a key to FIGS. 32A and 32B, which are a schematic diagram of the FIFO data counter.
Figure 33:
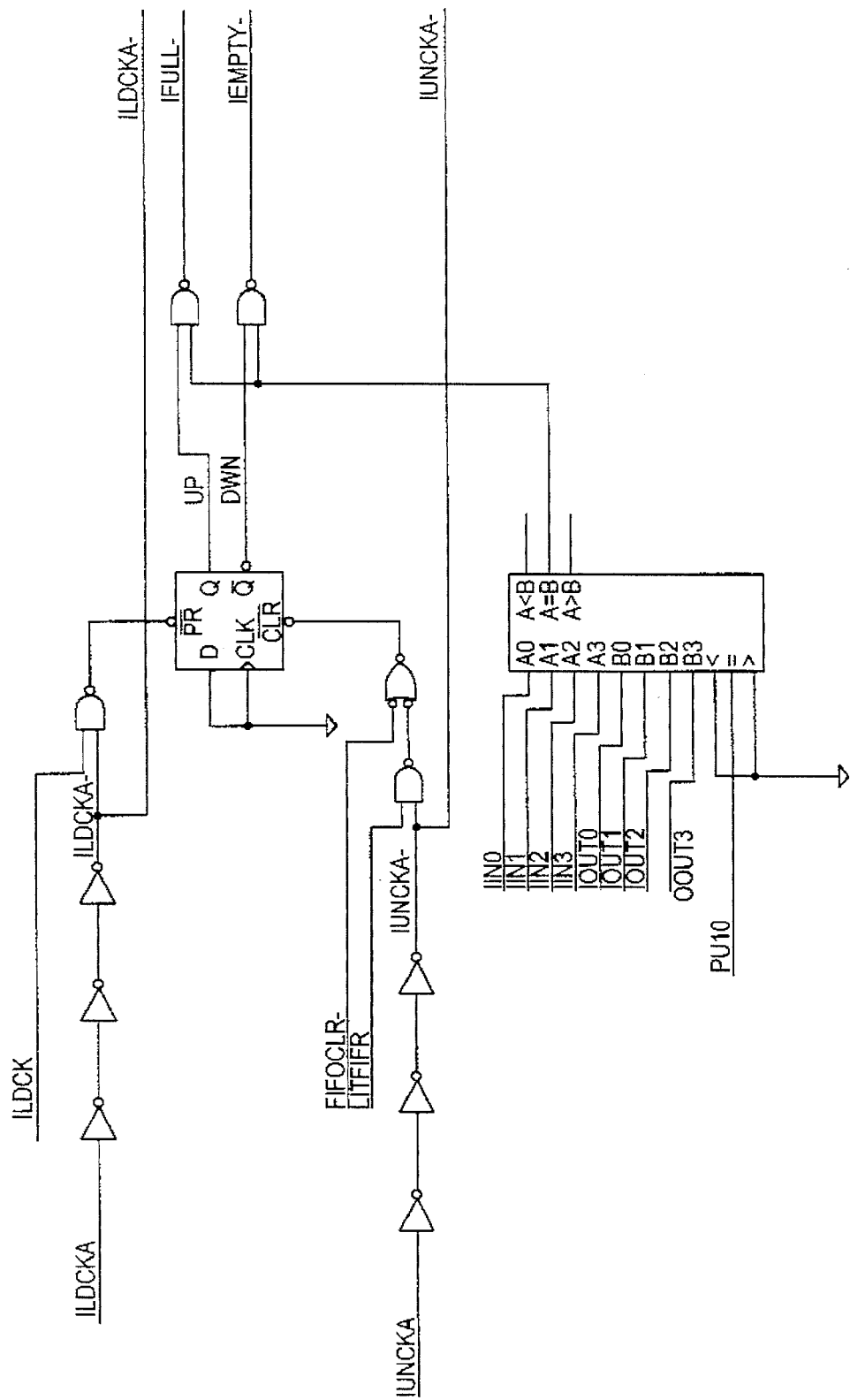
FIG. 33 is a schematic diagram of the input FIFO status flags.
Figure 34:
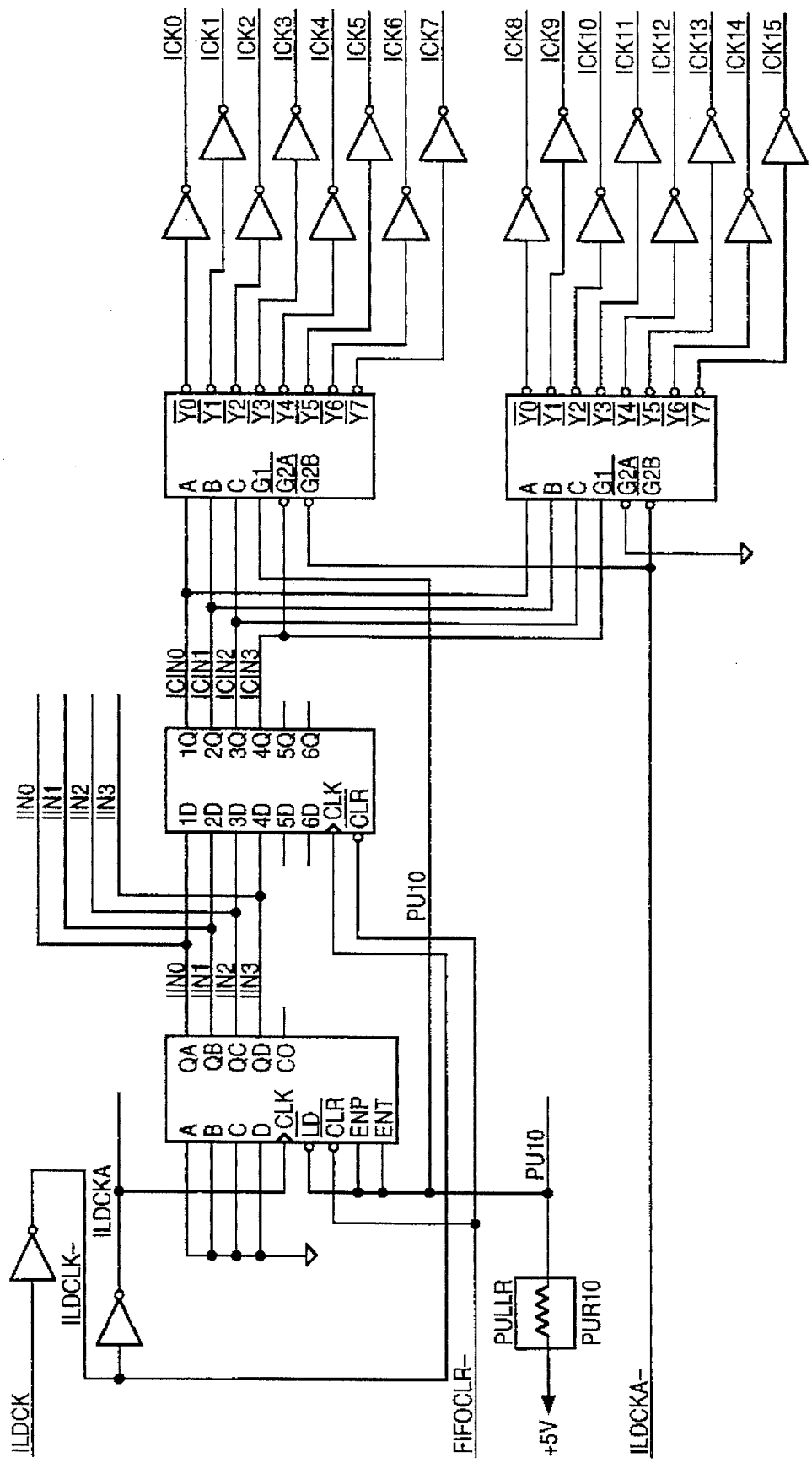
FIG. 34 is a key to FIGS. 34A and 34B, which are a schematic diagram of the input FIFO load sequencer.
Figure 35:
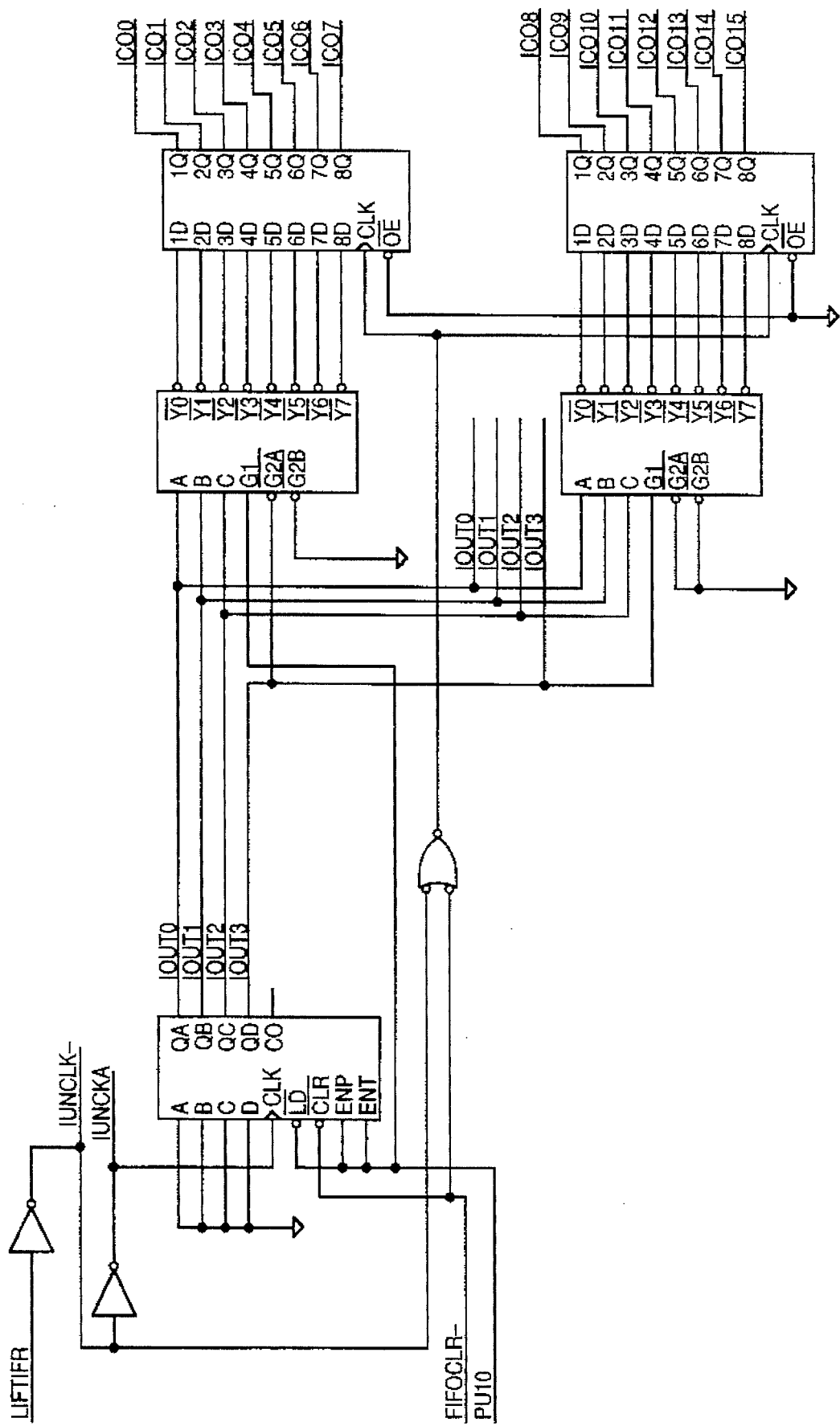
FIG. 35 is a schematic diagram of the input FIFO unload sequencer.
Figure 36:
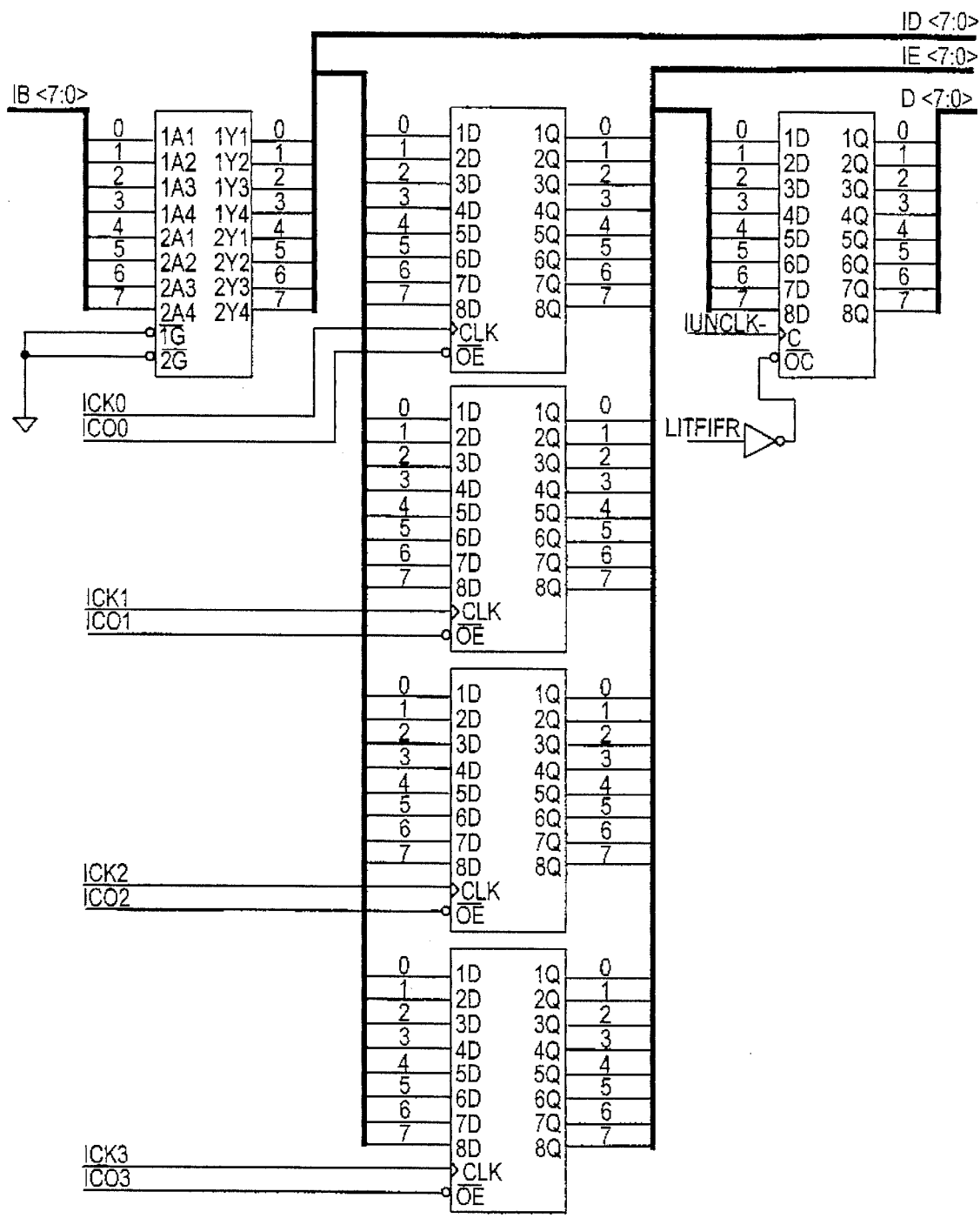
FIG. 36 is a schematic diagram of the input FIFO registers 0–3.

FIG. 31 is the interrupt mask register for implementing the port 9 interrupt mask. This interrupt mask is also referred to in Table III. This circuit is an input port to allow the user to program which interrupts are to be enabled and disabled. The register serves as a status port from which the selected interrupt configuration can be read.

Software Considerations

There are primarily three ways that the host computer can talk to the chip of the presently preferred embodiment through software. One is using the system BIOS, two is through a loadable device driver and three is through executable routines which may be provided as a tool kit of different functions which the software engineer can select from. Port 8 is provided to allow direct access to the SCSI data bus without generating an acknowledge. This port is thus useful in reading from the target during the Message In phase. This will allow the processor to decide whether the message is to be accepted or rejected. If the message is to be accepted, reading port 0 will generate the acknowledge. Port 8 should also be used in place of port. 0 when setting up the ID prior to arbitration or target selection. This is important on multi-initiator systems, since spurious acknowledges could disrupt the operation of another initiator. Finally, port 8 should be used instead of port 0 when reading the ID during reselection.

When disconnecting after a Data Out phase, it is necessary to read the FIFO counter, adjust the current SCSI data pointer by this amount and clear the FIFO. When disconnecting following a Data In phase, the contents of the FIFO should be read out completely before another data transfer is begun. The FIFO counter only indicates the volume of data present in the main FIFO. In synchronous mode the input and output FIFOs contain data which has been requested and not acknowledged. The software assumes that a disconnect will normally occur only after all requests have been acknowledged.

The following is an example of suitable 80286 code which may be used to control the chip of the presently preferred embodiment.

```
;_____
;
;
; TMC-1800 SCSI HOST ADAPTER CODE EXAMPLE
;
;
;       - ARBITRATION ROUTINE
;       - SELECTION ROUTINE
;       - DATA IN ROUTINE
;       - DATA OUT ROUTINE
;_____
```

.286c

; EXTERNAL PROCEDURE DELCARATIONS

```
EXTRN   START_TIMER:NEAR        ;   STARTS TIMER
EXTRN   CHECK_TIMER:NEAR        ;   CHECKS TIMER FOR TIMEOUT
EXTRN   TMC1800_ERROR:NEAR      ;   ERROR HANDLER
EXTRN   READ_PTR_UPDATE:NEAR    ;   READ POINTER AND FLOW CONTROL
EXTRN   WRITE_PTR_UPDATE:NEAR   :   WRITE POINTER AND FLOW CONTROL
```

; TMC-1800 PORT ADDRESS DEFINITIONS (I/O BASE ADDRESS = 140H
    ASSUMED)

```
SCSI_ACK        = 140H   ;  READ/WRITE PORT 0 SCSI DATA WITH
                            ACKNOWLEDGE
SCSI_STAT       = 141H   ;  READ PORT 1 SCSI STATUS
SCSI_CTL        = 141H   ;  WRITE PORT 1 SCSI CONTROL
AD_STAT         = 142H   ;  READ PORT 2 ADAPTER STATUS
FIFO_CTL        = 144H   ;  WRITE PORT 4 FIFO CONTROL
SCSI_NO_ACK     = 148H   ;  READ/WRITE PORT 8 SCSI DATA W/O
                            ACKNOWLEDGE
FIFO            = 14CH   ;  READ/WRITE PORT C FIFO
```

; TMC-1800 SCSI STATUS PORT BIT DEFINITIONS

```
BSY             = 01H    ;  SCSI BUSY
```

; TMC-1800 SCSI CONTROL PORT CONTROL CODE DEFINITIONS

```
ENABLE_CODE     = 80H    ;  ENABLE SCSI BUS
SELATN_CODE     = 8AH    ;  ENABLE SCSI BUS AND ASSERT SEL AND
                            ATN
ATN_EN_CODE     = 88H    ;  ENABLE SCSI BUS AND ASSERT ATN
```
; TMC-1800 ADAPTER STATUS PORT BIT DEFINITIONS

```
ARB_DONE        = 02H    ;  ARBITRATION COMPLETE
```

; TMC-1800 FIFO CONTROL PORT BIT DEFINITIONS

```
ARB             = 04H     ; INITIATE ARBITRATION
FIFO_DIR        = 40H     ; FIFO DIRECTION (SET FOR WRITE)
FIFO_EN         = 80H     ; ENABLE FIFO FOR SCSI DATA
```

; MISCELLANEOUS DEFINITIONS

```
HALF_SECOND     = 9       ; TIMER TICKS FOR 1/2 SECOND
THREE_SECONDS   = 54      ; TIMER TICKS FOR 3 SECONDS

_TEXT           SEGMENT BYTE PUBLIC 'CODE'
                ASSUME  CS:_TEXT
                ASSUME  DS:_TEXT
                ASSUME  ES:_TEXT
```

; PROGRAM VARIABLES (INCLUDED IN TEXT SEGMENT; ASSUMES CODE IS RAM-BASED)

```
SCSIADDRESS     DB    ?               ; SCSI TARGET ADDRESS
DATA_POINTER    DD    ?               ; BUFFER ADDRESS
OUR_ID          DB    ?               ; TMC-1800 SCSI ID BIT SET
TARGET_BIT      DB    1,2,4,8,16,32,64,128
```

```
;
; TMC1800_ARB
;   INITIATE A SCSI CONNECTION THROUGH ARBITRATION.
;   MAX WAIT FOR SUCCESSFUL COMPLETION IS 3 SECONDS.
;   THIS ROUTINE MAY BE CALLED FREELY AS LONG AS NO
;   ACTIVE SCSI CONNECTION EXISTS BETWEEN THE TMC-1800
;   AND ANY TARGET; BUS FREE PHASE IS DETECTED BY
;   HARDWARE.
;
;   ENTRY PARAMETERS:
;     OUR_ID   = TMC-1800 SCSI ID BIT (ONE BIT SET)
;   REGISTERS PRESERVED: CX,DX
;   REGISTERS CHANGED: AX
;   EXIT PARAMETERS:
;     CARRY SET IF TIMEOUT
;
```

```
TMC1800_ARB
        PROC    NEAR
        PUSH    CX
        PUSH    DX                      ; SAVE REGISTERS
        XOR     AX,AX
        MOV     DX,SCSI_CTL
        OUT     DX,AL                   ; DISABLE DATA DRIVERS
        MOV     AL,OUR_ID
        MOV     DX,SCSI_NO_ACK
```

APPENDIX

```
NAME      PAL 01           ;
DEVICE    p16r8            ;

/***************************************************************/
/*    INPUT PIN DEFINITIONS                                    */
/***************************************************************/

PIN  1  =  CLK400    ;   /*  CLOCK DERIVED FROM BUS OSC   */
PIN  2  =  COARB     ;   /*  ARBITRATION PENDING - REQ FROM CPU  */
PIN  3  =  SBSY      ;   /*  SCSI BUSY LINE  */
PIN  4  =  SSEL      ;   /*  SCSI SELECT LINE  */
PIN  5  =  !HIGHER   ;   /*  HIGHER ADDRESS ARBITRATING  */
PIN  6  =  !RESET    ;   /*  CHIP RESET  */
PIN 11  =  !ENABLEA  ;   /*  OUTPUT ENABLE PIN  */

/***************************************************************/
/*    OUTPUT PINS                                              */
/***************************************************************/

PIN 12 = !CNT0       ;   /*  INTERNAL INTERVAL COUNTER  */
PIN 13 = !CNT1       ;   /*  INTERNAL INTERVAL COUNTER  */
PIN 14 = !CNT2       ;   /*  INTERNAL INVERVAL COUNTER  */
PIN 15 = !ARBST02    ;   /*  SET SELECT PLUS TARGET ID  */
PIN 16 = !ARBST01    ;   /*  SET ADDRESS ON BUS & BUSY  */
PIN 17 = !ARBST00    ;   /*  WAIT FOR BUS FREE STATE  */
PIN 18 = !ARBCMPT    ;   /*  ARBITRATION COMPLETE  */
PIN 19 = !ARBST0A    ;   /*  BUS FREE COMPLETE, WAIT FOR SETTLE  */

/***************************************************************/
/*    EQUATIONS                                                */
/***************************************************************/

ARBST00.D  =  COARB    & !ARBST01 & !ARBCMPT & !ARBST0A & !SBSY
                       & !SSEL ;

ARBST0A.D  =  ARBST00  & !SBSY  & !SSEL  & COARB   #
              ARBST0A  & !CNT0  #
              ARBST0A  & CNT1   #
              ARBST0A  & CNT2   ;

ARBST01.D  =  ARBST0A  & !SSEL   & COARB  & CNT0  & !CNT1  & !CNT2  #
              ARBST01  & !HIGHER & !SSEL  & !ARBCMPT ;  /* 2.4u */

ARBST02.D  =  ARBST01  & !HIGHER & !SSEL  & CNT0  & CNT1  & CNT2  #
              ARBST02  & COARB ;

ARBCMPT.D  =  ARBST01  & !HIGHER & !SSEL  & CNT0  & CNT1  & CNT2  #
              ARBST02  ;  /* ARBITRATION COMPLETE-SET SSEL  */

CNT0.D     =  !CNT0                         & !ARBST00 ;
```

```
CNT1.D     =   CNT0      & !CNT1           & !ARBST00  #
               !CNT0     & CNT1            & !ARBST00  ;

CNT2.D     =   CNT0      & CNT1  & !CNT2   & !ARBST00  #
                         !CNT1 & CNT2      & !ARBST00  #
               !CNT0            & CNT2     & !ARBST00  ;

NAME       PAL02
DEVICE     p1618

/****************************************************************/
/*    INPUT PINS                                                */
/****************************************************************/

PIN  1  =  !AS0      ;  /*  PRIORITY DECODER ADDRESS, BIT 0  */
PIN  2  =  !AS1      ;  /*  PRIORITY DECODER ADDRESS, BIT 1  */
PIN  3  =  !AS2      ;  /*  PRIORITY DECDOER ADDRESS, BIT 2  */
PIN  4  =  SA0       ;  /*  SCSI REGISTERED DATA BIT 0  */
PIN  5  =  SA1       ;  /*  SCSI REGISTERED DATA BIT 1  */
PIN  6  =  SA2       ;  /*  SCSI REGISTERED DATA BIT 2  */
PIN  7  =  SA3       ;  /*  SCSI REGISTERED DATA BIT 3  */
PIN  8  =  SA4       ;  /*  SCSI REGISTERED DATA BIT 4  */
PIN  9  =  SA5       ;  /*  SCSI REGISTERED DATA BIT 5  */
PIN 11  =  SA6       ;  /*  SCSI REGISTERED DATA BIT 6  */
PIN 13  =  !SIO      ;  /*  SCSI I/O DIRECTION  */
PIN 14  =  !ARBST01  ;  /*  ARBITRATION STATE 01  */
PIN 15  =  !ARBCMPT  ;  /*  ARBITRATION COMPLETE  */
PIN 16  =  COBUS     ;  /*  CONTROL OUTPUT BUS ENABLE  */

/****************************************************************/
/*    OUTPUT PINS                                               */
/****************************************************************/

PIN 12  =  SOENA     ;  /*  ENABLE SCSI BUS DRIVERS  */
PIN 18  =  !INTER    ;  /*  INTERMEDIATE TERM FOR GENERATION OF
                            HIGHER  */
PIN 19  =  !HIGHER   ;  /*  HIGHER PRIORITY DATA BIT ON DATA BUS

/****************************************************************/
/*    EQUATIONS                                                 */
/****************************************************************/

HIGHER    =    SA6    &  AS0   &  AS1  &  AS2   #
               SA5    &         &  AS1  &  AS2   #
               SA4    &  AS0   &         &  AS2   #
               SA4    &         &  AS1  &  AS2   #
               SA3    &                  &  AS2   #
               SA2    &  AS0   &  AS1            #
               INTER  ;
```

```
INTER      = SA2   &                       AS2  #
             SA1   &         AS1                #
             SA1   &                       AS2  #
             SA0   &  AS0                       #
             SA0   &         AS1                #
             SA0   &                       AS2  ;

SOENA      = !SIO  &  COBUS                     #
             !SIO  &  ARBST01                   #
             !SIO  &  ARBCMPT                   ;
```

```
NAME       PAL03
DEVICE     p16L8

/****************************************************************/
/*    INPUT PINS                                                 */
/****************************************************************/

PIN  1  =  SA13     ;  /* Address bit 13 */
PIN  2  =  SA14     ;  /* Address bit 14 */
PIN  3  =  !LVL3    ;  /* Memory level select bit 3 */
PIN  4  =  SA15     ;  /* Address bit 15 */
PIN  5  =  !LVL2    ;  /* Memory level select bit 2 */
PIN  6  =  SA16     ;  /* Address bit 16 */
PIN  7  =  !AMEMR   ;  /* Memory read cycle */
PIN  8  =  PS2EN    ;  /* Micro Channel mode */
PIN  9  =  !AMEMW   ;  /* Memory write cycle */
PIN 11  =  AMIO     ;  /* Micro Channel M/-IO */
PIN 13  =  !CDSET   ;  /* Micro Channel setup (dual function:
                          PC/AT IOW-) */
PIN 15  =  !ACMD    ;  /* Micro Channel cmd (dual function:
                          PC/AT IOR-) */
PIN 17  =  INLATCH  ;  /* Latch enable for Micro Channel */

/****************************************************************/
/*    OUTPUT PINS                                                */
/****************************************************************/

PIN 12  =  IORNG     ;  /* I/O address range */
PIN 14  =  !AADSET   ;  /* Buffered setup signal */
PIN 16  =  MEMCYL    ;  /* Memory cycle latched */
PIN 18  =  MEMCY     ;  /* Memory cycle */
PIN 19  =  !SELECTED ;  /* Memory address range selected */

/****************************************************************/
/*    EQUATIONS                                                  */
/****************************************************************/

IORNG     =  !SA15 & !SA14 & !SA13 &  ACMD  & !PS2EN  #
             !SA15 & !SA14 & !SA13 &  CDSET & !PS2EN  #
             !SA15 & !SA14 & !SA13 & !AMIO  &  PS2EN  ;
```

```
AADSET      =   CDSET   ;

MEMCYCL     =   INLATCH  &   MEMCY    #
                !INLATCH &   MEMCYL ;

MEMCY       =   AMEMR    #   AMEMW    #
                AMIO     &   PS2EN ;

SELECTED    =   MEMCY  &  !LVL3  &  !LVL2  &  !SA16  &  SA15  &  !SA14
                       &  !SA13  #  /*  c8000  */
                MEMCY  &  !LVL3  &   LVL2  &  !SA16  &  SA15  &  !SA14
                       &   SA13  #  /*  oa000  */
                MEMCY  &   LVL3  &  !LVL2  &  !SA16  &  SA15  &   SA14
                       &   SA13  #  /*  ca000  */
                MEMCY  &   LVL3  &   LVL2  &   SA16  &  SA15  &   SA14
                       &   SA13  ;  /*  da000  */

NAME        PAL04
DEVICE      p16L8

/*********************************************************************/
/*      INPUT PINS                                                   */
/*********************************************************************/

PIN  1  =  IOM4     ;   /*  I/O address bit 4 matched   */
PIN  2  =  IOM5     ;   /*  I/O address bit 5 matched   */
PIN  3  =  IORNG    ;   /*  I/O cycle, address bits 15-13 bits in
                            range  */
PIN  4  =  SA12A    ;   /*  Address bit 12  */
PIN  5  =  SA11A    ;   /*  Address bit 11  */
PIN  6  =  SA10A    ;   /*  Address bit 10  */
PIN  7  =  SA09A    ;   /*  Address bit 9   */
PIN  8  =  SA08     ;   /*  Address bit 8   */
PIN  9  =  SA07     ;   /*  Address bit 7   */
PIN 11  =  SA06     ;   /*  Address bit 6   */
PIN 13  =  INLATCH  ;   /*  Micro Channel latch enable  */
PIN 14  =  IA03     ;   /*  Address bit 3   */

/*********************************************************************/
/*      OUTPUT PINS                                                  */
/*********************************************************************/

PIN 12  =  PORTL    ;   /*  I/O ports 0-7  */
PIN 15  =  IOSEL1   ;   /*  Partial term in IOSELECT  */
PIN 16  =  IA08     ;   /*  Address bit 8 latched  */
PIN 17  =  PORTI    ;   /*  I/O ports  */
PIN 18  =  IOSELECT ;   /*  I/O address decode  */
PIN 19  =  PORTH    ;   /*  I/O ports 8-15  */
```

```
/****************************************************************/
/*     EQUATIONS                                                */
/****************************************************************/

PORTL     =    PORTI   &  !IA03 ;

IOSEL1    =    !SA12A &  !SA11A  &  !SA10A  &  !SA09A ;

IA08      =    INLATCH  & SA08   #
               !INLATCH & IA08 ;

PORTI     =    INLATCH  & IOSELECT  #
               !INLATCH & PORTI ;

IOSELECT  =    IORNG  &  IOSEL1  & SA08  &  !SA07  &  •SA06  &  IOM5
                      &  IOM4 ;

PORTH     =    PORTI   &  IA03 ;
```

```
        OUT     DX,AL                   ; SET OUR ID BIT
        MOV     AL,ARB
        MOV     DX,FIFO_CTL
        OUT     DX,AL                   ; START ARBITRATION
        MOV     CX,THREE_SECONDS        ; 3-SECOND TIMEOUT
        CALL    START_TIMER             ; START TIMER ROUTINE -
                                          USES CX
        CLC                             ; CLEAR ERROR FLAG
TMC1800_ARB_LP:
        MOV     DX,AD_STAT
        IN      AL,DX
        TEST    AL,ARB_DONE             ; INPUT ADAPTER STATUS
        JNZ     TMC1800_ARB_END         ; GO IF ARBITRATION COMPLETED

CALL    CHECK_TIMER             ; ROUTINE TO CHECK FOR
                                          TIMEOUT
        JNC     TMC1800_ARB_LP          ; CARRY SET INDICATES TIMEOUT

MOV     AB,-1                   ; ERROR CODE FOR ARB TIMEOUT
        CALL    TMC1800_ERROR           ; ERROR HANDLER ROUTINE
TMC1800_ARB_END:
        POP     DX
        POP     CX                      ; RESTORE REGISTERS
        RET
TMC1800_ARB
        ENDP
```

```
;
;       TMC1800_SEL
;         EXECUTE SELECTION PHASE WITH ATTENTION ASSERTED
;         (TO ALLOW SUBSEQUENT TRANSMISSION OF A MESSAGE,
;         SUCH AS IDENTIFY, TO THE TARGET).  WAIT FOR THE
;         TARGET TO ASSERT THE SCSI BUSY LINE.  MAX WAIT IS
;         1/2 SECOND.  THIS ROUTINE IS CALLED FOLLOWING
;         SUCCESSFUL COMPLETION OF TMC1800_ARB.
;
;       ENTRY PARAMETERS:
;         SCSIADDRESS      =   TARGET ADDRESS
;         OUR_ID           =   TMC-1800 SCSI ID BIT (ONE BIT SET)
;       REGISTERS PRESERVED: BX,CX,DX
;       REGISTERS CHANGED:   AX
;       EXIT PARAMETERS:
;         CARRY SET IF TIMEOUT
;
```

```
TMC1800_SEL
        PROC    NEAR
        PUSH    BX
        PUSH    CX
        PUSH    DX                      ; SAVE REGISTERS
        MOV     AL,ENABLE_CODE
        MOV     DX,SCSI_CTL
        OUT     DX,AL                   ; ENABLE BUS
        MOV     AL,SELATN_CODE
```

```
        MOV         DX,SCSI_CTL
        OUT         DX,AL              ; ISSUE SELECT WITH ATN
        MOV         BL,SCSIADDRESS     ; GET SCSI TARGET ADDRESS
        XOR         BH,BH
        MOV         AL,TARGET_BIT(BX)  ; GET TARGET ID BIT
        OR          AL,OUR_ID          ; SET OUR ID TOO
        MOV         DX,SCSI_NO_ACK
        OUT         DX,AL              ; OUTPUT SCSI SELECT WORD
        XOR         AL,AL
        MOV         DX,FIFO_CTL
        OUT         DX,AL              ; STOP ARBITRATION
        MOV         CX,HALF_SECOND     ; 1/2-SECOND TIMEOUT
        CALL        START_TIMER        ; START TIMER ROUTINE
                                       ;   - USES CX
        CLC                            ; CLEAR ERROR FLAG
TMC1800_SEL_LP:
        MOV         DX,SCSI_STAT
        IN          AL,DX              ; INPUT SCSI STATUS
        TEST        AL,BSY
        MOV         AL,ATN_EN_CODE     ; BOLD ATN ON EXIT
        JNZ         TMC1800_SEL_END    ; GO IF BSY ASSERTED

CALL        CHECK_TIMER        ; ROUTINE TO CHECK FOR
                                       ;   TIMEOUT
        JNC         TMC1800_SEL_LP     ; CARRY SET INDICATES
                                       ;   TIMEOUT
        MOV         AH,-2              ; ERROR CODE FOR SEL TIMEOUT
        CALL        TMC1800_ERROR      ; ERROR HANDLER ROUTINE
        MOV         AL,0               ; LET SCSI BUS IDLE ON EXIT
TMC1800_SEL_END:
        MOV         DX,SCSI_CTL
        OUT         DX,AL              ; RELEASE SEL
        POP         DX
        POP         CX
        POP         BX                 ; RESTORE REGISTERS
        RET
TMC1800_SEL
        ENDP
```

```
;_____
;    TMC1800_READ
;     TRANSFER DATA FROM THE SCSI PORT VIA THE FIFO TO THE
;     DATA BUFFER AREA.  THIS ROUTINE IS CALLED WHEN SCSI
;     DATA INPUT PHASE IS DETECTED.  FIFO MUST BE CLEARED
;     *BEFORE* DATA IN PHASE BEGINS (i.e., AT THE START OF
;     COMMAND PHASE).  IF SYNCHRONOUS TRANSFERS ARE USED,
;     THE MODE CONTROL REGISTER (PORT 3) MUST ALSO BE
;     CONFIGURED DURING COMMAND PHASE.
;
;   ENTRY PARAMETERS:
;     DATA_POINTER   =  POINTER TO DATA BUFFER START
;   REGISTERS PRESERVED: CX,DX,ES,DI
;   REGISTERS CHANGED:  AX
;   EXIT PARAMETERS:
;     DATA_POINTER   = POINTER TO DATA BUFFER END
;_____

TMC1800_READ
    PROC    NEAR
    PUSH    ES
    PUSH    DI
    PUSH    CX
    PUSH    DX              ; SAVE REGISTERS
    XOR     CX,CX           ; 1ST PASS TRANSFER LENGTH
                            ;   = 0
    MOV     AL,FIFO_EN
    MOV     DX,FIFO_CTL
    OUT     DX,AL           ; ENABLE FIFO
TMC1800_READ_LP:
    CALL    READ_PTR_UPDATE ; READ POINTER UPDATE ROUTINE

;_____
;   READ_PTR_UPDATE ROUTINE PERFORMS THE FOLLOWING
;   FUNCTIONS:
;     UPDATE DATA_POINTER AND TOTAL TRANSFER LENGTH (USING
;     CX)
;     DETERMINE NEXT TRANSFER LENGTH (RETURNED IN CX)
;     CHECK FOR CHANGE OUT OF DATA PHASE (RETURN CARRY SET
;     WHEN DONE)
;     DETECT AND HANDLE OVERFLOW, UNDERFLOW, AND TIMEOUT
;     ERRORS
;_____

JC      TMC1800_READ_EXIT

LES     DI,DATA_POINTER ; POINT TO DATA BUFFER (DEST)
    MOV     DX,FIFO         ; POINT TO FIFO (SRC)
    CMP     CX,1            ; CHECK FOR 1-BYTE TRANS
    JNZ     TMC1800_READ_1  ; GO IF MULTIPLE BYTES

CLI
    INSB                    ; INPUT 1 BYTE FROM FIFO
```

```
            STI
            JMP             SHORT TMC1800_READ_LP

TMC1800_READ_1:
            AND             CX,0FFFEH               ; MAKE INTO EVEN COUNT
            PUSH            CX                      ; SAVE TRANSFER_LENGTH
            SHR             CX,1                    ; MAKE INTO WORD COUNT
            CLI
            REP             INSW                    ; INPUT FROM FIFO
            STI
            POP             CX                      ; RESTORE TRANSFER LENGTH
            JMP             SHORT TMC1800_READ_LP

TMC1800_READ_EXIT:
            POP             DX
            POP             CX
            POP             DI
            POP             ES                      ; RESTORE REGISTERS
            RET
TMC1800_READ
            ENDP

;_____
;
;       TMC1800_WRITE
;         TRANSFER DATA TO THE SCSI PORT VIA THE FIFO FROM THE
;         DATA BUFFER AREA.  THIS ROUTINE IS CALLED WHEN SCSI
;         DATA OUTPUT PHASE IS DETECTED.  FIFO MUST BE CLEARED
;         *BEFORE* DATA OUT PHASE BEGINS (i.e., AT THE START OF
;         COMMAND PHASE).  IF SYNCHRONOUS TRANSFERS ARE USED,
;         THE MODE CONTROL REGISTER (PORT 3) MUST ALSO BE
;         CONFIGURED DURING COMMAN PHASE.
;
;       ENTRY PARAMETERS:
;         DATA_POINTER    = POINTER TO DATA BUFFER START
;       REGISTERS PRESERVED:  CX,DX,DS,SI
;       REGISTERS CHANGED:    AX
;       EXIT PARAMETERS:
;         DATA_POINTER    = POINTER TO DATA BUFFER END
;_____

TMC1800_WRITE
            PROC            NEAR
            PUSH            SI
            PUSH            DS
            PUSH            CX
            PUSH            DX                      ; SAVE REGISTERS
            XOR             CX,CX                   ; 1ST PASS TRANSFER LENGTH
                                                    ;       = 0
            MOV             AL,FIFO_DIR
            MOV             DX,FIFO_CTL
            OUT             DX,AL                   ; SET FIFO DIRECTION OUTBOUND
            ADD             AL,FIFO_EN
            OUT             DX,AL                   ; ENABLE FIFO
TMC1800_WRITE_LP:
```

```
        CALL        WRITE_PTR_UPDATE      ; WRITE POINTER UPDATE
                                            ROUTINE

;_____
;
;   WRITE_PTR_UPDATE ROUTINE PERFORMS THE FOLLOWING
;   FUNCTIONS:
;     UPDATE DATA_POINTER AND TOTAL TRANSFER LENGTH (USING
;     CX)
;     DETERMINE NEXT TRANSFER LENGTH (RETURNED IN CX)
;     CHECK FOR CHANGE OUT OF DATA PHASE (RETURN CARRY SET
;     WHEN DONE)
;     DETECT AND HANDLE OVERFLOW, UNDERFLOW, AND TIMEOUT
;     ERRORS
;_____

JC          TMC1800_WRITE_EXIT

LDS         SI,DATA_POINTER       ; POINT TO DATA BUFFER (SRC)
        MOV         DX,FIFO               ; POINT TO FIFO (DEST)
        CMP         CX,1                  ; CHECK FOR 1-BYTE TRANS
        JNZ         TMC1800_WRITE_1       ; GO IF MULTIPLE BYTES

OUTSB
        JMP         SHORT TMC1800_WRITE_LP

TMC1800_WRITE_1:
        AND         CX,0FFFEH             ; MAKE INTO EVEN COUNT
        PUSH        CX                    ; SAVE TRANSFER LENGTH
        SHR         CX,1                  ; MAKE INTO WORD COUNT
        REP         OUTSW                 ; OUTPUT TO FIFO
        POP         CX                    ; RESTORE TRANSFER LENGTH
        JMP         SHORT TMC1800_WRITE_LP

TMC1800_WRITE_EXIT:
        POP         DX
        POP         CX
        POP         DS
        POP         SI                    ; RESTORE REGISTERS
        RET
TMC1800_WRITE
        ENDP

_TEXT
        ENDS

END
```

SUMMARY

From the foregoing, the present invention provides an extremely versatile single chip embodiment of a SCSI controller circuit which may be used for either MCA or ISA applications. The chip is easily configured by the user-settable mode select pin to either the MCA or the ISA architectures.

While the invention has been described in its presently preferred embodiment, it will be understood that certain modifications to this circuit are possible without departing from the spirit of the invention as set forth in the appended claims.

What is claimed is:

1. A computer system interface adapter for connection between a host computer bus and an input/output SCSI bus for interconnecting a host computer to a SCSI peripheral device, said adapter comprising:

an internal interface data bus;

a main FIFO buffer coupled to said internal interface data bus;

a first interface means comprising an input/output FIFO coupled to said SCSI bus and to said internal interface data bus;

a second interface means coupled to said host computer bus and to said internal interface data bus;

control means for causing data communicated between said SCSI bus and said first interface means to flow onto said internal interface data bus and to further flow from said internal interface data bus into said main FIFO buffer;

data counter means for monitoring the quantity of data in said main FIFO buffer and for generating a numerical value, in real time, indicating the quantity of data stored in said main FIFO buffer;

interrupt logic means responsive to said main FIFO buffer for generating an interrupt signal to said host computer bus to inform said host computer that said main FIFO buffer is full; and FIFO control means responsive to said numerical value generated by said data counter means for controlling transfers of data blocks to said main FIFO buffer from said input/output FIFO such that a variable block size is transmitted to said main FIFO buffer with each data transfer without overflowing said main FIFO buffer, said variable block size being limited to a maximum block size transmittable over said internal interface data bus.

2. The apparatus of claim 1 wherein said data counter means further includes FIFO control logic means for establishing read and write address pointers for designating the location within said main FIFO buffer at which data is read and written to.

3. The apparatus of claim 1 wherein said first interface means includes means for monitoring the fullness of said input/output FIFO buffer.

4. The apparatus of claim 1 wherein said first interface means comprises, in combination, said input/output FIFO buffer and a data port means coupled in parallel between SCSI bus and said internal interface bus and wherein said control means selectively routes data between said SCSI bus and said internal interface data bus via one of said input/output FIFO buffer and said data port means.

5. A computer system interface adaptor for connection between an input/output SCSI bus and a selected one of at least two different types of host computer bus architectures for interconnecting a host computer to a SCSI peripheral device, the adaptor comprising:

a SCSI controller circuit, further comprising;
   an internal interface data bus;
   a main FIFO buffer coupled to said internal interface data bus;
   a first interface means comprising an input/output FIFO for coupling said SCSI bus to said internal interface data bus;
   a second interface means for coupling said host computer bus to said internal interface data bus;
   control logic gating means for causing data communicated between said SCSI bus and said first interface means to communicate with said internal interface data bus and for further causing data communicated between said host computer bus and said second interface means to communicate with said internal interface data bus through said main FIFO buffer; and
   control signal generation logic means for coupling to said host computer bus having a first portion adapted for generating control signals of a first type corresponding to a host computer of a first type and a second portion adapted for generating control signals of a second type corresponding to a host computer of a second type; and
   mode control means responsive to a user-settable signal for selectively enabling one and disabling the other of said first and second portions of said control signal generation logic.

6. The apparatus of claim 5 further comprising:

interrupt signal generation logic means for coupling to said host computer bus having:

a third portion adapted for generating interrupt signals of a first type corresponding to a host computer of a first type;

a fourth portion adapted for generating interrupt signals of a second type corresponding to a host computer of a second type; and wherein said mode control means also selectively enabling one and disabling the other of said third and fourth portions of said interrupt signal generation logic.

7. The apparatus of claim 5 wherein said mode control means is electrically actuable.

8. The apparatus of claim 5 wherein said mode control means is voltage controlled.

9. The apparatus of claim 5 wherein said internal interface data bus and said control signal generation logic means are fabricated in a chip having a plurality of electrically conductive leads and wherein said mode control means is coupled to at least one of said leads.

10. The apparatus of claim 5 wherein said internal interface data bus and said control signal generation logic means are fabricated in a chip having a plurality of electrically conductive leads; and wherein said control signal generation logic means includes means responsive to said mode control means for routing said control signals of the first type to a first predefined group of said leads and for routing said control signals of the second type to second predefined group of said leads.

11. The apparatus of claim 5 wherein said at least said internal data bus and said control signal generation logic means are fabricated in a chip having a plurality of electrically conductive leads;

wherein said mode control means defines at least a first state and a second state corresponding to different host computer bus architecture types; and wherein said control signal generation logic means
includes means responsive to said mode control means:
  a. for routing said control signals of the first type to a first predefined group of said leads when said mode control means defines said first state; and
  b. for routing said control signals of the second type to a second predefined group of said leads when said mode control means defines said second state.

12. The apparatus of claim 5 wherein said mode control means is operated by said host computer.

13. The apparatus of claim 5 wherein said mode control means defines at least a first state and second state corresponding to different host computer bus architecture types.

14. The apparatus of claim 5 wherein said mode control means defines at least a first state and a second state corresponding to a different host computer bus architecture types and is selectively placed in one of said first and second states by a predefined hardware configuration.

* * * * *